United States Patent [19]

Ho et al.

[11] Patent Number: 5,196,945
[45] Date of Patent: Mar. 23, 1993

[54] DATA COMPRESSION/EXPANSION CIRCUIT FOR FACSIMILE APPARATUS

[75] Inventors: Steve Ho; Patrick Law, both of Hong Kong, Hong Kong

[73] Assignee: Motorola, Inc., Schaumburg, Ill.

[21] Appl. No.: 576,827

[22] Filed: Sep. 4, 1990

[51] Int. Cl.⁵ .............................................. H04N 1/41
[52] U.S. Cl. ..................................... 358/426; 358/430; 358/261.1; 358/261.2
[58] Field of Search ............ 358/426, 427, 430, 261.1, 358/261.2

[56] References Cited

U.S. PATENT DOCUMENTS

| | | | |
|---|---|---|---|
| 4,097,903 | 6/1978 | Nakagome et al. | 358/261.2 |
| 4,597,016 | 6/1986 | Nakamura et al. | 358/261.1 |
| 4,688,100 | 7/1987 | Haganuma et al. | 358/261.1 |
| 4,701,803 | 10/1987 | Sato | 358/261.1 |
| 4,821,298 | 4/1989 | Lagadec et al. | 358/261.1 |
| 4,955,061 | 9/1990 | Doi et al. | 358/261.1 |
| 4,955,066 | 8/1990 | Notenboom | 358/261.1 |
| 5,055,919 | 10/1991 | Klein et al. | 358/261.1 |

*Primary Examiner*—Edward L. Coles, Sr.
*Assistant Examiner*—Thomas L. Stoll
*Attorney, Agent, or Firm*—Eugene A. Parsons

[57] ABSTRACT

A facsimile unit including apparatus for simultaneously detecting color changes in image data being encoded and counting the number of pels between the color changes. The unit also includes a decoder having a binary tree embodied in ROMs for fast decoding of received signals.

8 Claims, 52 Drawing Sheets

42

43

44

45

46

20

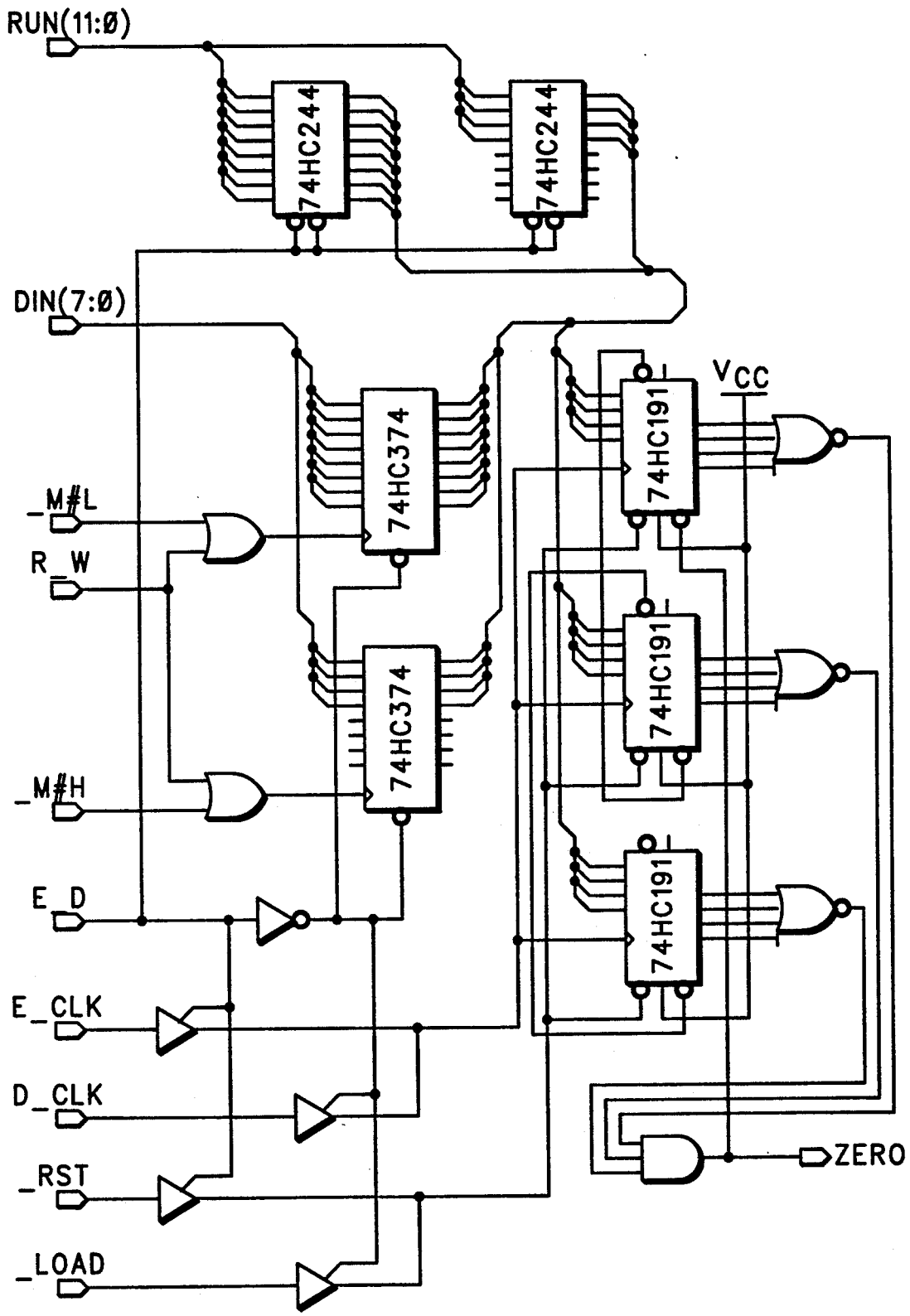
FIG.10E  MSLT

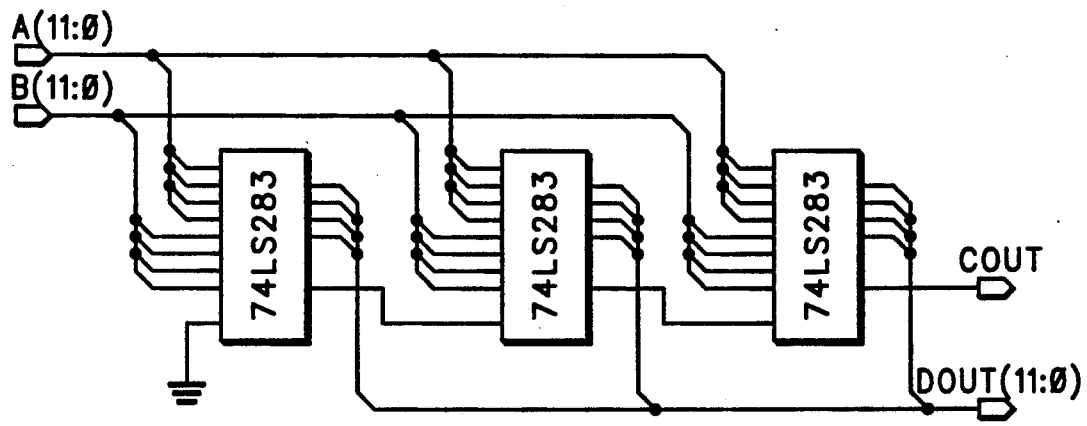
FIG.11D  83
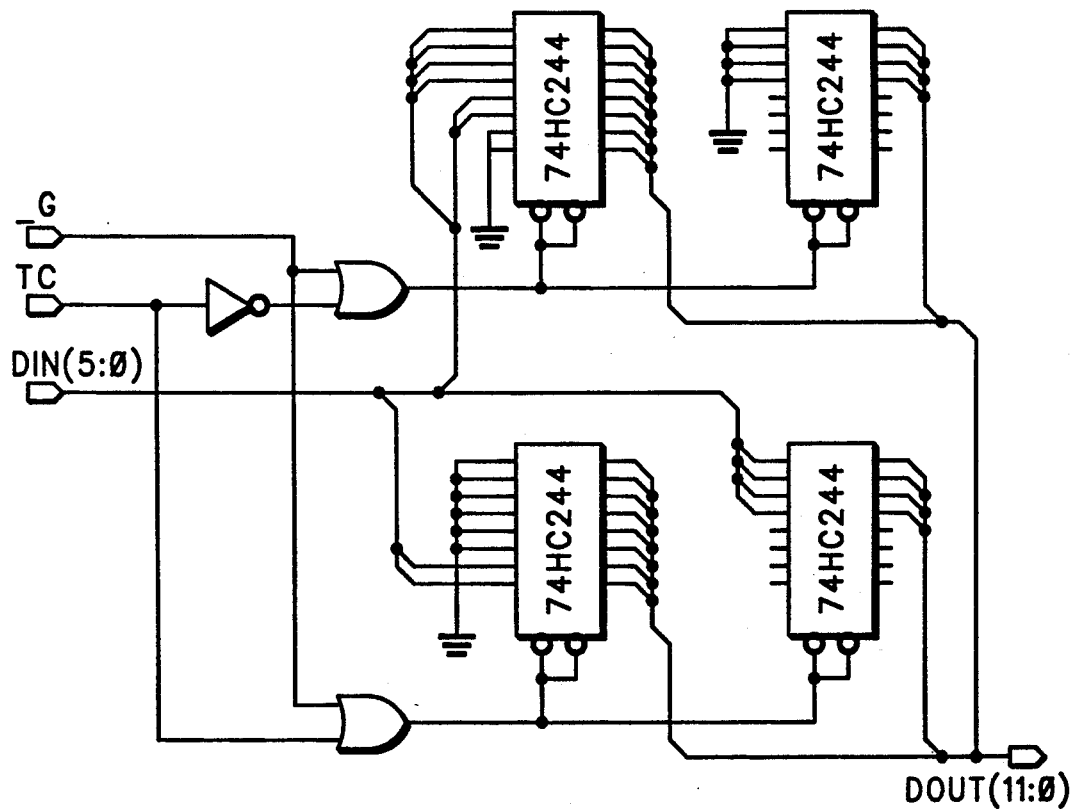
FIG.11E2  85

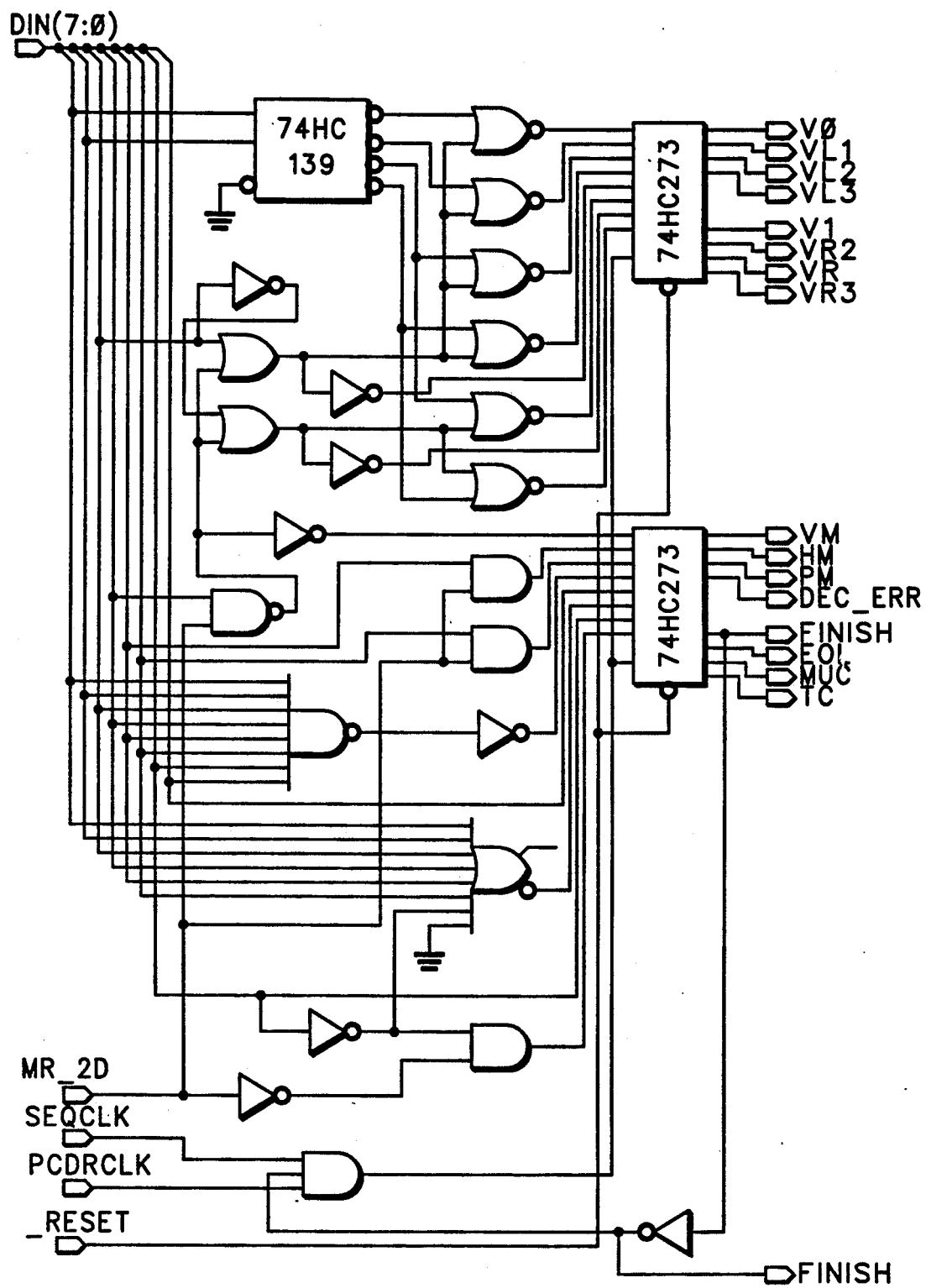
FIG.11E1

TABLE IA
TERMINATING CODES

| WHITE RUN LENGTH | CODE WORD | BLACK RUN LENGTH | CODE WORD |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |
| 22 | 0000011 | 22 | 00000110111 |
| 23 | 0000100 | 23 | 00000101000 |
| 24 | 0101000 | 24 | 00000010111 |

FIG.13A-1

| WHITE RUN LENGTH | CODE WORD | BLACK RUN LENGTH | CODE WORD |
|---|---|---|---|
| 25 | 0101011 | 25 | 000011001000 |
| 26 | 0010011 | 26 | 000011001001 |
| 27 | 0100100 | 27 | 000011001010 |
| 28 | 0011000 | 28 | 000011001011 |
| 29 | 00000010 | 29 | 000011001100 |
| 30 | 00000011 | 30 | 000011001101 |
| 31 | 00011010 | 31 | 000011010010 |
| 32 | 00011011 | 32 | 000011010011 |
| 33 | 00010010 | 33 | 000011010100 |
| 34 | 00010011 | 34 | 000011010101 |
| 35 | 00010100 | 35 | 000011010110 |
| 36 | 00010101 | 36 | 000011010111 |
| 37 | 00010110 | 37 | 000011011000 |
| 38 | 00010111 | 38 | 000011011001 |
| 39 | 00101000 | 39 | 000011011010 |
| 40 | 00101001 | 40 | 000011011011 |
| 41 | 00101010 | 41 | 000011010100 |
| 42 | 00101011 | 42 | 000001101011 |
| 43 | 00101100 | 43 | 000001101010 |
| 44 | 00101101 | 44 | 000001010101 |
| 45 | 00000100 | 45 | 000001010100 |
| 46 | 00000101 | 46 | 000001010110 |
| 47 | 00001010 | 47 | 000001010111 |
| 48 | 00001011 | 48 | 000001100100 |

FIG.13A-2

| WHITE RUN LENGTH | CODE WORD | BLACK RUN LENGTH | CODE WORD |
|---|---|---|---|
| 49 | 01010010 | 49 | 0000011100101 |
| 50 | 01010011 | 50 | 0000001010010 |
| 51 | 01010100 | 51 | 0000001010011 |
| 52 | 01010101 | 52 | 0000000100100 |
| 53 | 00100100 | 53 | 0000000110111 |
| 54 | 00100101 | 54 | 0000000111000 |
| 55 | 01011000 | 55 | 0000000100111 |
| 56 | 01011001 | 56 | 0000000101000 |
| 57 | 01011010 | 57 | 0000001011000 |
| 58 | 01011011 | 58 | 0000001011001 |
| 59 | 01001010 | 59 | 0000000101011 |
| 60 | 01001011 | 60 | 0000000101100 |
| 61 | 00110010 | 61 | 0000001011010 |
| 62 | 00110011 | 62 | 0000001100110 |
| 63 | 00110100 | 63 | 0000001100111 |

FIG.13A-3

TABLE 1B
MAKE-UP CODES

| WHITE RUN LENGTH | CODE WORD | BLACK RUN LENGTH | CODE WORD |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 578 | 01101000 | 578 | 0000001101101 |
| 640 | 01100111 | 640 | 0000001001010 |
| 704 | 011001100 | 704 | 0000001001011 |
| 755 | 011001101 | 755 | 0000001001100 |
| 832 | 011010010 | 832 | 0000001001101 |
| 895 | 011010011 | 895 | 0000001110010 |
| 950 | 011010100 | 950 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |
| EOL | 000000000001 | EOL | 000000000001 |

FIG.13B

TABLE III

| ADDRESS | DATA/ | | | | | | | |
|---------|-------|---|---|---|---|---|---|---|
| 0000 | /02; | 003D | /B0; | 007B | /FF; | 00B9 | /57; | 00F7 | /FF; | 0135 | /FF; | 0173 | /FF; |
| 0001 | /04; | 003E | /A2; | 007C | /FF; | 00BA | /59; | 00F8 | /FF; | 0136 | /FF; | 0174 | /FF; |
| 0002 | /06; | 003F | /A4; | 007D | /FF; | 00BB | /96; | 00F9 | /FF; | 0137 | /FF; | 0175 | /FF; |
| 0003 | /08; | 0040 | /A6; | 007E | /FF; | 00BC | /5C; | 00FA | /FF; | 0138 | /FF; | 0176 | /FF; |
| 0004 | /0A; | 0041 | /A0; | 007F | /FF; | 00BD | /93; | 00FB | /FF; | 0139 | /FF; | 0177 | /FF; |
| 0005 | /0C; | 0042 | /B6; | 0080 | /02; | 00BE | /5E; | 00FC | /FF; | 013A | /FF; | 0178 | /FF; |
| 0006 | /0E; | 0043 | /A8; | 0081 | /04; | 00BF | /60; | 00FD | /FF; | 013B | /FF; | 0179 | /FF; |
| 0007 | /10; | 0044 | /AA; | 0082 | /82; | 00C0 | /61; | 00FE | /FF; | 013C | /FF; | 017A | /FF; |
| 0008 | /12; | 0045 | /AC; | 0083 | /06; | 00C1 | /C0; | 00FF | /FF; | 013D | /FF; | 017B | /FF; |
| 0009 | /14; | 0046 | /BE; | 0084 | /08; | 00C2 | /E0; | 0100 | /88; | 013E | /FF; | 017C | /FF; |
| 000A | /82; | 0047 | /80; | 0085 | /0A; | 00C3 | /E2; | 0101 | /03; | 013F | /FF; | 017D | /FF; |
| 000B | /16; | 0048 | /C6; | 0086 | /85; | 00C4 | /E4; | 0102 | /90; | 0140 | /FF; | 017E | /FF; |
| 000C | /84; | 0049 | /BC; | 0087 | /0A; | 00C5 | /E6; | 0103 | /8D; | 0141 | /FF; | 007F | /FF; |
| 000D | /18; | 004A | /57; | 0088 | /87; | 00C6 | /E8; | 0104 | /A0; | 0142 | /FF; | 0180 | /00; |
| 000E | /87; | 004B | /B2; | 0089 | /0D; | 00C7 | /62; | 0105 | /07; | 0143 | /FF; | 0181 | /00; |
| 000F | /1A; | 004C | /B4; | 008A | /0F; | 00C8 | /B7; | 0106 | /09; | 0144 | /FF; | 0182 | /00; |
| 0010 | /1C; | 004D | /B8; | 008B | /88; | 00C9 | /64; | 0107 | /BE; | 0145 | /FF; | 0183 | /00; |
| 0011 | /1E; | 004E | /BA; | 008C | /11; | 00CA | /BB; | 0108 | /FF; | 0146 | /FF; | 0184 | /00; |
| 0012 | /8A; | 004F | /C8; | 008D | /13; | 00CB | /66; | 0109 | /8F; | 0147 | /FF; | 0185 | /00; |
| 0013 | /20; | 0050 | /CA; | 008E | /8B; | 00CC | /C5; | 010A | /FF; | 0148 | /FF; | 0186 | /00; |
| 0014 | /22; | 0051 | /59; | 008F | /8C; | 00CD | /C7; | 010B | /FF; | 0149 | /FF; |
| 0015 | /24; | 0052 | /5B; | 0090 | /16; | 00CE | /B5; | 010C | /C0; | 014A | /FF; |
| 0016 | /88; | 0053 | /5D; | 0091 | /18; | 00CF | /69; | 010D | /FF; | 014B | /FF; |
| 0017 | /25; | 0054 | /FF; | 0092 | /19; | 00D0 | /6B; | 010E | /FF; | 014C | /FF; |
| 0018 | /C1; | 0055 | /60; | 0093 | /8E; | 00D1 | /B3; | 010F | /FF; | 014D | /FF; |
| 0019 | /28; | 0056 | /D8; | 0094 | /1C; | 00D2 | /AD; | 0110 | /FF; | 014E | /FF; |
| 001A | /8D; | 0057 | /DB; | 0095 | /FF; | 00D3 | /AF; | 0111 | /FF; | 014F | /FF; |
| 001B | /2B; | 0058 | /CC; | 0096 | /1F; | 00D4 | /BA; | 0112 | /FF; | 0150 | /FF; |
| 001C | /81; | 0059 | /CE; | 0097 | /21; | 00D5 | /C4; | 0113 | /FF; | 0151 | /FF; |
| 001D | /2D; | 005A | /D0; | 0098 | /23; | 00D6 | /B1; | 0114 | /FF; | 0152 | /FF; |
| 001E | /2F; | 005B | /D2; | 0099 | /25; | 00D7 | /BF; | 0115 | /FF; | 0153 | /FF; |
| 001F | /31; | 005C | /D4; | 009A | /27; | 00D8 | /9F; | 0116 | /FF; | 0154 | /FF; |
|  |  | 005D | /D6; | 009B | /28; | 00D9 | /A1; | 0117 | /FF; | 0155 | /FF; |

| | | | | | |
|---|---|---|---|---|---|
| 0020 /33; | 005E /FF; | 009C /2A; | 00DA /A9; | 0118 /FF; | 0156 /FF; |
| 0021 /35; | 005F /63; | 009D /FF; | 00DB /C3; | 0119 /FF; | 0157 /FF; |
| 0022 /C3; | 0060 /65; | 009E /2D; | 00DC /9B; | 011A /FF; | 0158 /FF; |
| 0023 /37; | 0061 /FF; | 009F /2F; | 00DD /9D; | 011B /FF; | 0159 /FF; |
| 0024 /39; | 0062 /67; | 00A0 /30; | 00DE /A3; | 011C /FF; | 015A /FF; |
| 0025 /91; | 0063 /69; | 00A1 /32; | 00DF /A5; | 011D /FF; | 015B /FF; |
| 0026 /8F; | 0064 /DE; | 00A2 /34; | 00E0 /A7; | 011E /FF; | 015C /FF; |
| 0027 /3B; | 0065 /6B; | 00A3 /C1, | 00E1 /AB; | 011F /FF; | 015D /FF; |
| 0028 /96; | 0066 /C0; | 00A4 /37; | 00E2 /CB; | 0120 /FF; | 015E /FF; |
| 0029 /3D; | 0067 /E0; | 00A5 /9D; | 00E3 /CD; | 0121 /FF; | 015F /FF; |
| 002A /3E; | 0068 /E2; | 00A6 /39; | 00E4 /D5; | 0122 /FF; | 0160 /FF, |
| 002B /40; | 0069 /E4; | 00A7 /3B; | 00E5 /D7; | 0123 /FF; | 0161 /FF; |
| 002C /41; | 006A /E6; | 00A8 /3D; | 00E6 /D9; | 0124 /FF; | 0162 /FF; |
| 002D /9A; | 006B /E8; | 00A9 /3F; | 00E7 /DB; | 0125 /FF; | 0163 /FF; |
| 002E /44; | 006C /FF; | 00AA /80; | 00E8 /C9; | 0126 /FF; | 0164 /FF; |
| 002F /95; | 006D /FF; | 00AB /FF; | 00E9 /CF; | 0127 /FF; | 0165 /FF; |
| 0030 /46; | 006E /FF; | 00AC /42; | 00EA /D1; | 0128 /FF; | 0166 /FF; |
| 0031 /48; | 006F /FF; | 00AD /DE; | 00EB /D3; | 0129 /FF; | 0167 /FF; |
| 0032 /49; | 0070 /FF; | 00AE /46; | 00EC /FF; | 012A /FF; | 0168 /FF; |
| 0033 /92; | 0071 /FF; | 00AF /48; | 00ED /FF; | 012B /FF; | 0169 /FE; |
| 0034 /4B; | 0072 /FF; | 00B0 /4A; | 00EE /FF; | 012C /FF; | 016A /FF; |
| 0035 /99; | 0073 /FF; | 00B1 /98; | 00EF /FF; | 012D /FF; | 016B /FF; |
| 0036 /4E; | 0074 /FF; | 00B2 /4C; | 00F0 /FF, | 012E /FF; | 016C /FF; |
| 0037 /50; | 0075 /FF; | 00B3 /4E; | 00F1 /FF; | 012F /FF; | 016D /FF; |
| 0038 /52; | 0076 /FF; | 00B4 /50; | 00F2 /FF; | 0130 /FF; | 016E /FE; |
| 0039 /C4; | 0077 /FF; | 00B5 /51; | 00F3 /FF; | 0131 /FF; | 016F /FF; |
| 003A /55; | 0078 /FF; | 00B6 /53; | 00F4 /FF; | 0132 /FF; | 0170 /FF; |
| 003B /9E; | 0079 /FF; | 00B7 /55; | 00F5 /FF; | 0133 /FF; | 0171 /FF; |
| 003C /AE; | 007A /FF; | 00B8 /55; | 00F6 /FF; | 0134 /FF; | 0172 /FF; |

TABLE II

FIG.15-1

| ADDRESS | DATA | ADDRESS | DATA | ADDRESS | DATA | ADDRESS | DATA | ADDRESS | DATA | ADDRESS | DATA | ADDRESS | DATA |
|---|---|---|---|---|---|---|---|---|---|---|---|---|---|
| 0000 | /01; | 003D | /AF; | 007B | /FF; | 00B9 | /56; | 00F7 | /FF; | 0135 | /FF; | 0173 | /FF; |
| 0001 | /03; | 003E | /A1; | 007C | /FF; | 00BA | /58; | 00F8 | /FF; | 0136 | /FF; | 0174 | /FF; |
| 0002 | /05; | 003F | /A3; | 007D | /FF; | 00BB | /5A; | 00F9 | /FF; | 0137 | /FF; | 0175 | /FF; |
| 0003 | /07; | 0040 | /A5; | 007E | /FF; | 00BC | /5B; | 00FA | /FF; | 0138 | /FF; | 0176 | /FF; |
| 0004 | /09; | 0041 | /9F; | 007F | /FF; | 00BD | /5D; | 00FB | /FF; | 0139 | /FF; | 0177 | /FF; |
| 0005 | /0B; | 0042 | /B5; | 0080 | /01; | 00BE | /94; | 00FC | /FF; | 013A | /FF; | 0178 | /FF; |
| 0006 | /0D; | 0043 | /A7; | 0081 | /03; | 00BF | /5F; | 00FD | /FF; | 013B | /FF; | 0179 | /FF; |
| 0007 | /0F; | 0044 | /A9; | 0082 | /83; | 00C0 | /95; | 00FE | /FF; | 013C | /FF; | 017A | /FF; |
| 0008 | /11; | 0045 | /AB; | 0083 | /85; | 00C1 | /41; | 00FF | /FF; | 013D | /FF; | 017B | /FF; |
| 0009 | /13; | 0046 | /BD; | 0084 | /81; | 00C2 | /DF; | 0100 | /01; | 013E | /FF; | 017C | /FF; |
| 000A | /15; | 0047 | /BF; | 0085 | /07; | 00C3 | /E1; | 0101 | /02; | 013F | /FF; | 017D | /FF; |
| 000B | /17; | 0048 | /C5; | 0086 | /86; | 00C4 | /E3; | 0102 | /04; | 0140 | /FF; | 017E | /FF; |
| 000C | /85; | 0049 | /BB; | 0087 | /09; | 00C5 | /E5; | 0103 | /89; | 0141 | /FF; | 007F | /FF; |
| 000D | /86; | 004A | /56; | 0088 | /0B; | 00C6 | /E7; | 0104 | /05; | 0142 | /FF; | 0180 | /01; |
| 000E | /19; | 004B | /B1; | 0089 | /0C; | 00C7 | /B4; | 0105 | /06; | 0143 | /FF; | 0181 | /02; |
| 000F | /1B; | 004C | /B3; | 008A | /0E; | 00C8 | /63; | 0106 | /08; | 0144 | /FF; | 0182 | /03; |
| 0010 | /1D; | 004D | /B7; | 008B | /89; | 00C9 | /B8; | 0107 | /8A; | 0145 | /FF; | 0183 | /04; |
| 0011 | /8B; | 004E | /B9; | 008C | /10; | 00CA | /65; | 0108 | /8B; | 0146 | /FF; | 0184 | /05; |
| 0012 | /1F; | 004F | /C7; | 008D | /12; | 00CB | /BC; | 0109 | /0A; | 0147 | /FF; | 0185 | /06; |
| 0013 | /21; | 0050 | /58; | 008E | /8A; | 00CC | /67; | 010A | /0B; | 0148 | /FF; | 0186 | /07; |
| 0014 | /23; | 0051 | /C9; | 008F | /14; | 00CD | /C6; | 010B | /0C; | 0149 | /FF; | 0187 | /08; |
| 0015 | /C2; | 0052 | /5A; | 0090 | /15; | 00CE | /68; | 010C | /0D; | 014A | /FF; | 0188 | /09; |
| 0016 | /89; | 0053 | /5C; | 0091 | /17; | 00CF | /B6; | 010D | /0E; | 014B | /FF; | 0189 | /0A; |
| 0017 | /26; | 0054 | /5E; | 0092 | /8D; | 00D0 | /6A; | 010E | /0E; | 014C | /FF; | 018A | /0B; |
| 0018 | /27; | 0055 | /5F; | 0093 | /1A; | 00D1 | /B2; | 010F | /FF; | 014D | /FF; | 018B | /0B; |
| 0019 | /29; | 0056 | /D7; | 0094 | /1B; | 00D2 | /AC; | 0110 | /FF; | 014E | /FF; | | |
| 001A | /2A; | 0057 | /D9; | 0095 | /1D; | 00D3 | /AE; | 0111 | /FF; | 014F | /FF; | | |
| 001B | /2C; | 0058 | /CB; | 0096 | /1E; | 00D4 | /B9; | 0112 | /FF; | 0150 | /FF; | | |
| 001C | /8C; | 0059 | /CD; | 0097 | /20; | 00D5 | /BD; | 0113 | /FF; | 0151 | /FF; | | |
| 001D | /2E; | 005A | /CF; | 0098 | /22; | 00D6 | /B0; | 0114 | /FF; | 0152 | /FF; | | |
| 001E | | 005B | /D1; | 0099 | /24; | 00D7 | /BE; | 0115 | /FF; | 0153 | /FF; | | |
| | | 005C | /D3; | 009A | /26; | 00D8 | /9E; | 0116 | /FF; | 0154 | /FF; | | |

FIG. 15-2

| Addr | Val | Addr | Val | Addr | Val | Addr | Val | Addr | Val | Addr | Val |
|------|-----|------|-----|------|-----|------|-----|------|-----|------|-----|
| 001F | /30; | 005D | /D5; | 009B | /8F; | 00D9 | /A0; | 0117 | /FF; | 0155 | /FF; |
| 0020 | /32; | 005E | /61; | 009C | /29; | 00DA | /A8; | 0118 | /FF; | 0156 | /FF; |
| 0021 | /34; | 005F | /62; | 009D | /2B; | 00DB | /C2; | 0119 | /FF; | 0157 | /FF; |
| 0022 | /36; | 0060 | /64; | 009E | /2C; | 00DC | /9A; | 011A | /FF; | 0158 | /FF; |
| 0023 | /DA; | 0061 | /66; | 009F | /2E; | 00DD | /9C; | 011B | /FF; | 0159 | /FF; |
| 0024 | /38; | 0062 | /DC; | 00A0 | /92; | 00DE | /A2; | 011C | /FF; | 015A | /FF; |
| 0025 | /90; | 0063 | /68; | 00A1 | /31; | 00DF | /A4; | 011D | /FF; | 015B | /FF; |
| 0026 | /8E; | 0064 | /DD; | 00A2 | /33; | 00E0 | /A6; | 011E | /FF; | 015C | /FF; |
| 0027 | /3A; | 0065 | /6A; | 00A3 | /35; | 00E1 | /A8; | 011F | /FF; | 015D | /FF; |
| 0028 | /3C; | 0066 | /66; | 00A4 | /36; | 00E2 | /CA; | 0120 | /FF; | 015E | /FF; |
| 0029 | /97; | 0067 | /DF; | 00A5 | /38; | 00E3 | /CC; | 0121 | /FF; | 015F | /FF; |
| 002A | /94; | 0068 | /E1; | 00A6 | /91; | 00E4 | /D4; | 0122 | /FF; | 0160 | /FF; |
| 002B | /3F; | 0069 | /E3; | 00A7 | /3A; | 00E5 | /D6; | 0123 | /FF; | 0161 | /FF; |
| 002C | /93; | 006A | /E5; | 00A8 | /3C; | 00E6 | /D8; | 0124 | /FF; | 0162 | /FF; |
| 002D | /42; | 006B | /E7; | 00A9 | /3E; | 00E7 | /DA; | 0125 | /FF; | 0163 | /FF; |
| 002E | /43; | 006C | /FF; | 00AA | /40; | 00E8 | /C8; | 0126 | /FF; | 0164 | /FF; |
| 002F | /45; | 006D | /FF; | 00AB | /41; | 00E9 | /CE; | 0127 | /FF; | 0165 | /FF; |
| 0030 | /9C; | 006E | /FF; | 00AC | /DC; | 00EA | /D0; | 0128 | /FF; | 0166 | /FF; |
| 0031 | /47; | 006F | /FF; | 00AD | /43; | 00EB | /D2; | 0129 | /FF; | 0167 | /FF; |
| 0032 | /9B; | 0070 | /FF; | 00AE | /DD; | 00EC | /FF; | 012A | /FF; | 0168 | /FF; |
| 0033 | /4A; | 0071 | /FF; | 00AF | /45; | 00ED | /FF; | 012B | /FF; | 0169 | /FF; |
| 0034 | /98; | 0072 | /FF; | 00B0 | /47; | 00EE | /FF; | 012C | /FF; | 016A | /FF; |
| 0035 | /4C; | 0073 | /FF; | 00B1 | /49; | 00EF | /FF; | 012D | /FF; | 016B | /FF; |
| 0036 | /4D; | 0074 | /FF; | 00B2 | /4B; | 00F0 | /FF; | 012E | /FF; | 016C | /FF; |
| 0037 | /4F; | 0075 | /FF; | 00B3 | /99; | 00F1 | /FF; | 012F | /FF; | 016D | /FF; |
| 0038 | /51; | 0076 | /FF; | 00B4 | /4D; | 00F2 | /FF; | 0130 | /FF; | 016E | /FF; |
| 0039 | /53; | 0077 | /FF; | 00B5 | /4F; | 00F3 | /FF; | 0131 | /FF; | 016F | /FF; |
| 003A | /54; | 0078 | /FF; | 00B6 | /97; | 00F4 | /FF; | 0132 | /FF; | 0170 | /FF; |
| 003B | /9D; | 0079 | /FF; | 00B7 | /52; | 00F5 | /FF; | 0133 | /FF; | 0171 | /FF; |
| 003C | /AD; | 007A | /FF; | 00B8 | /54; | 00F6 | /FF; | 0134 | /FF; | 0172 | /FF; |

DATA COMPRESSION/EXPANSION CIRCUIT FOR FACSIMILE APPARATUS

The present invention pertains to data compression/expansion circuitry for facsimile apparatus and more particularly to data compression/expansion which is hardware oriented, rather than being incorporated almost entirely in software, and which may be integrated into a single chip.

BACKGROUND OF THE INVENTION

It is of course well known to those skilled in the art of facsimile apparatus that all transmissions are standardized so that facsimile machines around the world can communicate with each other. It is necessary for all facsimile machines to convert information which is to be sent, into standard coded information which can be decoded by the proper facsimile machine when it is received.

The CCITT, which is an international telecommunications group, has set the standards for the various facsimile apparatus groups. At present, group 3 (G3) is the most important group since most facsimile apparatus falls within this group. Group 3 includes modified Huffman (MH) coding and modified Read (MR) coding.

In prior art facsimile machines, the compression or coding is accomplished by following a software procedure in a relatively standard, dedicated CPU, or microprocessor. The expansion or decoding is accomplished by following a substantially reverse software procedure in the same CPU or microprocessor.

The major problem with the prior art software procedures is that they are extremely complicated to write and difficult to incorporate into CPUs or microprocessors. Also, the software procedures can only perform one step at a time instead of allowing several related steps to occur simultaneously. Thus, the clock frequencies of the software processes must be very high to get the desired speed. Also, a dedicated CPU is used so that the actual hardware becomes relatively expensive.

SUMMARY OF THE INVENTION

It is an object of the present invention to provide a new and improved data compression/expansion circuit for facsimile transmissions that is cheaper and simpler to manufacture.

It is a further object of the present invention to provide new and improved hardware oriented data compression/expansion circuitry for facsimile transmissions that will operate at least as fast as the prior software oriented facsimile transmission systems It is a further object of the present invention to provide a new and improved data compression/expansion circuit for facsimile transmissions which can easily be integrated into a single semiconductor chip and which will operate on all G3 transmissions.

These and other objects are realized in.a data compression/expansion unit including a control register for selecting a specific coding scheme from a plurality of possible coding schemes including all G3 and at least some G4, an algorithmic state machine (ASM) for controlling the sequence and timing of the operations of the other components in accordance with the selected coding scheme, a picture element (pel) change detector for detecting color changes, run length registers controlled by the color change detections, an encoder for coding run length data into standard facsimile code, a decoder embodying a binary tree for decoding received data, and a buffer for arranging output bits of coded information into predetermined bytes. A vertical mode indicator is also included to provide an output indicative of the particular vertical mode of operation when the unit is operating in the MR or MMR modes.

BRIEF DESCRIPTION OF THE DRAWINGS

Referring to the drawings, wherein like characters indicate like parts throughout the figures:

FIG. 2-1 and 2-2 are block/schematic diagrams, illustrating the components and electrical connections therebetween in integrated circuit form, of a data compression/expansion unit embodying the present invention;

FIG. 4-1, 4-2, 4-3 and 4-4 are schematic diagrams of an ASM included in the unit of FIG. 2;

FIG. 7-1 and 7-2 are schematic diagrams of pel change detect registers included in the unit of FIG. 2;

FIGS. 10A through 10F illustrate portions of FIG. 10 in more detail;

FIG. 11-1, 11-2 and 11-3 are schematic diagrams of a decoder included in the unit of FIG. 2;

FIGS. 11A through 11L illustrate portions of FIG. 11 in more detail;

FIG. 12-1, 12-2 and 12-3 are schematic diagrams of a vertical mode indicator (VMI) included in the unit of FIG. 2;

FIGS. 13A and B are tables of CCITT standard codes; and

FIGS. 14-1, 14-2, 15-1 and 15-2 are tables of information stored in the decoder of FIG. 11.

DESCRIPTION OF THE PREFERRED EMBODIMENT

Figure 1:
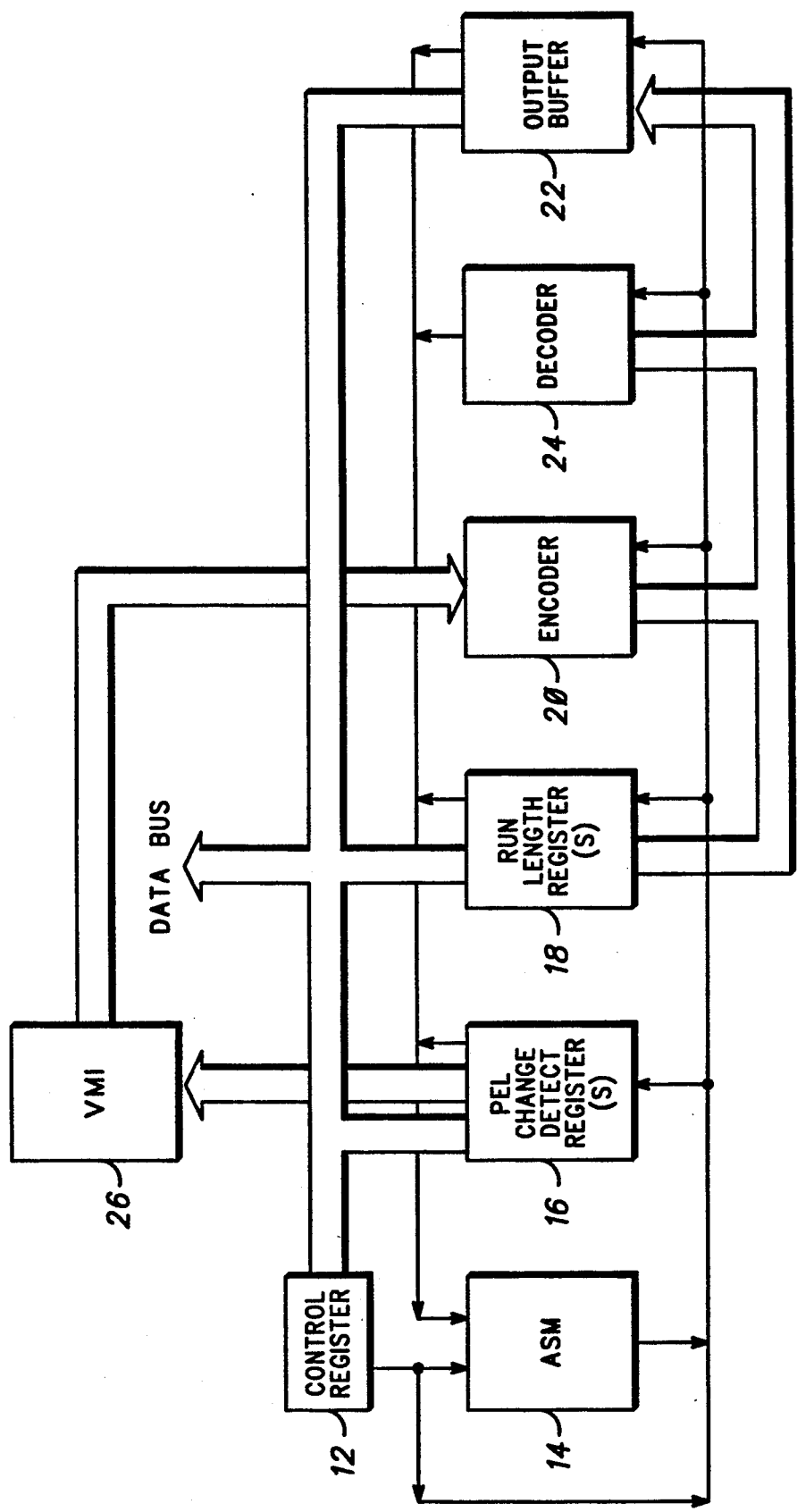
FIG. 1 is a simplified block diagram indicating the general flow of information between the various components.
Figures 1, 2:
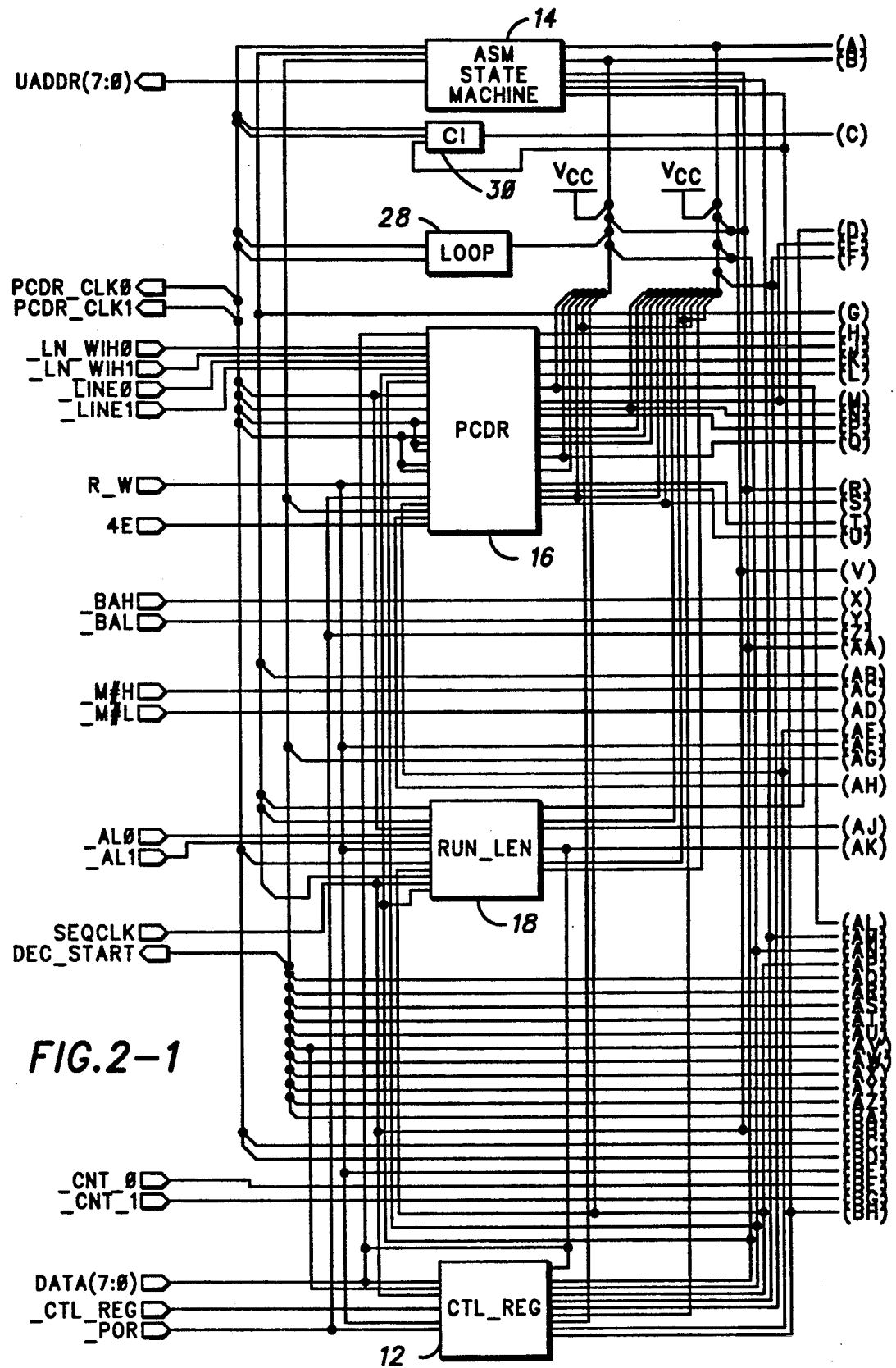
Figure 2:
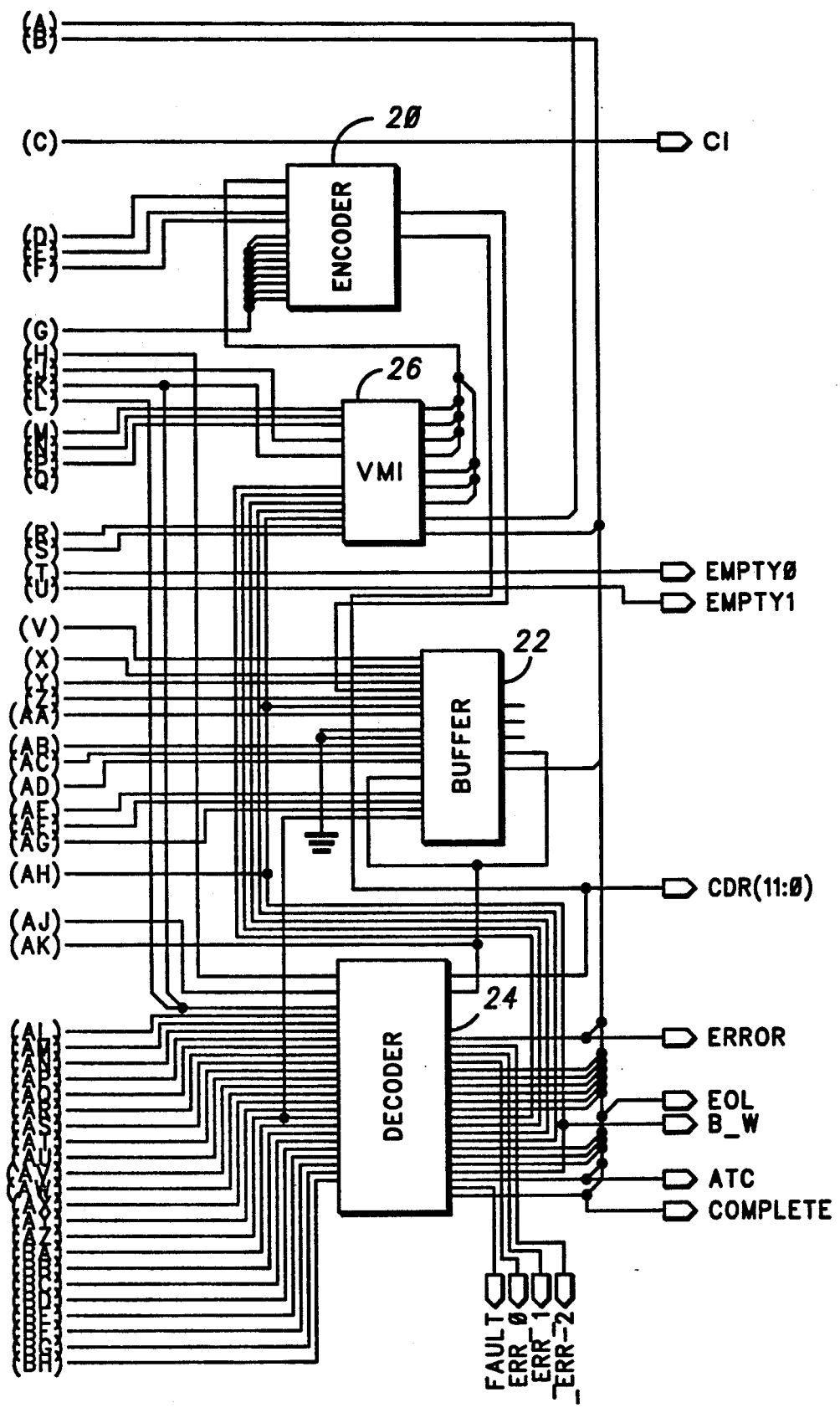

Referring to FIGS. 1 and 2, a specific data compression/expansion unit 10 is illustrated which embodies the present invention. FIG. 1 is a simplified block diagram which illustrates the general flow of information and signals between the various components of unit 10. FIG. 2 illustrates the actual connections in an integrated circuit form.

In general, a control register 12 is used to select a specific coding scheme from the various G3 coding schemes or at least some of the known G4 coding schemes. An algorithmic state machine (ASM) 14 is loaded with a microcode which is used to control the other components of unit 10 in accordance with the specific coding scheme selected. Pel change detect registers (PCDR) 16 are used to detect color (black and white) changes between pels and control run length registers 18, which count the number of pels between pel changes. The run lengths are supplied to an encoder 20, which encodes them in accordance with the accepted CCITT standards. The encoded signals and coded data are supplied to an output buffer 22, which arranges the digital output signals into bytes of information that are acceptable to the data bus of unit 10.

A decoder 24 is included in unit 10 and is connected to receive transmitted data on the data bus and convert it back into pels. Unit 10 also includes a vertical mode indicator (VMI) 26 for operation in the MR or MMR code schemes. FIG. 2 also illustrates a loop counter 28 for operation with ASM 14 and an indicator 30 for indicating blocks of information in the MH block coding scheme.

The various schematic diagrams illustrating the specific components will now be discussed in the detail required for a complete understanding of the present invention. It should of course be understood that the specific embodiment disclosed herein is divided into components represented by individual circuits for ease of understanding and illustration. Unit 10 is designed to be incorporated into a single integrated circuit and, as such, might be somewhat different in appearance and/or layout.

Figure 3:
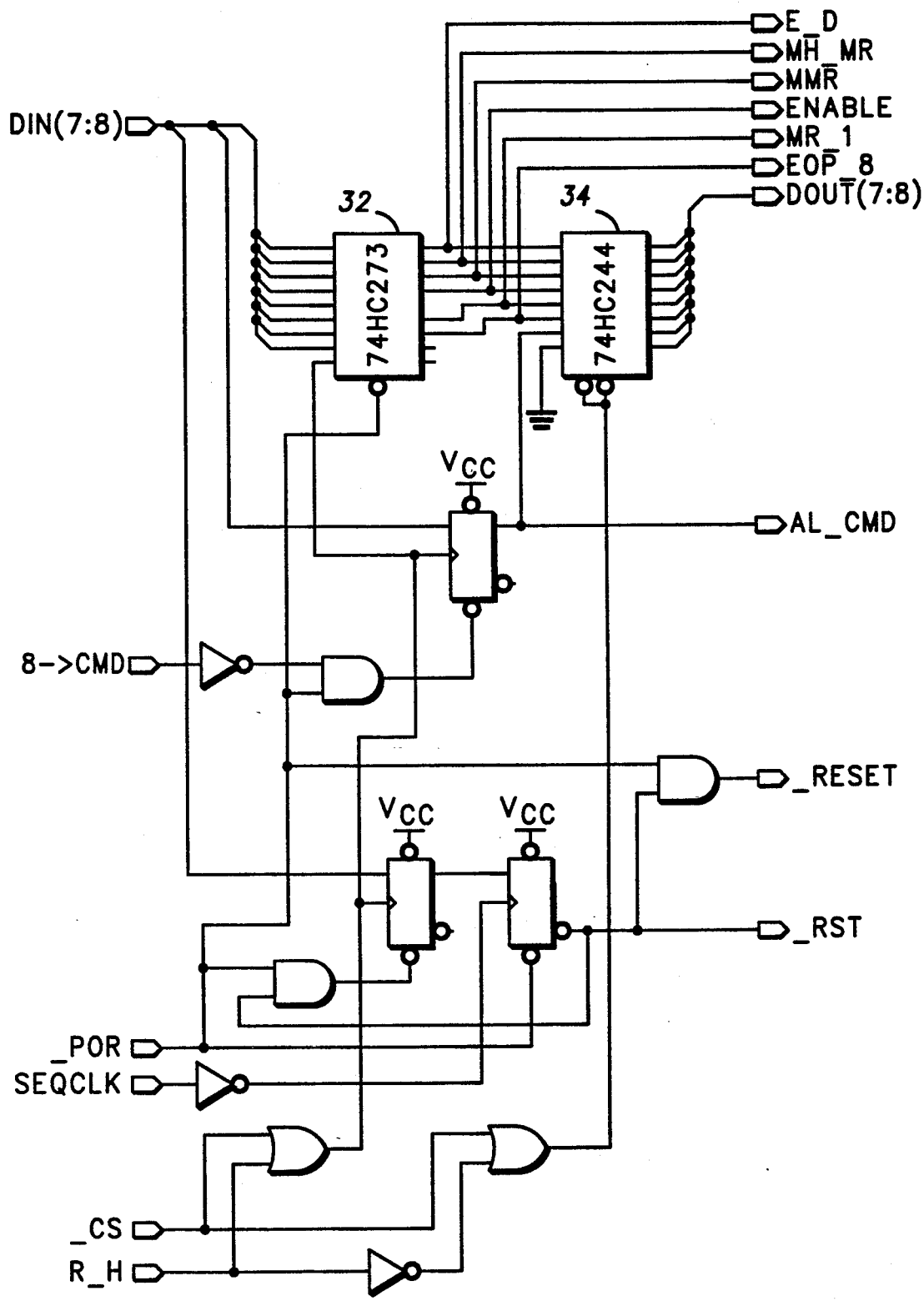
FIG. 3 is a schematic diagram of a control register included in the unit of FIG. 2.

Referring specifically to FIG. 3, control register 12 is illustrated schematically. Control register 12 includes an eight flip-flop register 32, which provides the desired control signals on one or more of six output lines in response to selection signals on the eight line data. The control signals are supplied as timing signals to all other components of unit 10 and the specific control signals utilized depends upon the selected coding scheme. A buffer 34, which is used in conjunction with bus oriented systems, is used to supply the control signals on the six output lines to the data bus. Since the operation of this circuit is straightforward, no further detailed explanation is required.

Figures 1, 4:
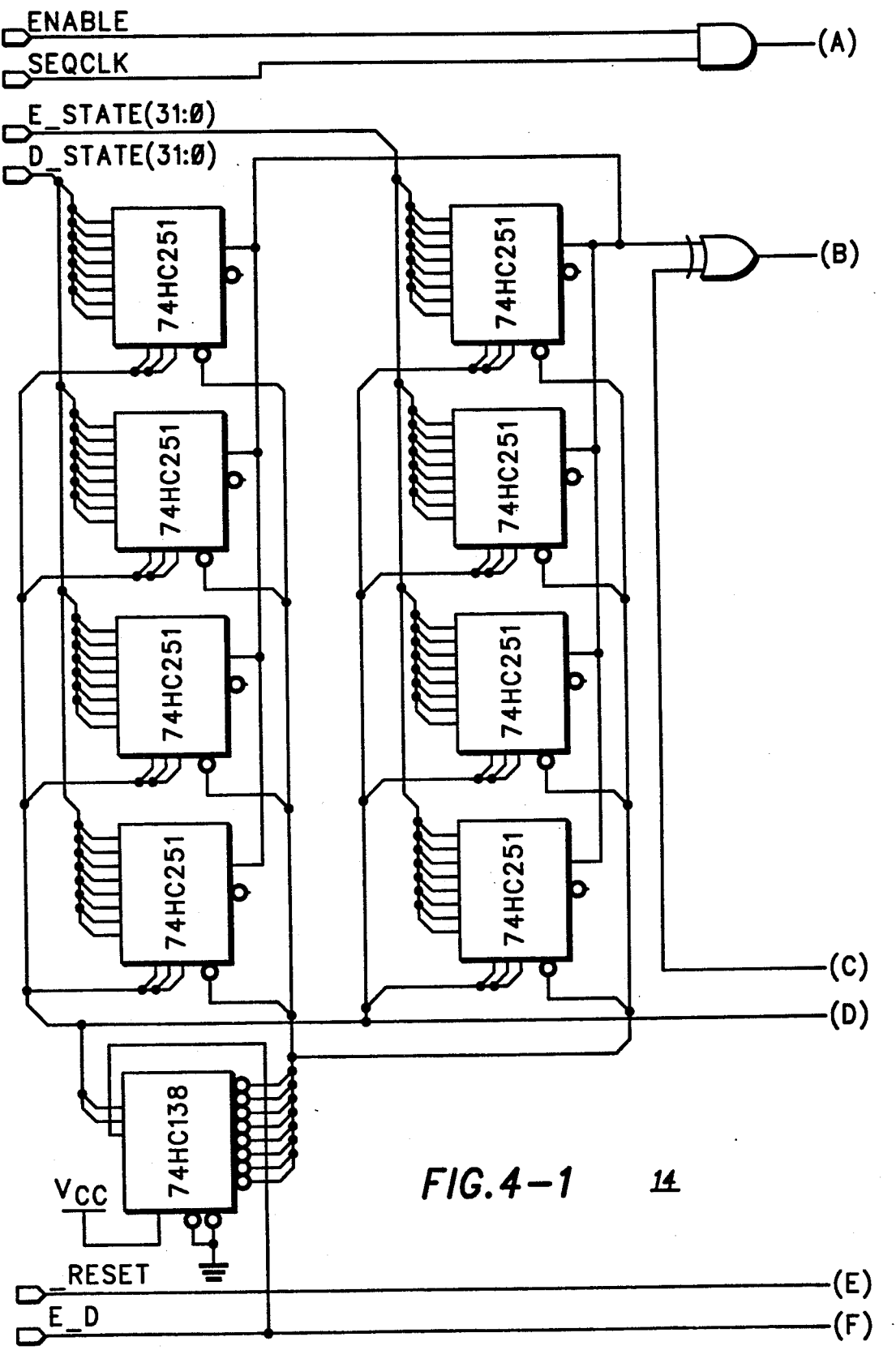
Figures 2, 4:
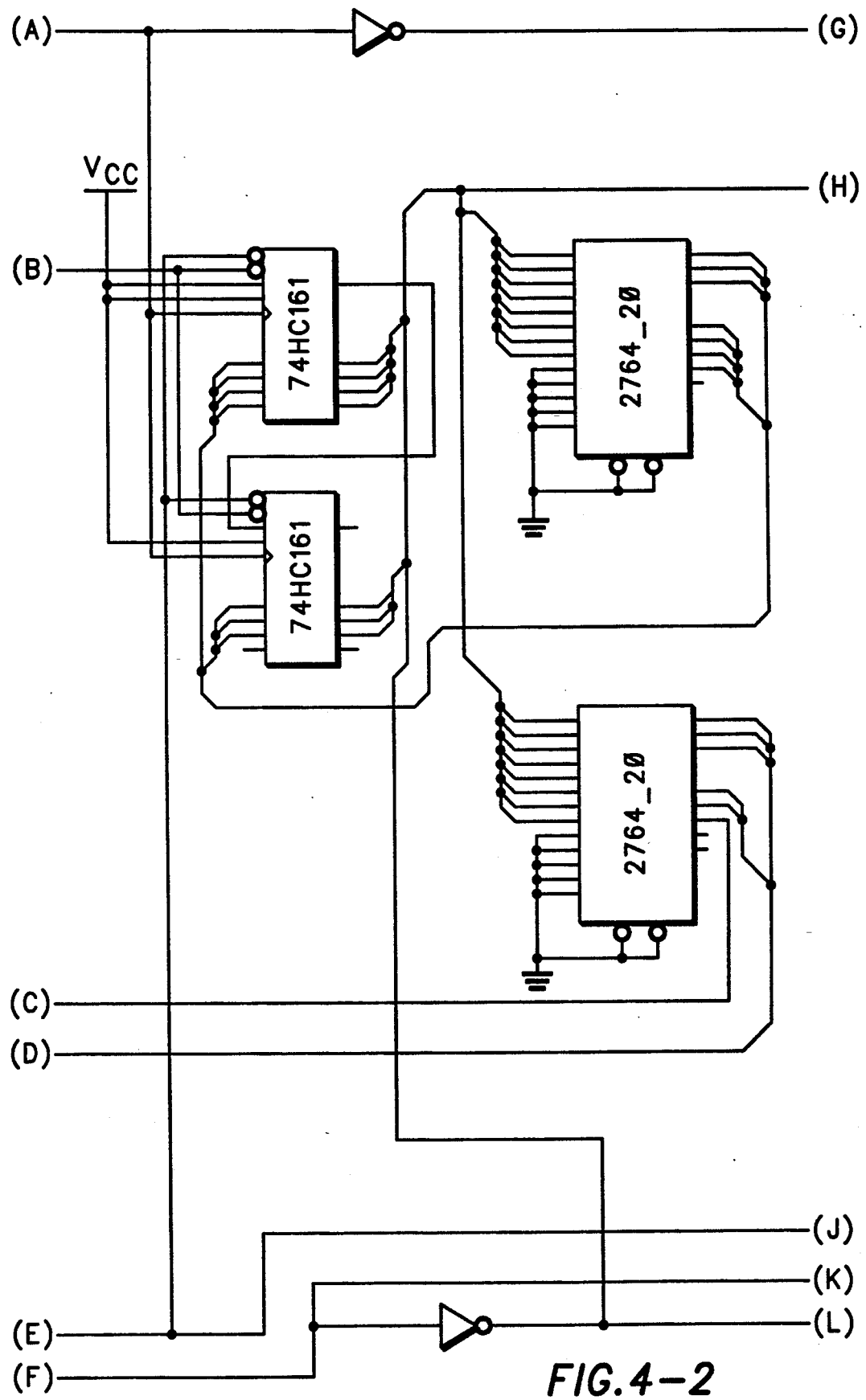
Figures 3, 4:
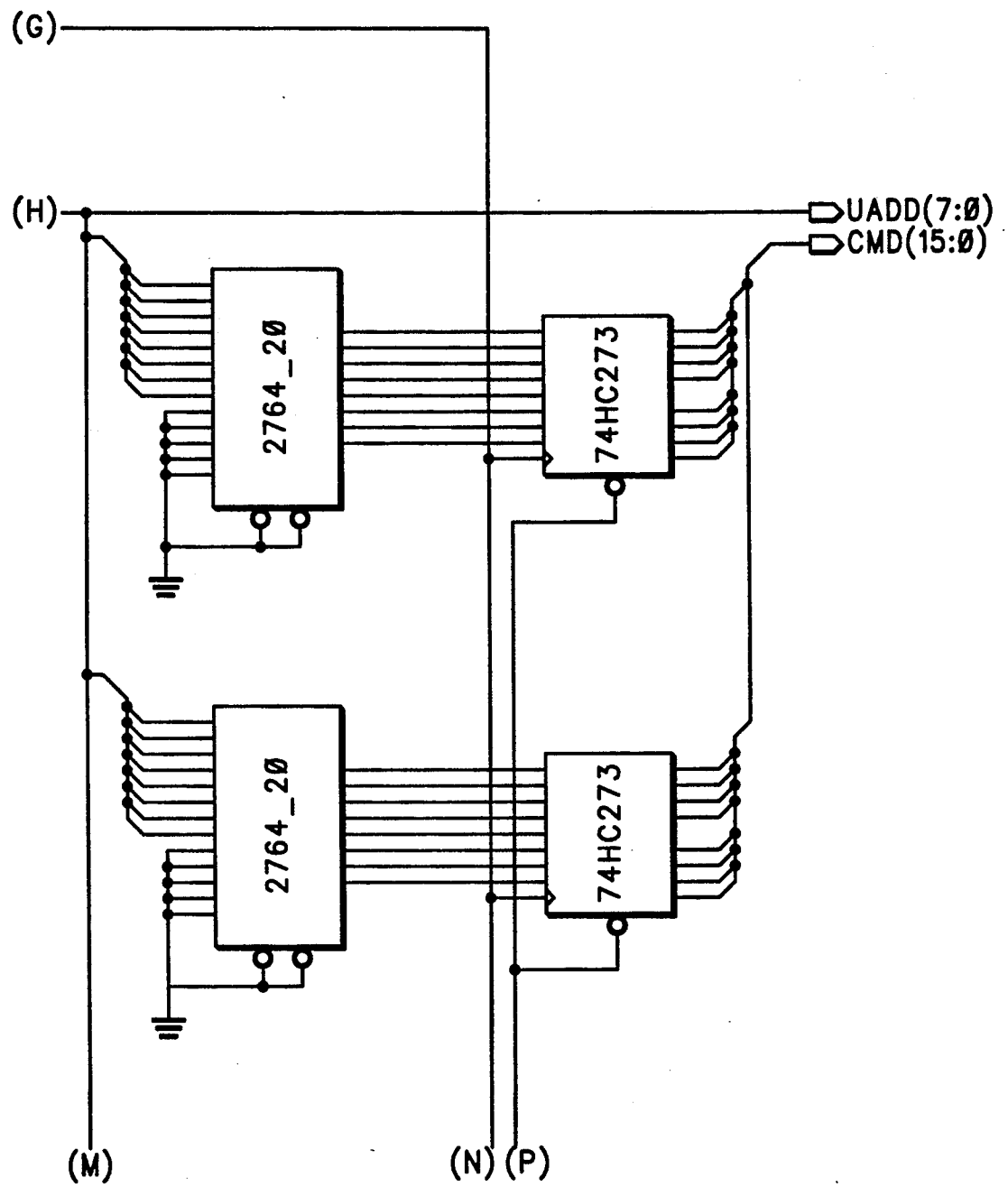
Figure 4:
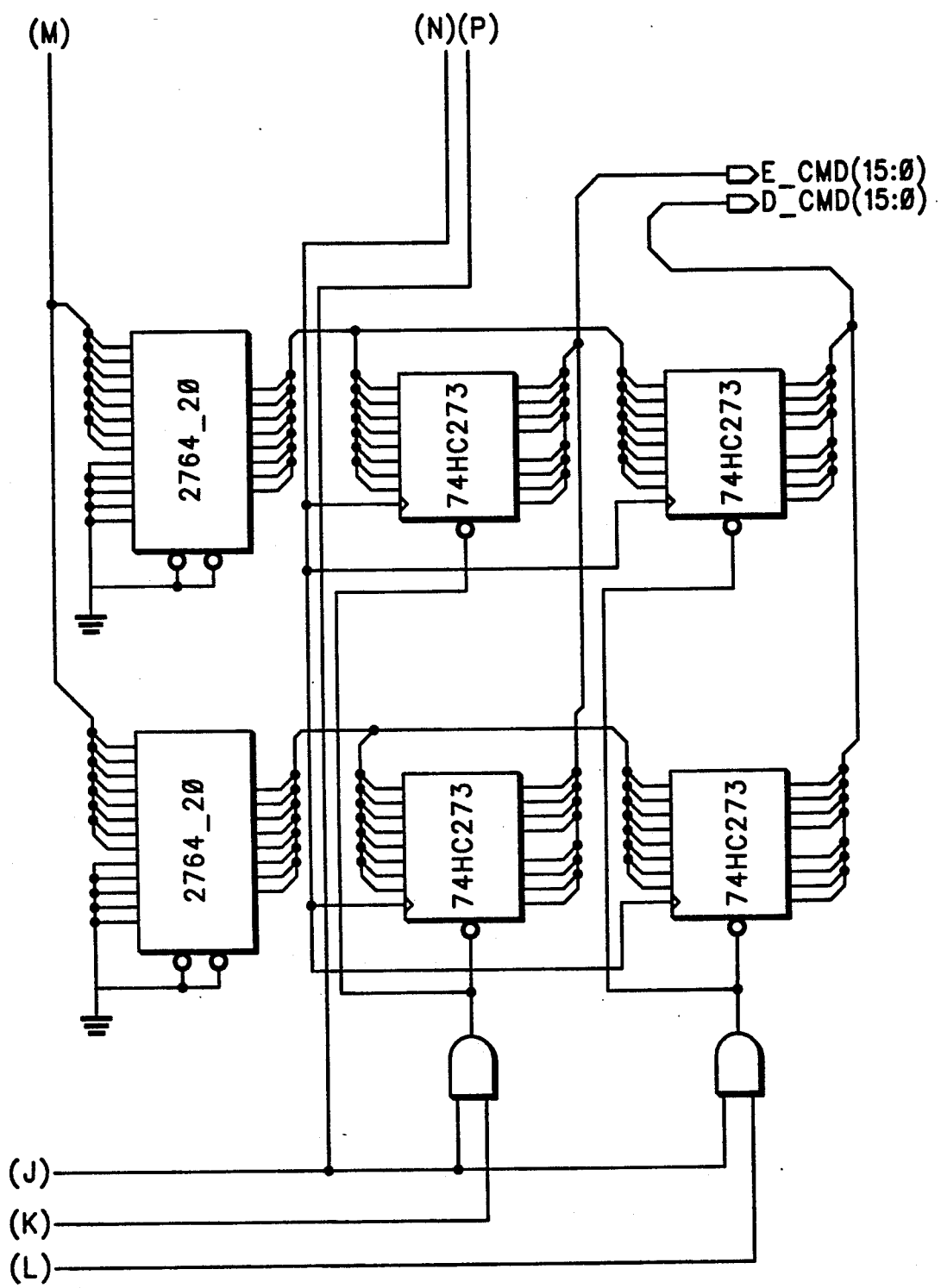

Referring specifically to FIG. 4, a schematic diagram of ASM 14 is illustrated. The microprogramme that controls the operation of the other components of unit 10 is written and stored in ASM 14. In this specific embodiment the microprogramme consists of a microcode having a seven bit micro-address field; one bit is used to select either the jump or the next address and five bits are used to select the kind of input signal that should be compared, which comparison result is used to determine either the jump address or the next address that should be used for the next micro address. The rest of the micro-code consists of output command signals for the control of each individual block. Totally, there are nineteen command signals. ASM 14 receives start signals from control register 12. Coding is performed on a line to line basis so that ASM 14 should receive a start (restart) signal after each line is coded.

Figure 5:
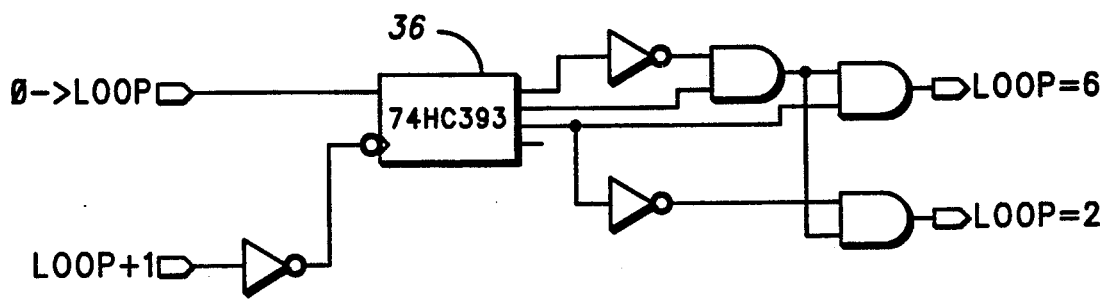
FIG. 5 is a schematic diagram of a loop counter included in the unit of FIG. 2.
Figure 6:
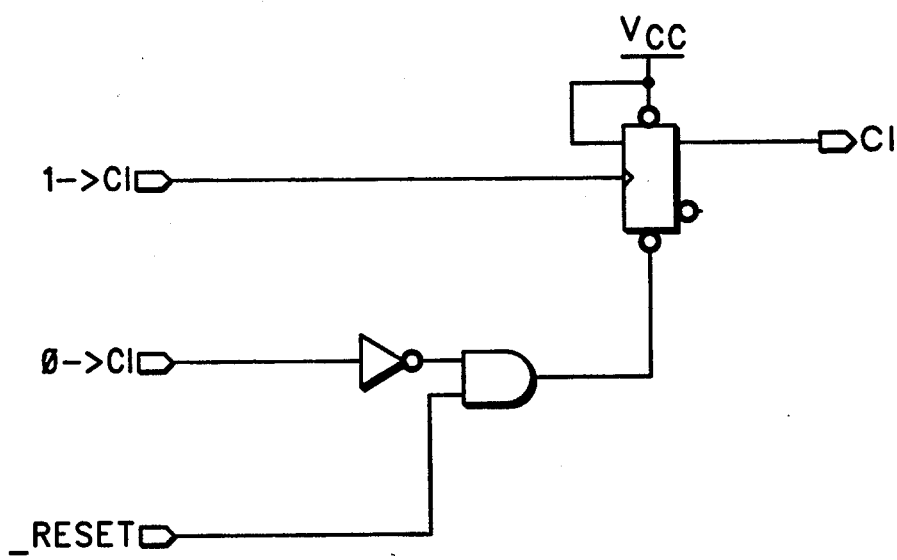
FIG. 6 is a schematic diagram of an MH block indicator included in the unit of FIG. 2.

Since the components and operation of ASM 14 is straightforward and should be clear to those skilled in the art, no additional description on a part by part basis is deemed to be necessary. Further, loop counter 28, which is illustrated schematically in FIG. 5, includes a four stage ripple counter 36 that simply supplies command counting signals to ASM 14, in this embodiment only the LOOP=6 output is utilized. Also, the indicator circuit of FIG. 6 is utilized to provide an output for MH block operation.

Figures 1, 7:
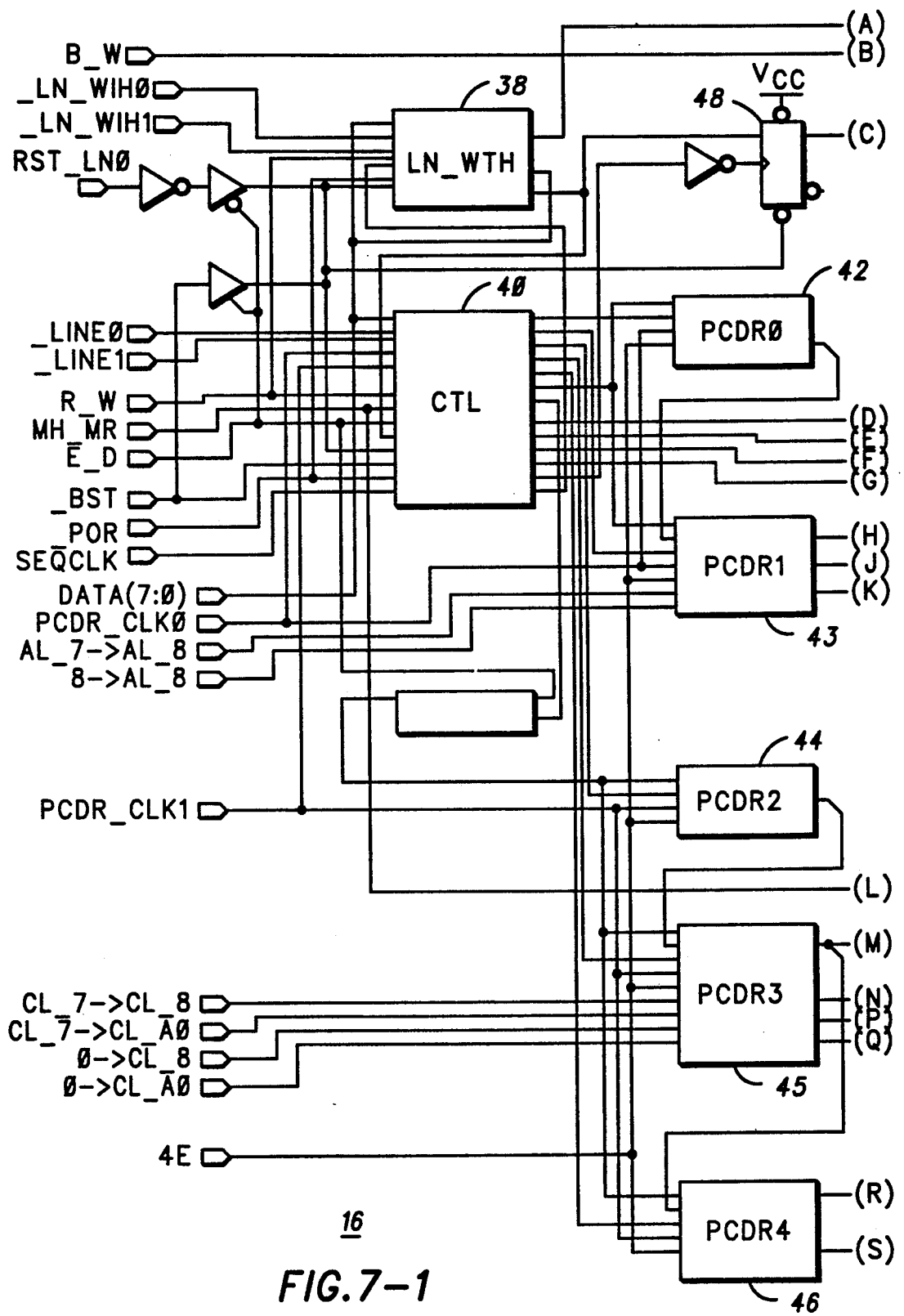
Figures 2, 7:
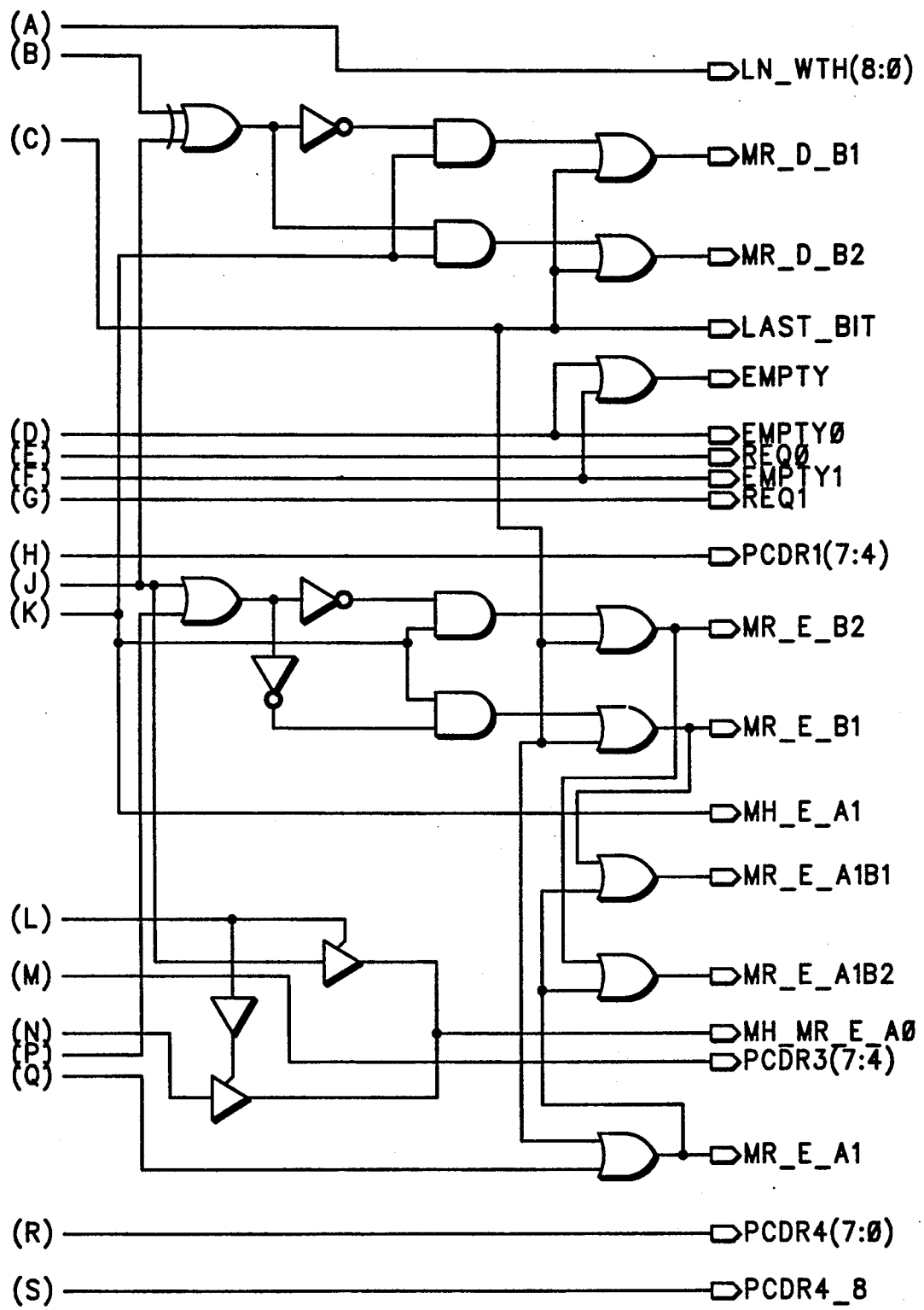
Figure 7A:
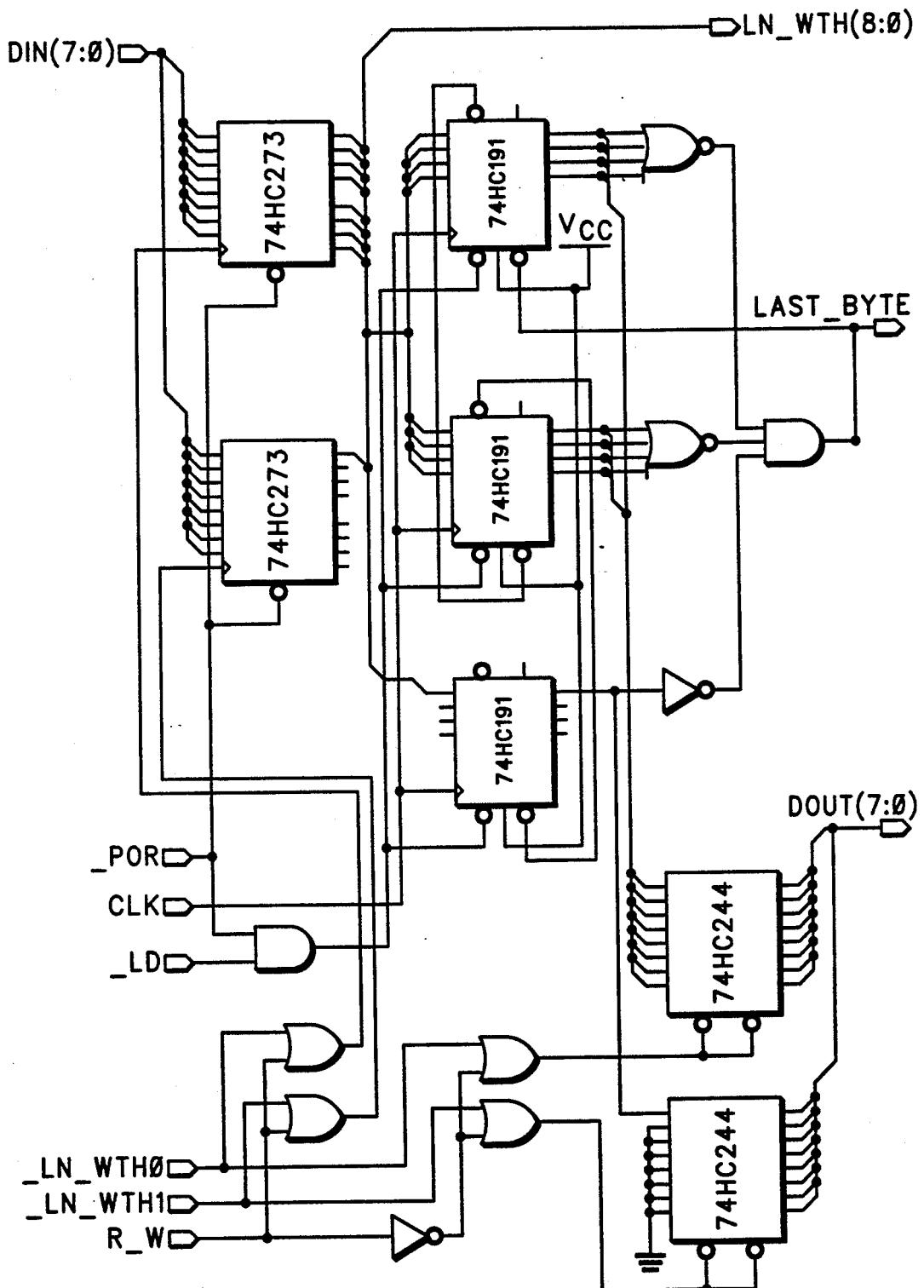
FIGS. 7A through 7g illustrate portions of FIG. 7 in more detail.
Figures 1, 7B:
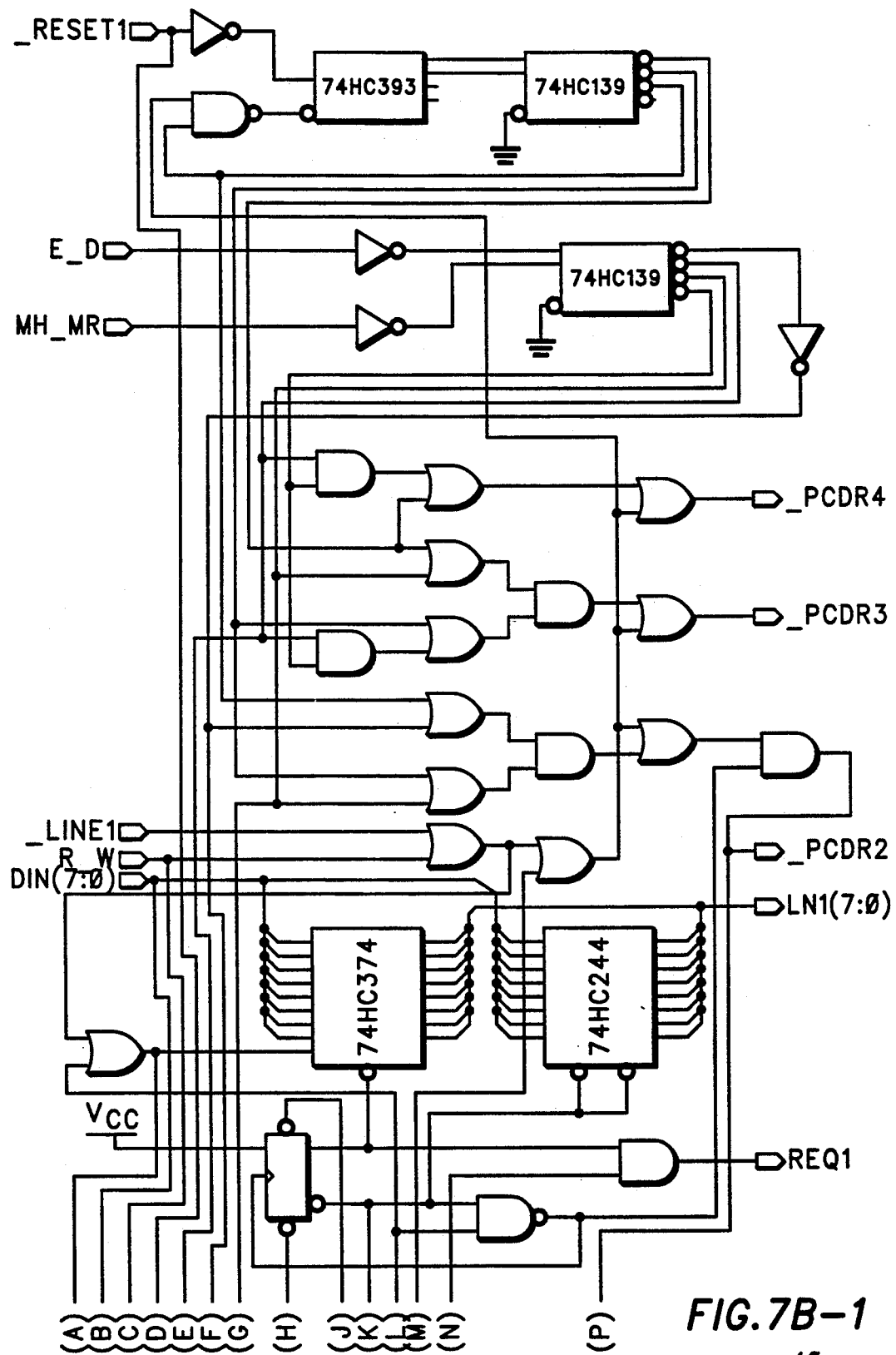
Figures 2, 7B:
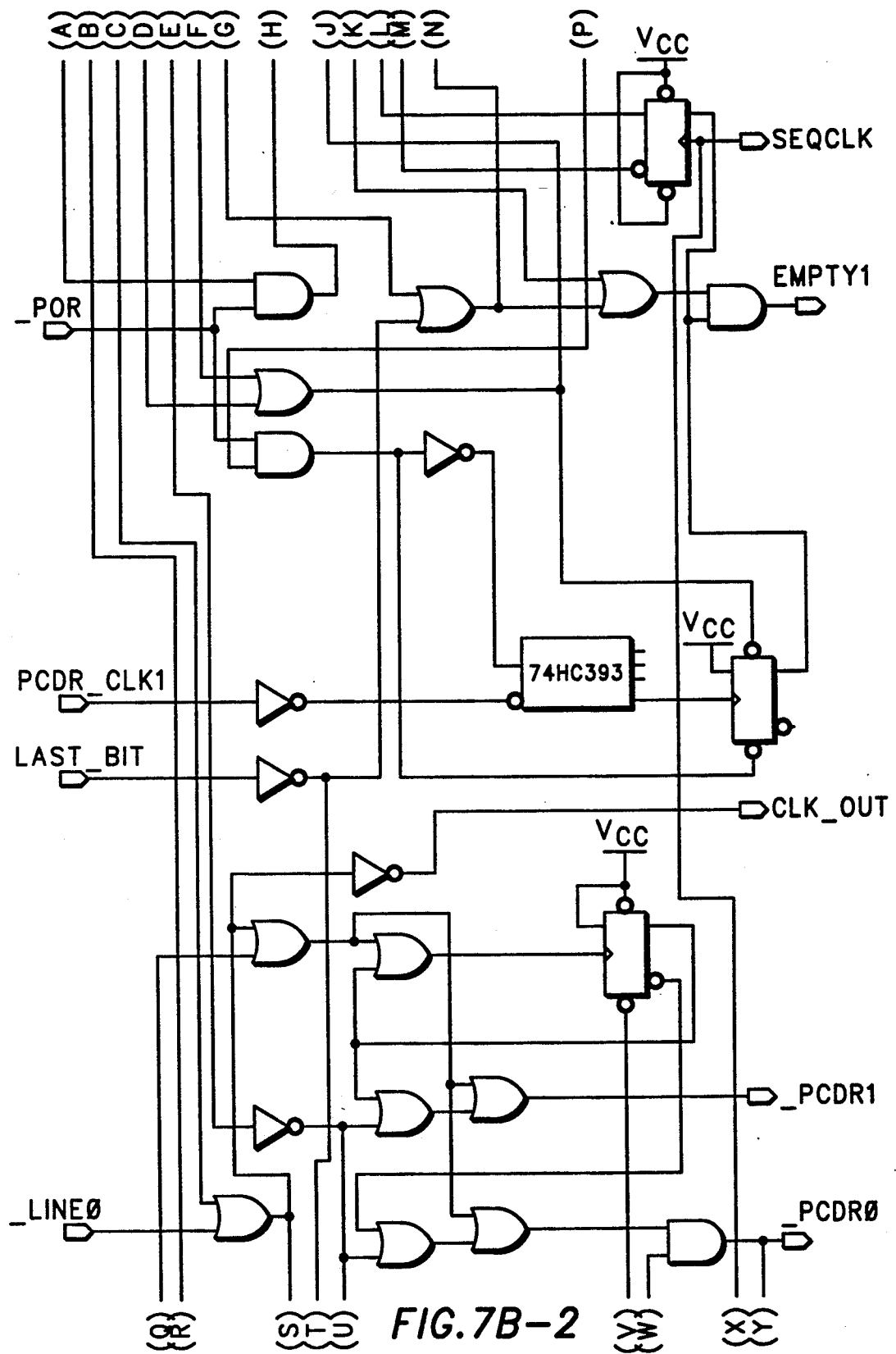
Figures 3, 7B:
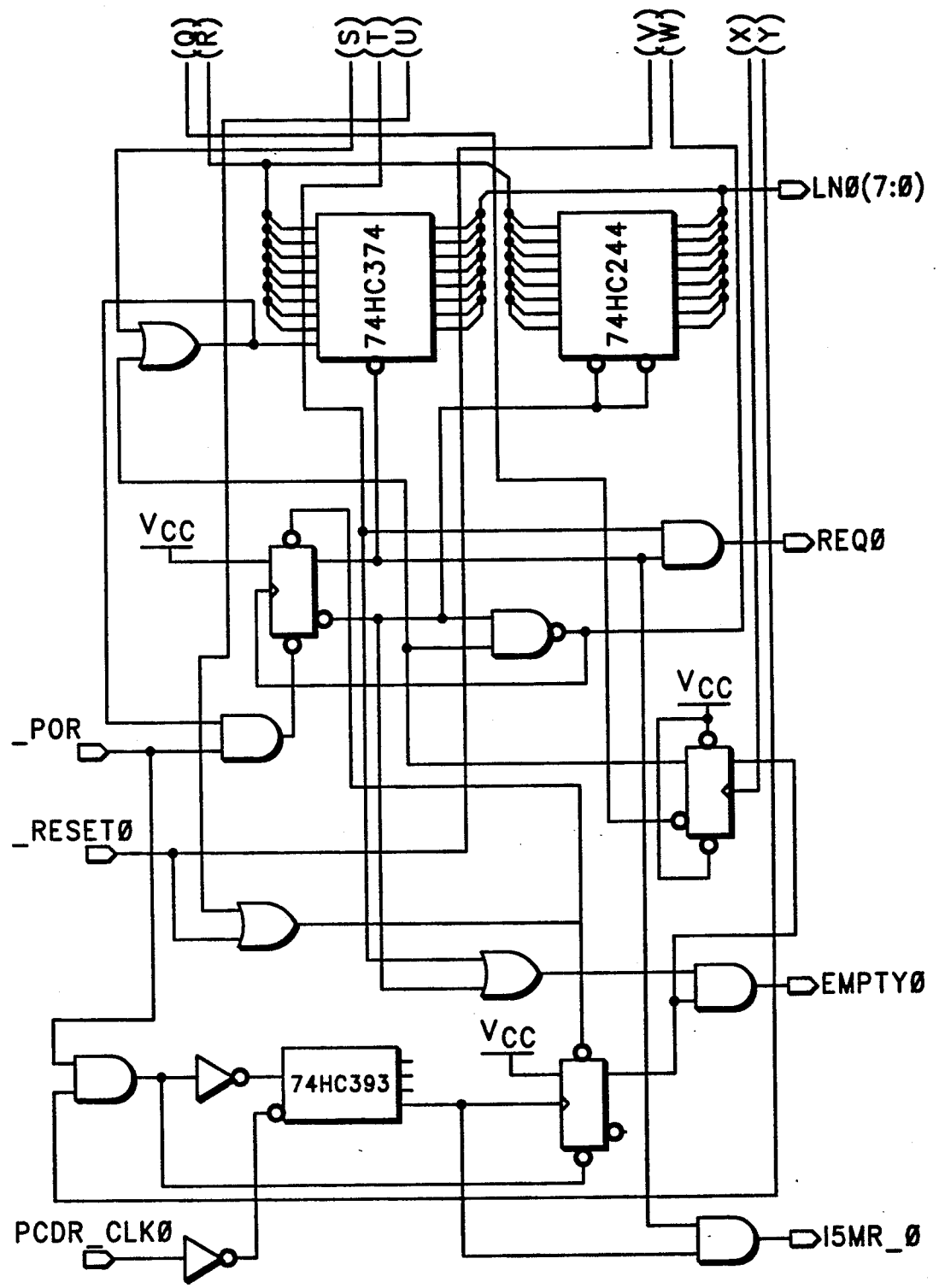
Figure 7C:
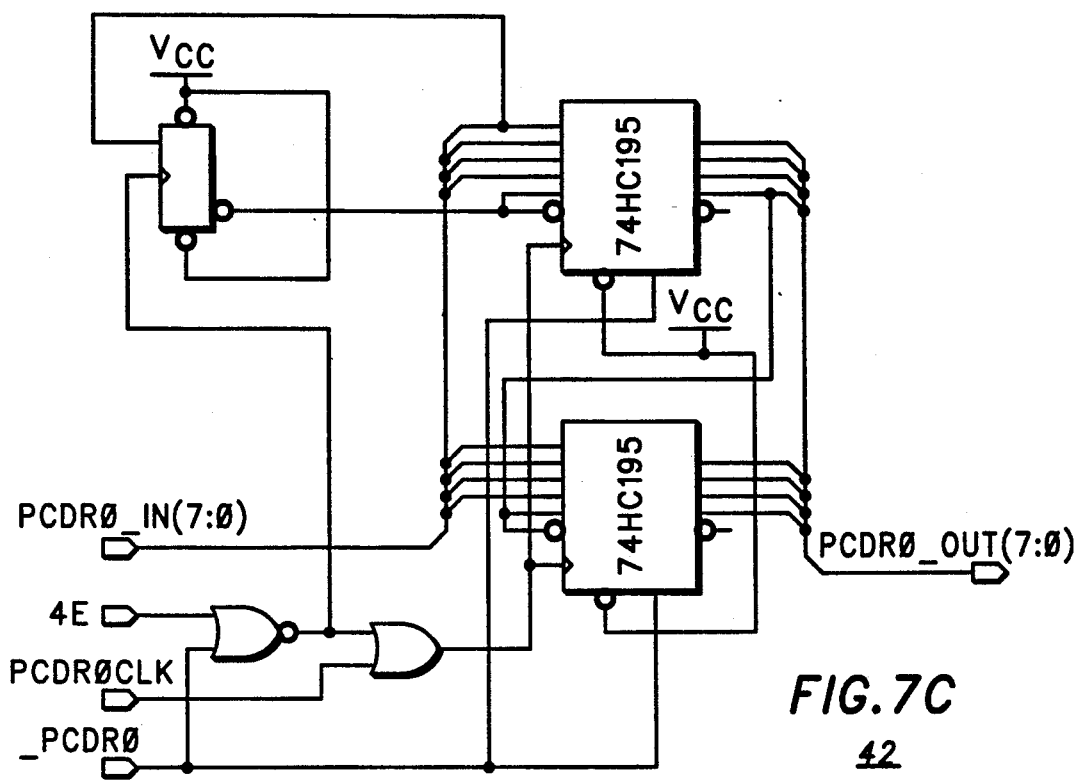
Figure 7D:
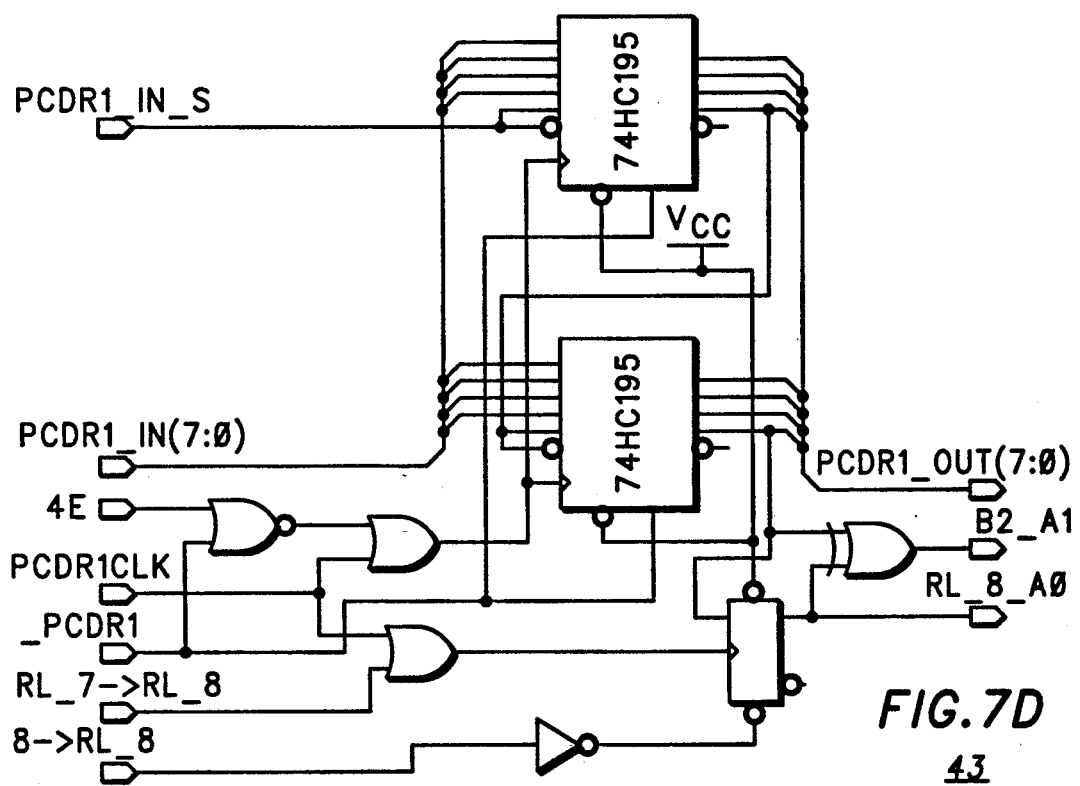
Figure 7E:
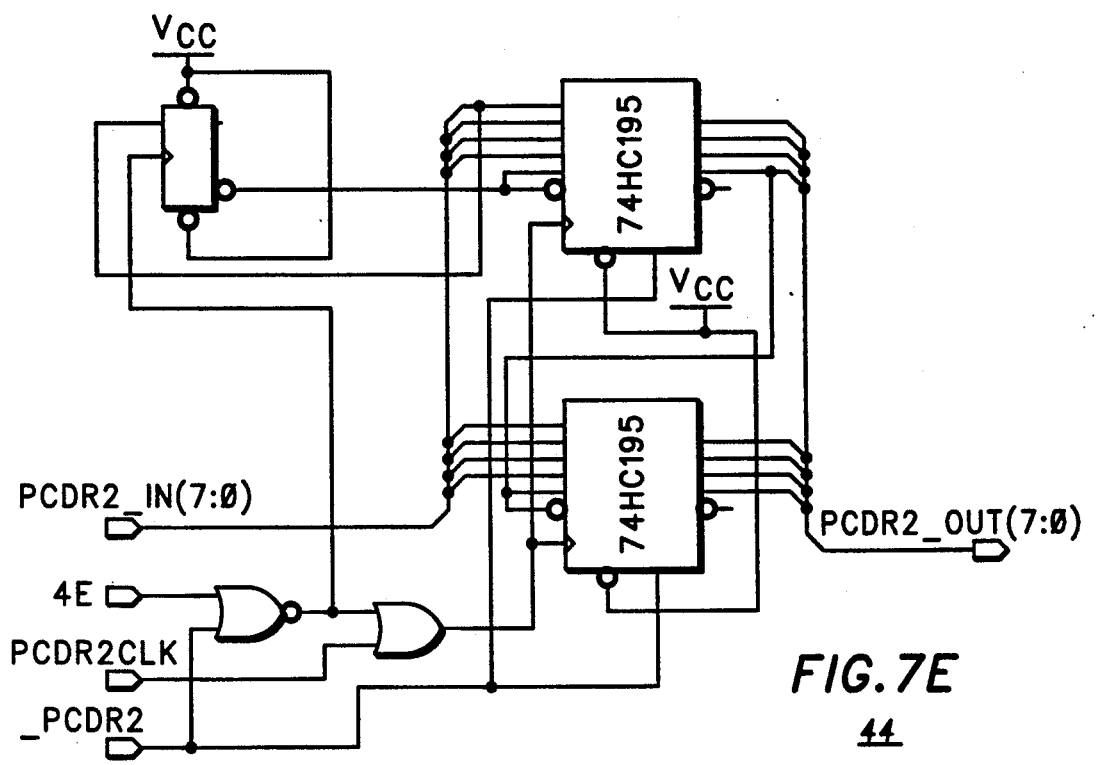
Figure 7F:
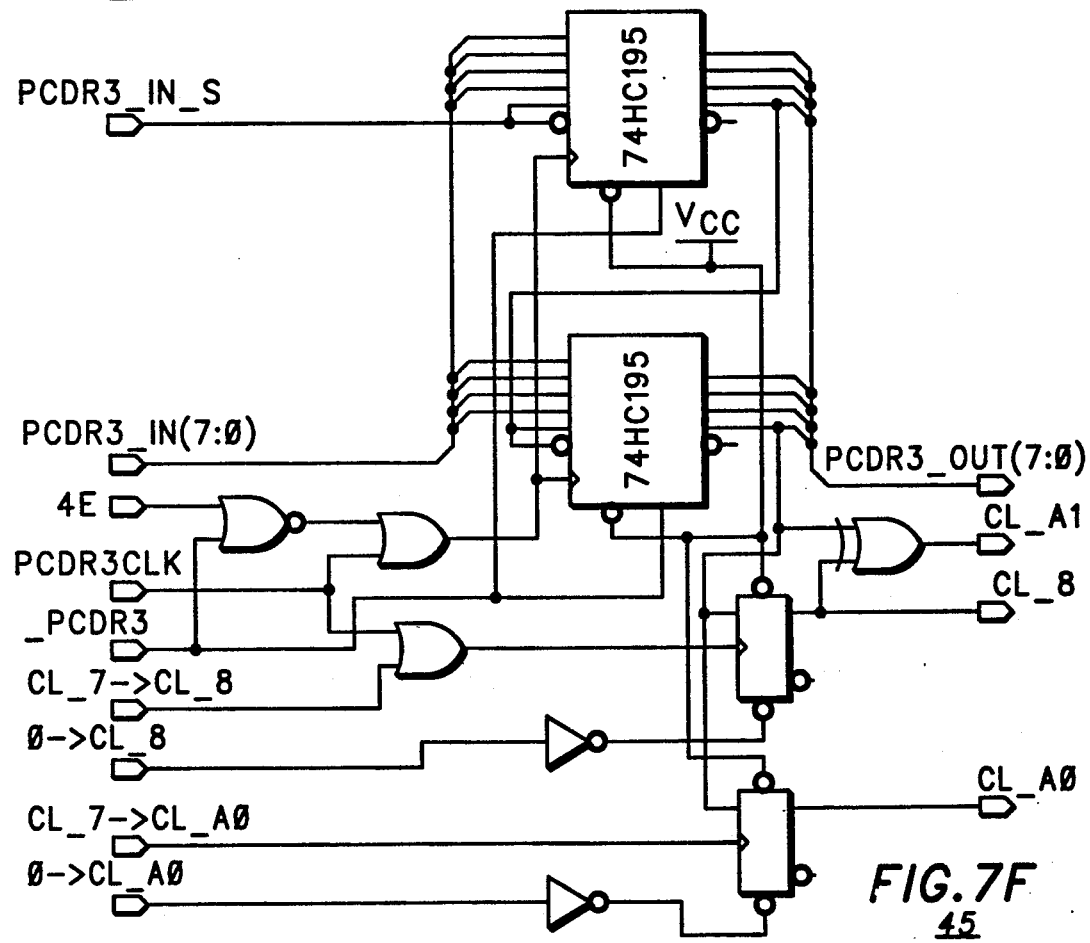
Figure 7G:
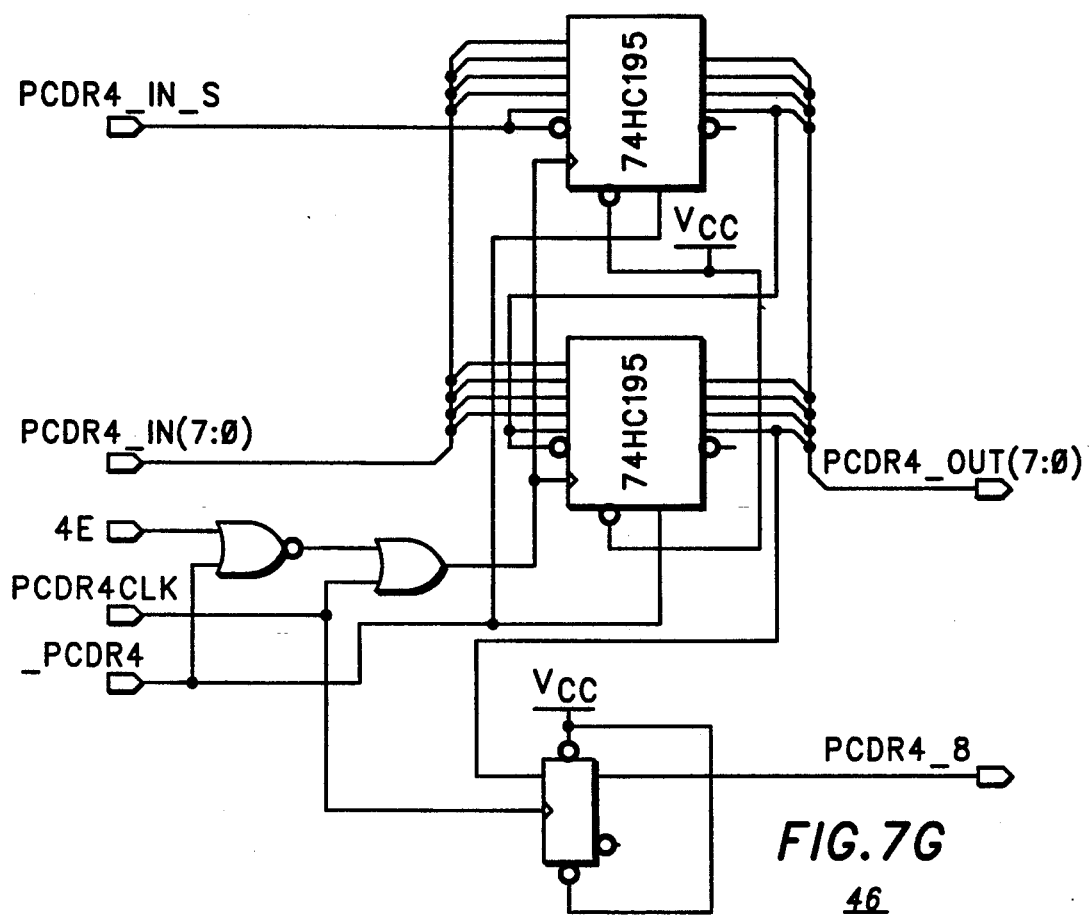
Figure 9:
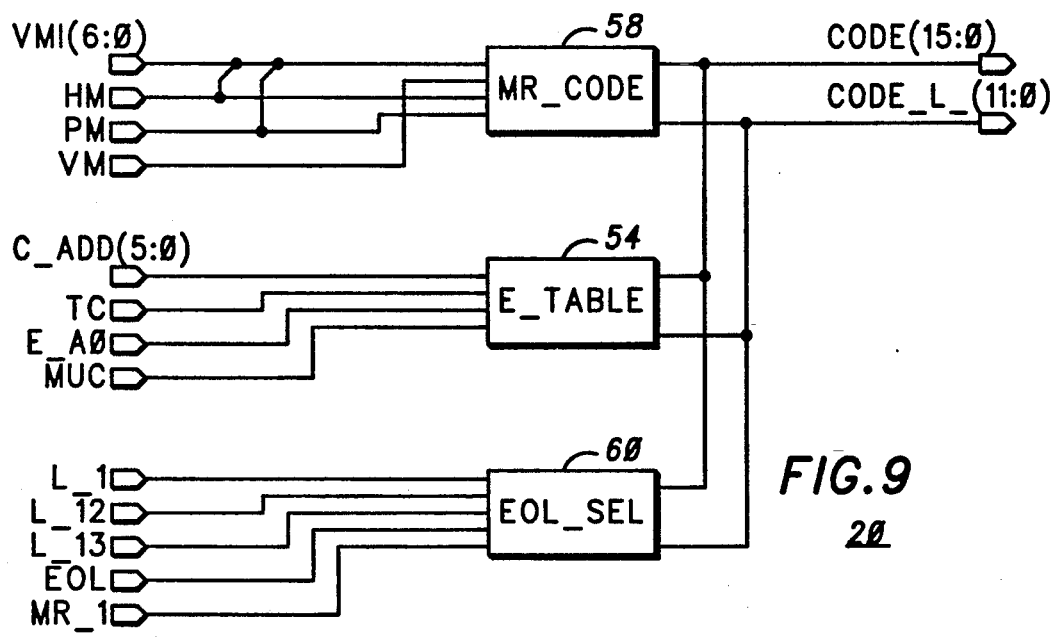
FIG. 9 is a schematic diagram of an encoder included in the unit of FIG. 2.

FIG. 7 is a schematic diagram of pel change detect registers (PCDR) 16. PCDR 16 include a line width register 38, illustrated schematically in FIG. 7A, a controller 40, illustrated schematically in FIG. 7B, and five pel change detect registers 42 through 46, illustrated schematically in FIGS. 7C through 7G, respectively. Line width register 38 keeps a continual count of the image data being shifted through PCDR 16 and provides a last byte signal to controller 40, as well as a last bit signal output by way of a flip-flop 48. Registers 42 and 43 are used in the MH encoding mode to look for color changes. After every shift of registers 42 and 43 the image data is checked for a color change. Each time a color change occurs a signal is supplied to ASM 14. As previously stated, coding is performed on a line to line basis so that a single line is shifted through registers 42 and 43, after which ASM 14 starts the entire procedure again.

In the MR/MMR encoding modes a reference line of data is entered into registers 42 and 43 while the image data line to be coded is entered into registers 44, 45 and 46. Controller 40 controls registers 42 through 46 so that a complete reference data line and a complete image data line is shifted through the registers simultaneously. Color changes in both lines are compared and signals indicating the comparison are sent to VMI 26 and ASM 14.

Figure 8:
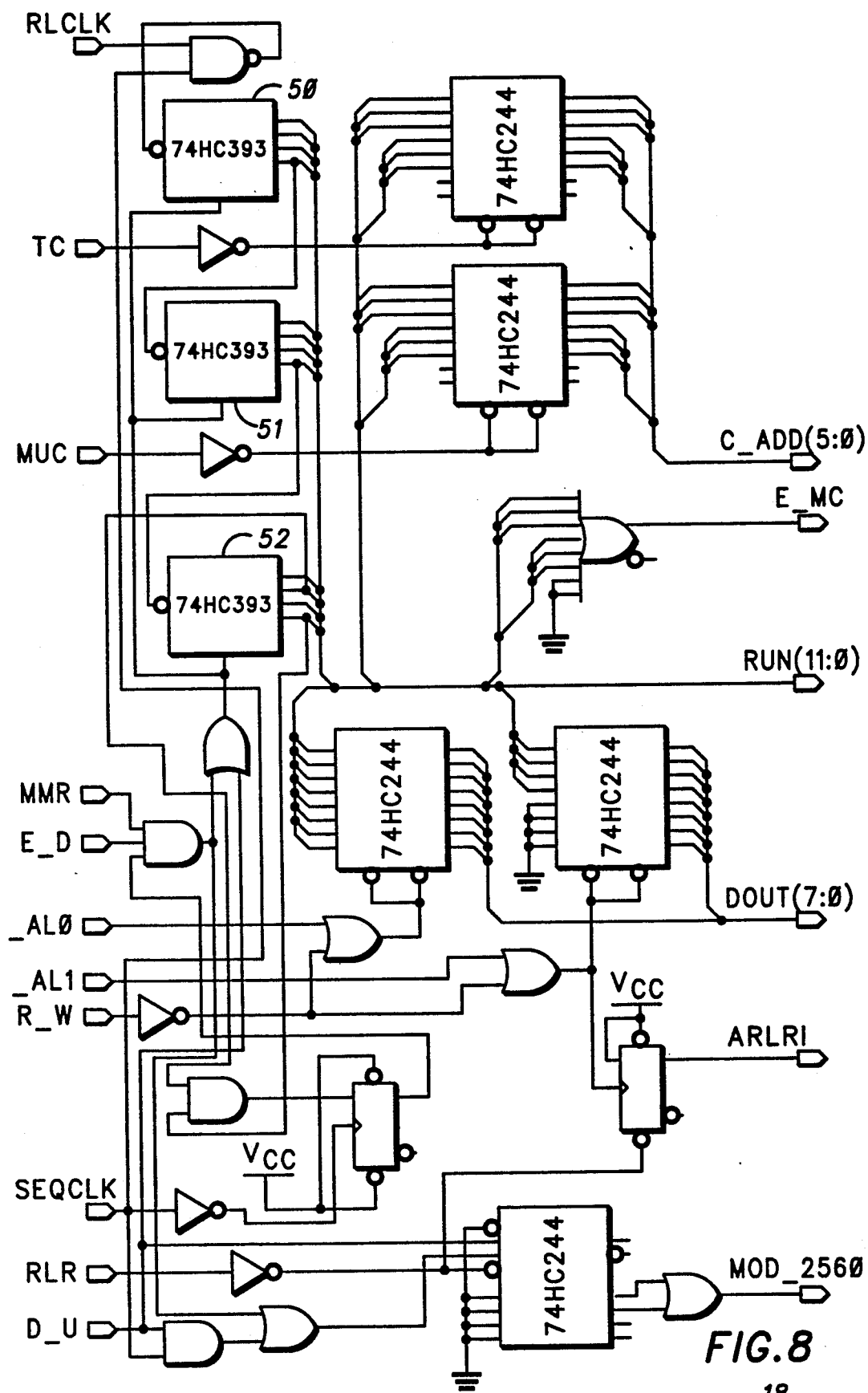
FIG. 8 is a schematic diagram of run length registers included in the unit of FIG. 2.

FIG. 8 is a schematic diagram of run length register 18, which simply includes three, four stage ripple counters 50, 51 and 52 connected in series, to provide the capability of counting an entire line in several different modes of operation (e.g. 1728 bit lines, 2560 bit lines, etc.). Run length register 18 receives clock signals, each of which is representative of a byte of image data, and begins counting the image data at the beginning of a line or after each color change. Run length register 18 stops counting at the occurrence of each color change (sensed by PCDR 16), in response to commands from ASM 14. A run length signal, indicative of the number of bytes of image data between adjacent color changes, is supplied by register 18 to encoder 20.

Figures 1, 9A:
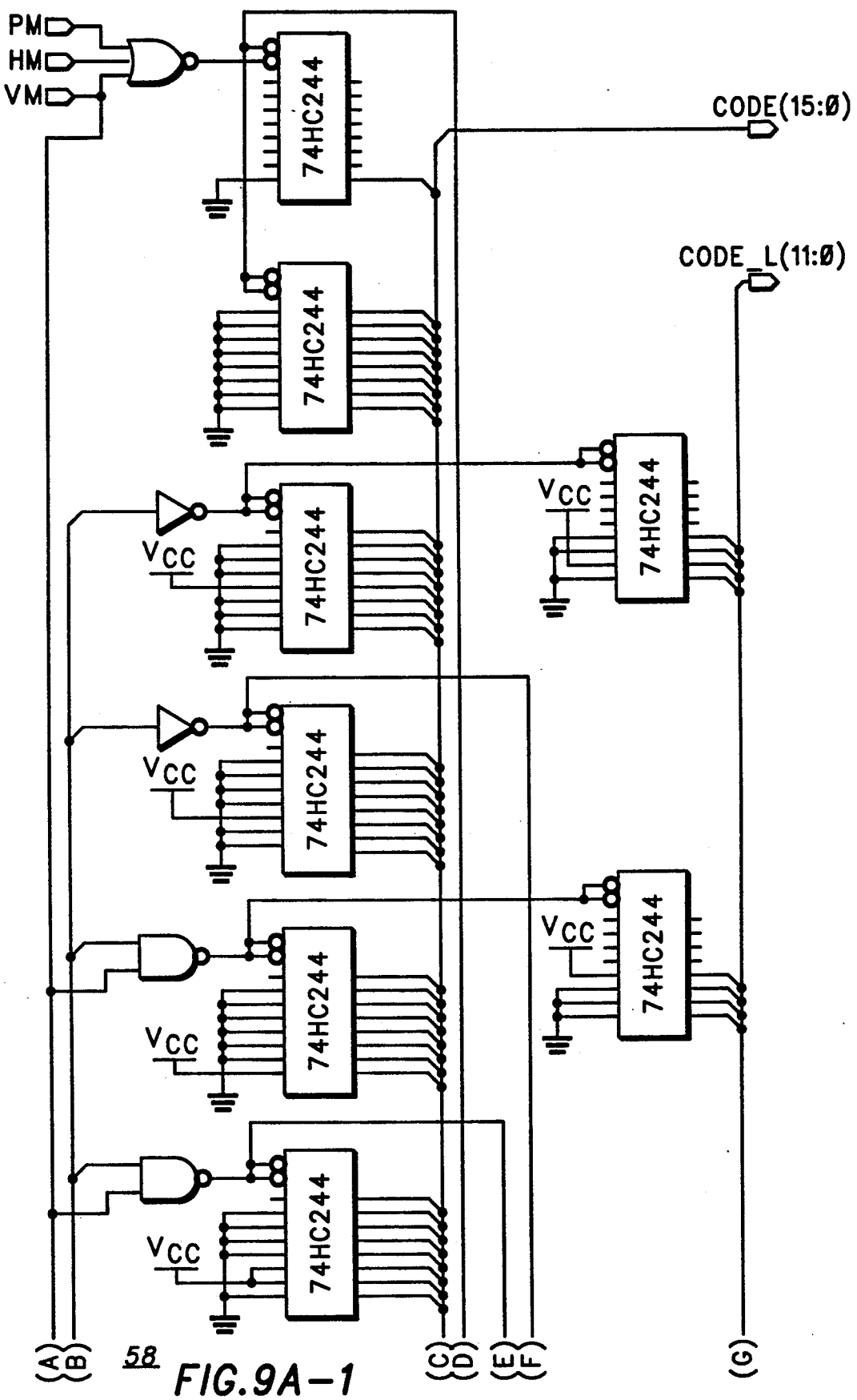
FIGS. 9A through 9C illustrate portions of FIG. 9 in more detail.
Figures 2, 9A:
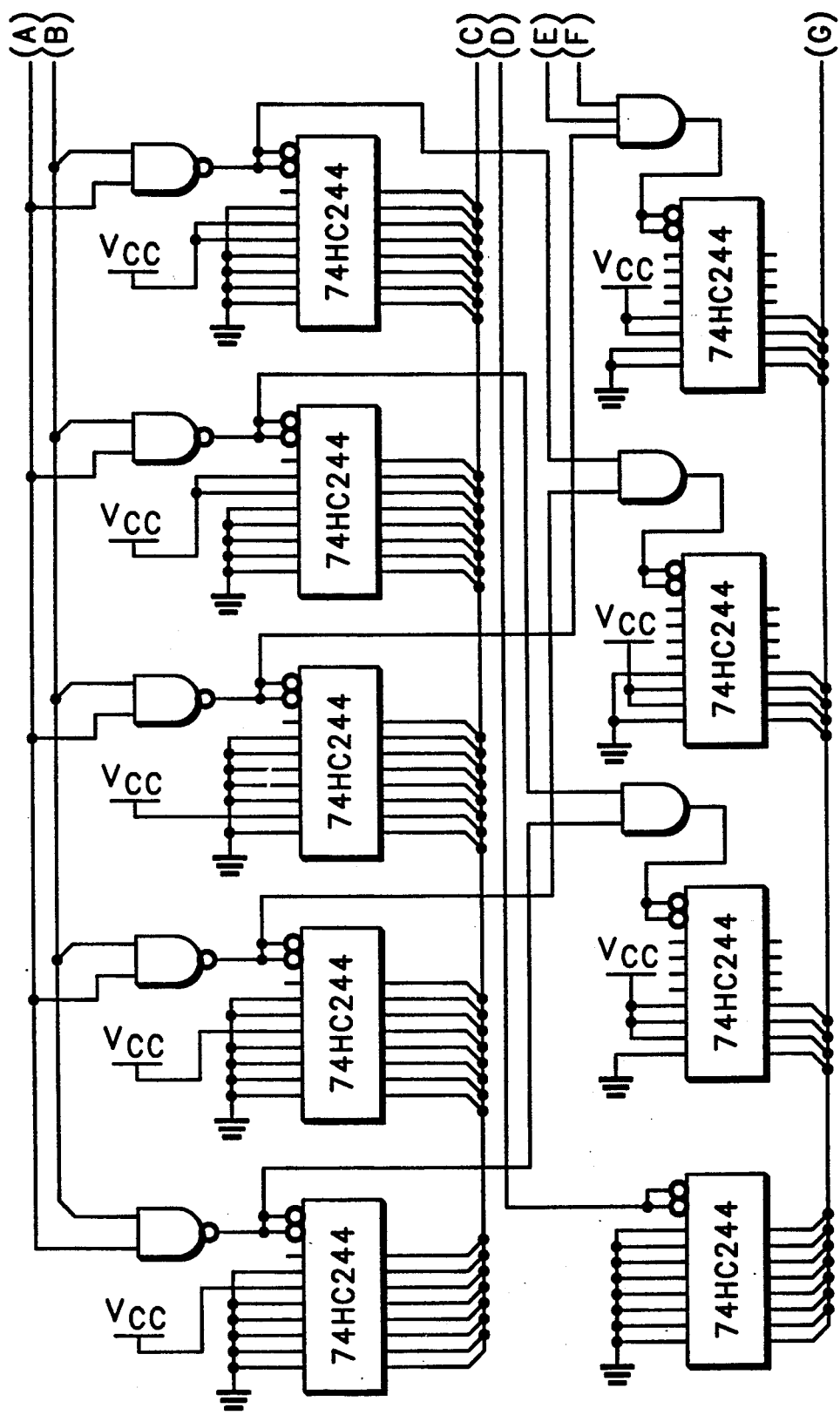
Figure 9B:
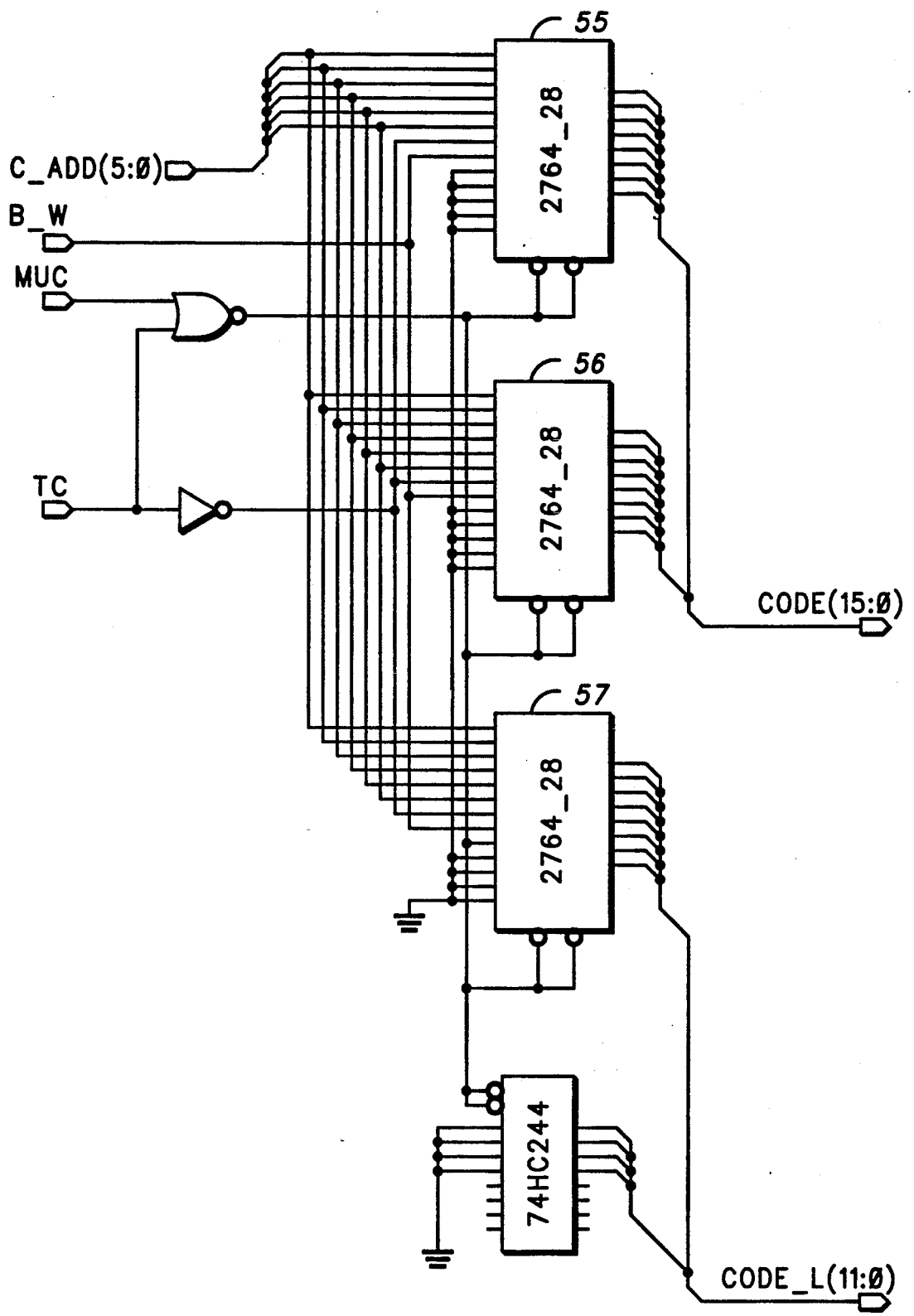

In the MH mode of operation the run length signal is supplied directly to an encoder look-up table 54, illustrated schematically in FIG. 9B. Look-up table 54 includes three EROMs 55, 56 and 57. Look-up table 54 contains the standard CCITT transmission codes and it is partitioned into two sections for storing the different white run lengths and black run lengths, which code is illustrated in TABLE I (FIG. 13) for convenience. Each run length signal is utilized to address the specific stored code word representing that run length and color, which addressed code word is then supplied from look-up table 54 to buffer 22. As can be seen from TABLE I, the code words vary in length from two to thirteen bits and an eight bit, length indicating word is generated in look-up table 54 to accompany the code word when it is supplied to buffer 22.

It should be noted that the present apparatus has a substantial advantage over prior art facsimile apparatus wherein all steps are performed in a dedicated CPU utilizing software to control the operations. In such a system only one step can be performed at a time. For example, the software must include a first step directing the CPU to determine the next color change and, after the first step is completed, a second step would direct a run length measurement between the color changes. In the present apparatus these two steps are performed virtually simultaneously, i.e. PCDR 16 and run length register 18 are operating simultaneously. Similarly, many of the other described circuits reduce the total coding and decoding time by at least partially operating in overlapping modes.

Encoder 20 also includes an MR code generator 58, which is illustrated schematically in FIG. 9A. In the MR coding scheme, the first image data line is encoded using the MH coding scheme and subsequent image data lines are compared to the previous line. Thus, the MR scheme is a two dimensional scheme that simultaneously compares a reference line and an image data line. A code is then generated which is a mixture of MH coding and a description of the differences so that a duplicate of the reference line can be generated and changed to match the encoded line during decoding. The MR codes are specifically designed to let the decoder know that a MH or MR code is being sent. Thus, the decoder only needs to be controlled to operate in the MH or MR coding scheme.

The CCITT has carefully defined various differences, or modes, between the reference and data lines in the MR coding scheme. These include: seven vertical modes including V(0)—no changes, VL(1)—one change to the left, VL(2)—two changes to the left, VL(3)—three changes to the left, VR(1)—one change to the right, VR(2)—two changes to the right, and VR(3)—three changes to the right;.a pass mode wherein there is a color change on both ends of the reference line; and a horizontal mode wherein the color change differences between the data line and the reference line are greater than those specified above. The code words that represent these various modes are listed below:

| | |
|---|---|
| pass | 0001 |
| horizontal | 001 + MH code |
| vertical V(0) | 1 |
| vertical $V_R(1)$ | 011 |
| vertical $V_R(2)$ | 000011 |
| vertical $V_R(3)$ | 0000011 |
| vertical $V_L(1)$ | 010 |
| vertical $V_L(2)$ | 000010 |
| vertical $V_L(3)$ | 0000010 |

Figure 9C:
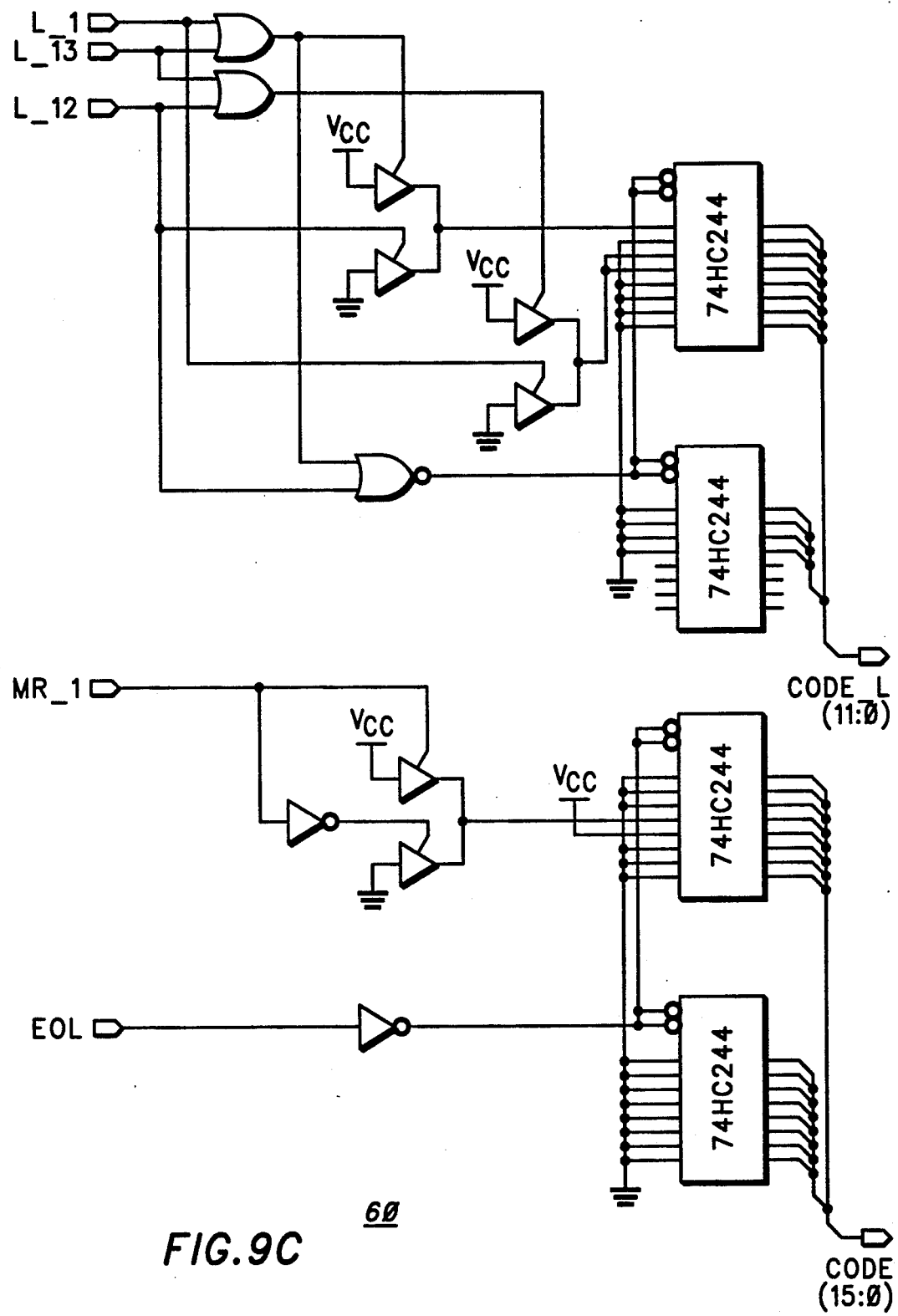

At the end of each line, or the beginning of each new line, a special EOL code is generated so that a decoder can recognize the end of the line and prepare to receive a new line of image data. The EOL code is again dictated by the CCITT so that all facsimile apparatus can recognize it. In the present apparatus an EOL generator 60, illustrated schematically in FIG. 9C, is included in encoder 20. The EOL code is sent to buffer 22 with the other information from encoder 20.

Figure 10:
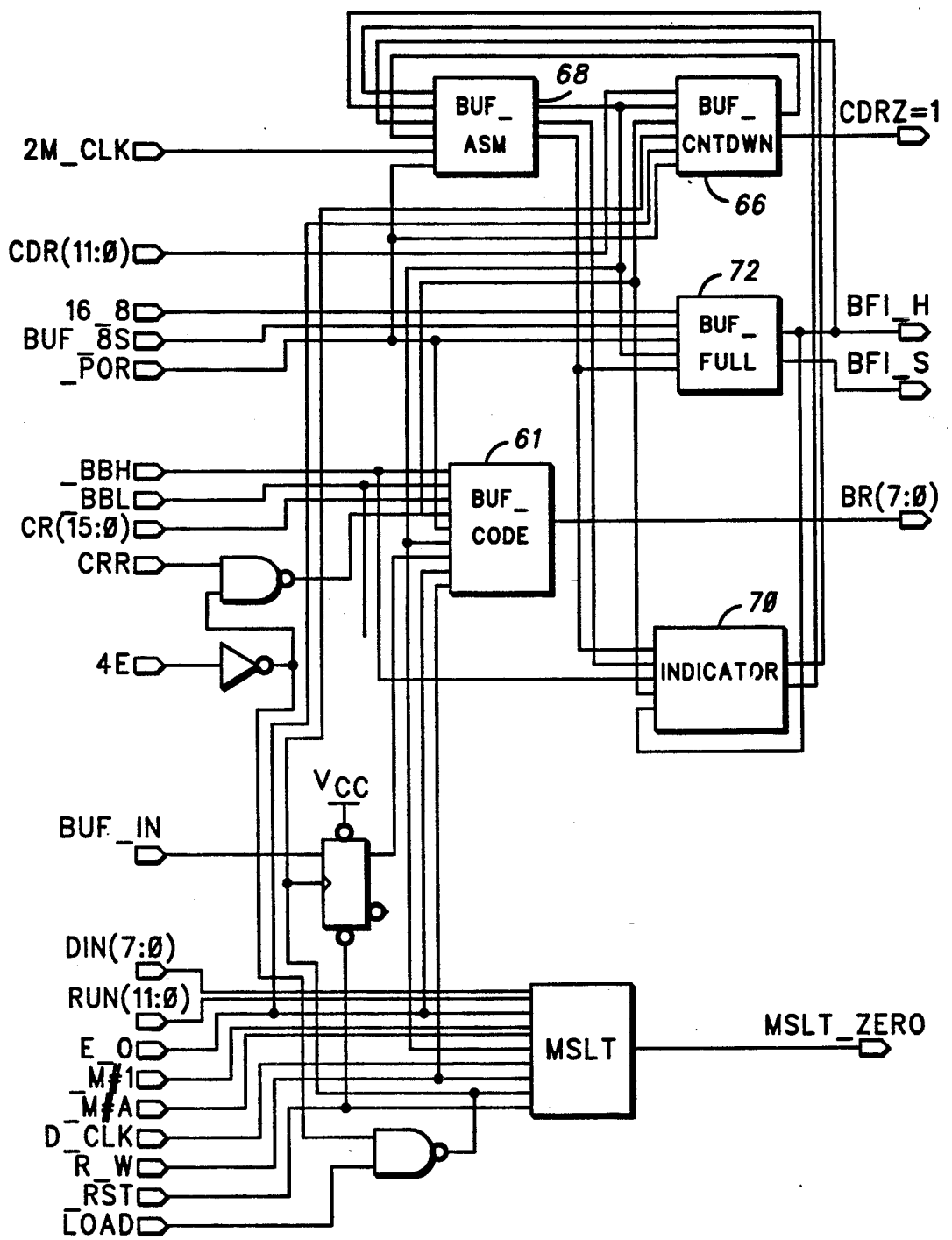
FIG. 10 is a schematic diagram of an output buffer included in the unit of FIG. 2.

Referring specifically to FIG. 10, output buffer 22 is illustrated schematically. It should be noted that the image data and the operation of unit 10, through encoder 20, are bit oriented so that output logic is used to generate an output in byte format. As an example, in the one dimensional MH coding scheme, code words representing all, or a portion, of a specific black or white run length vary from two to thirteen bits in length, as can be seen from TABLE I. However, the bus carrying data from encoder 20 to output buffer 22 is sixteen lines, for convenience. Buffer 22 can be controlled to arrange the data into eight or sixteen bit bytes. Therefore, when arranging the code words into bytes it is necessary to take empty lines into account. Output buffer 22 performs the function of receiving the encoded data from encoder 20, along with the eight bit length indicating words, and arranging the coded data into eight or sixteen bit bytes that can be sent out on the data bus.****

Figure 10A:
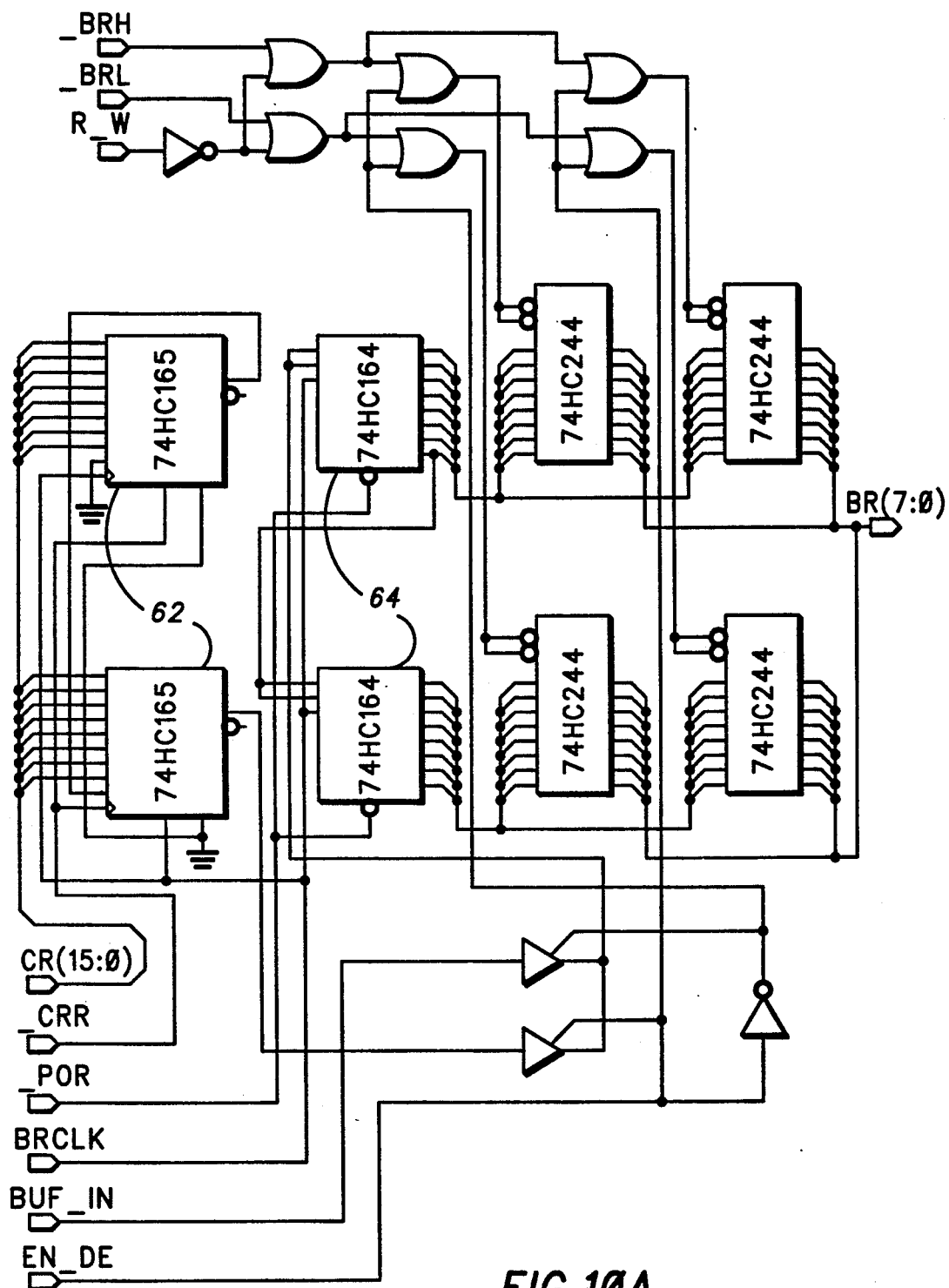
Figure 10B:
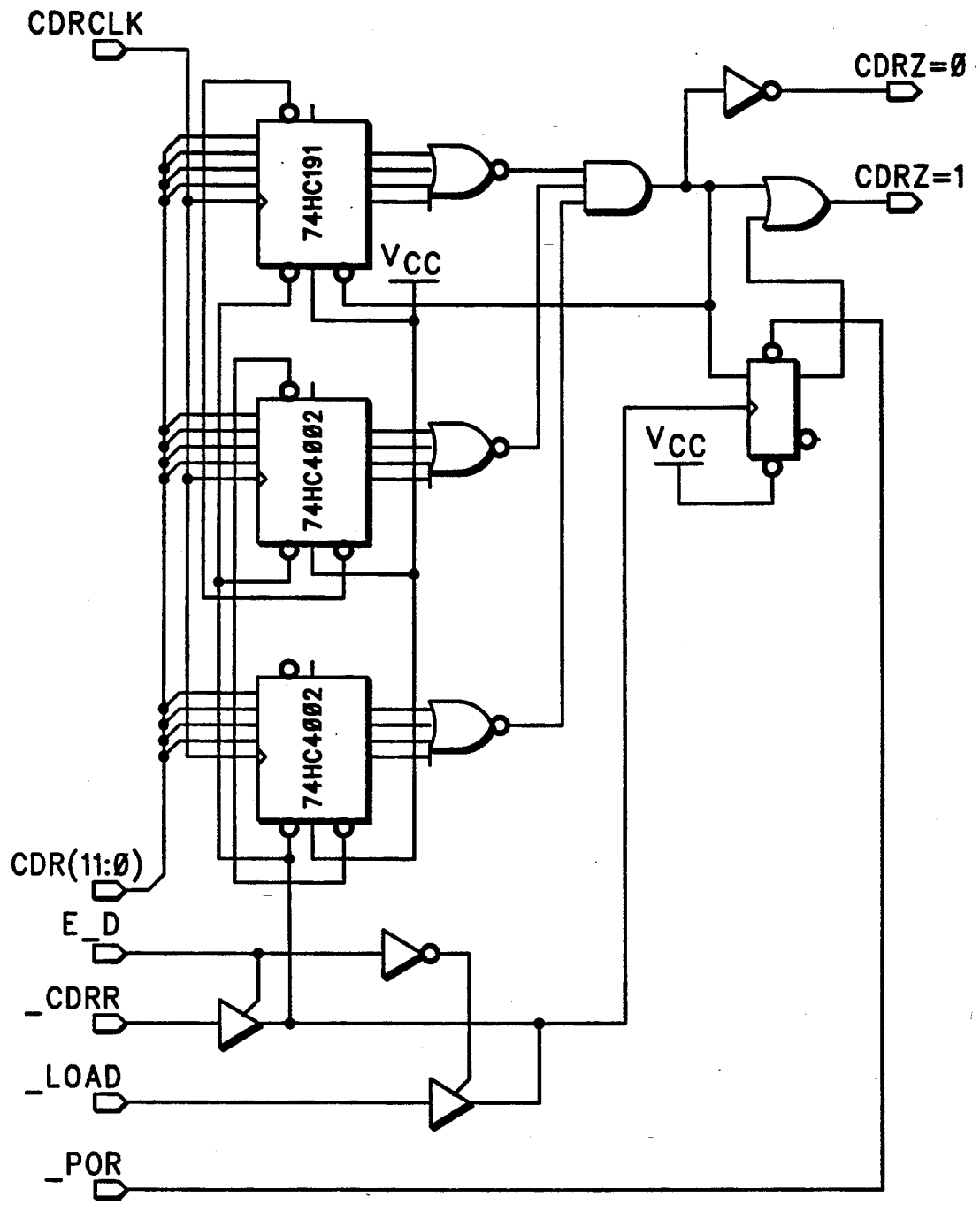
Figure 10C:
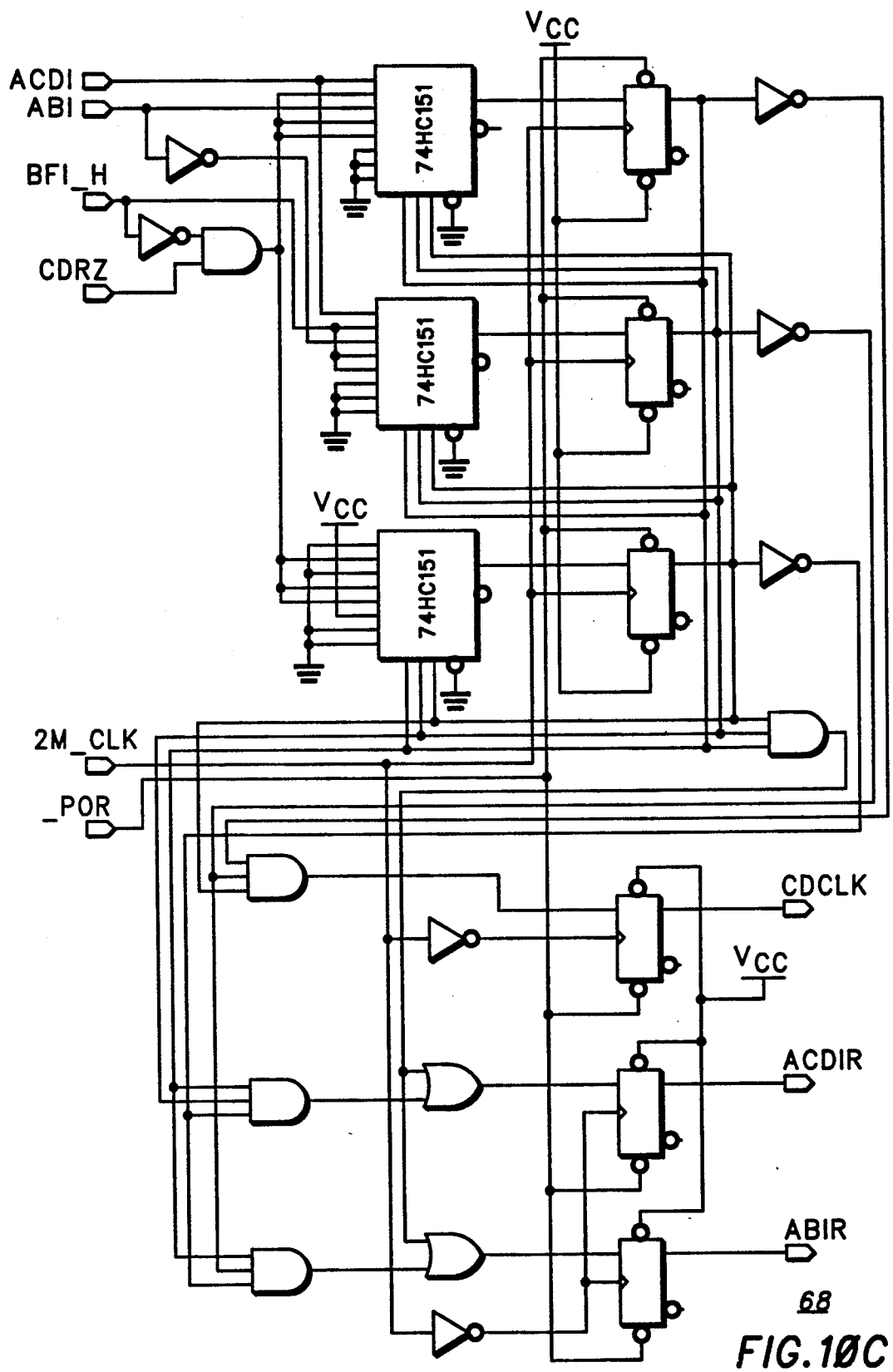
Figure 10D:
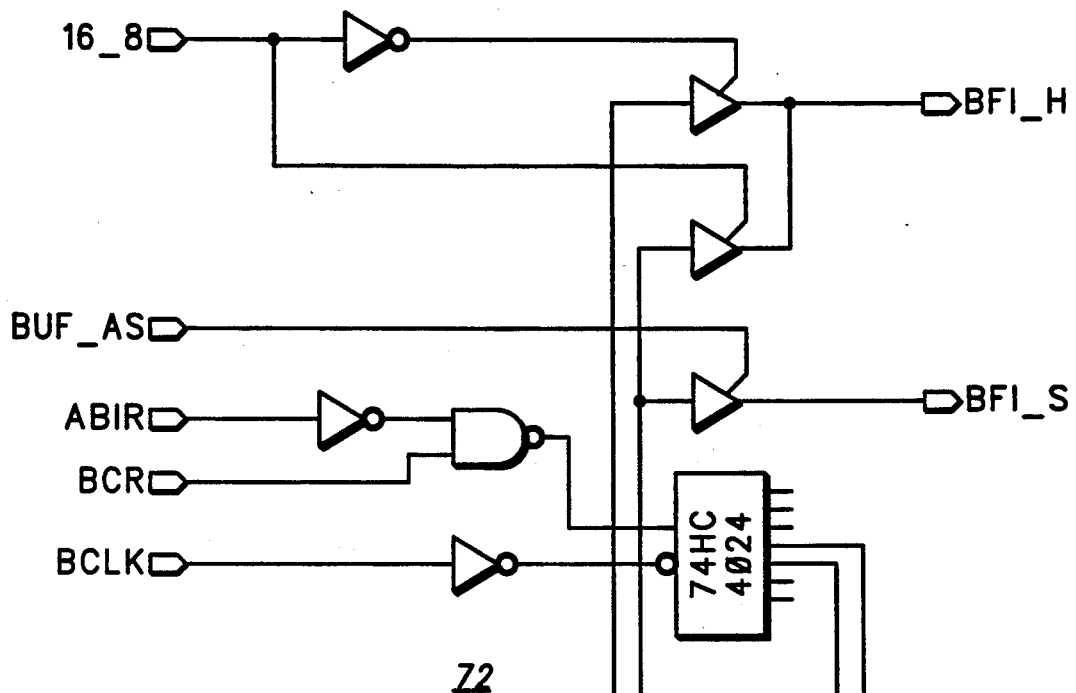
Figure 10F:
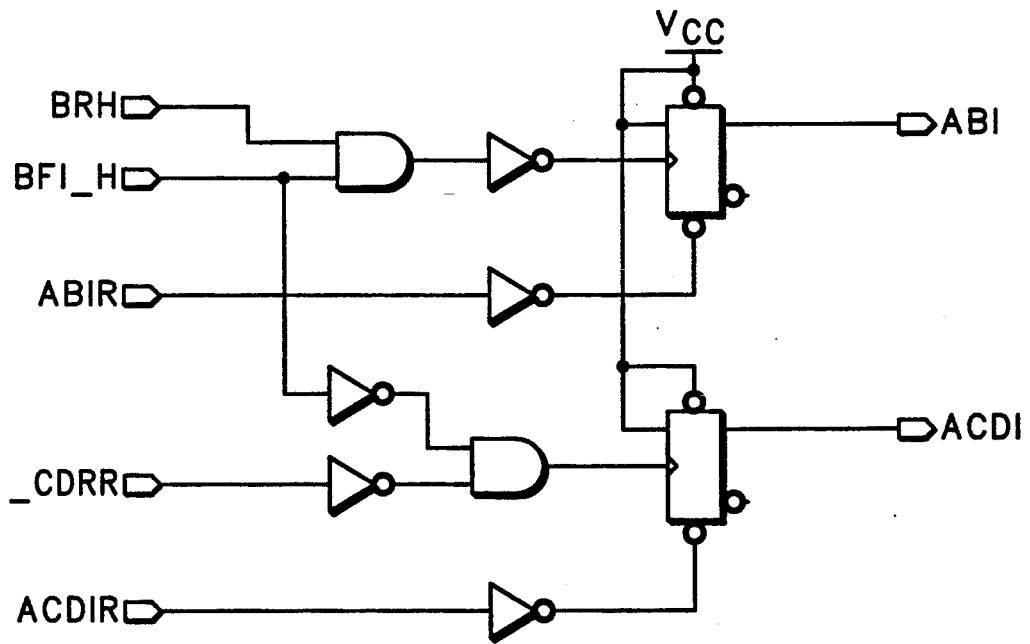

Output buffer 22 includes a block entitled "buf code" 61, which is illustrated in more detail in FIG. 10A. Referring to FIG. 10A, a parallel input/serial output shift register 62 which supplies bits to a serial input/parallel output shift register 64 is illustrated. The eight bit, length indicating word, which accompanies each code word generated in encoder 20, is used to preset a countdown register 66. The sixteen bits containing the code word are first loaded into shift register 62 and then clocked into shift register 64 as countdown register 66 begins counting. Output buffer 22 can be set to operate on eight or sixteen bit bytes. In the present description, eight bit bytes are explained for example only but it will be understood that operation in the sixteen bit mode is essentially similar. If countdown register 66 reaches zero before the output of shift register 64 becomes an eight bit byte, the next code word is shifted into register 62 and countdown register 66 is preset with the next accompanying length indicating word. If the output of shift register 64 becomes an eight bit byte before countdown register 66 reaches zero, any additional bits contained in the code word in shift register 62 will be included in the next eight bit byte. Output buffer 22 also includes an ASM 68, an indicator 70 and a buffer full register 72 to control the operation and timing of the flow of information.

Figures 1, 11:
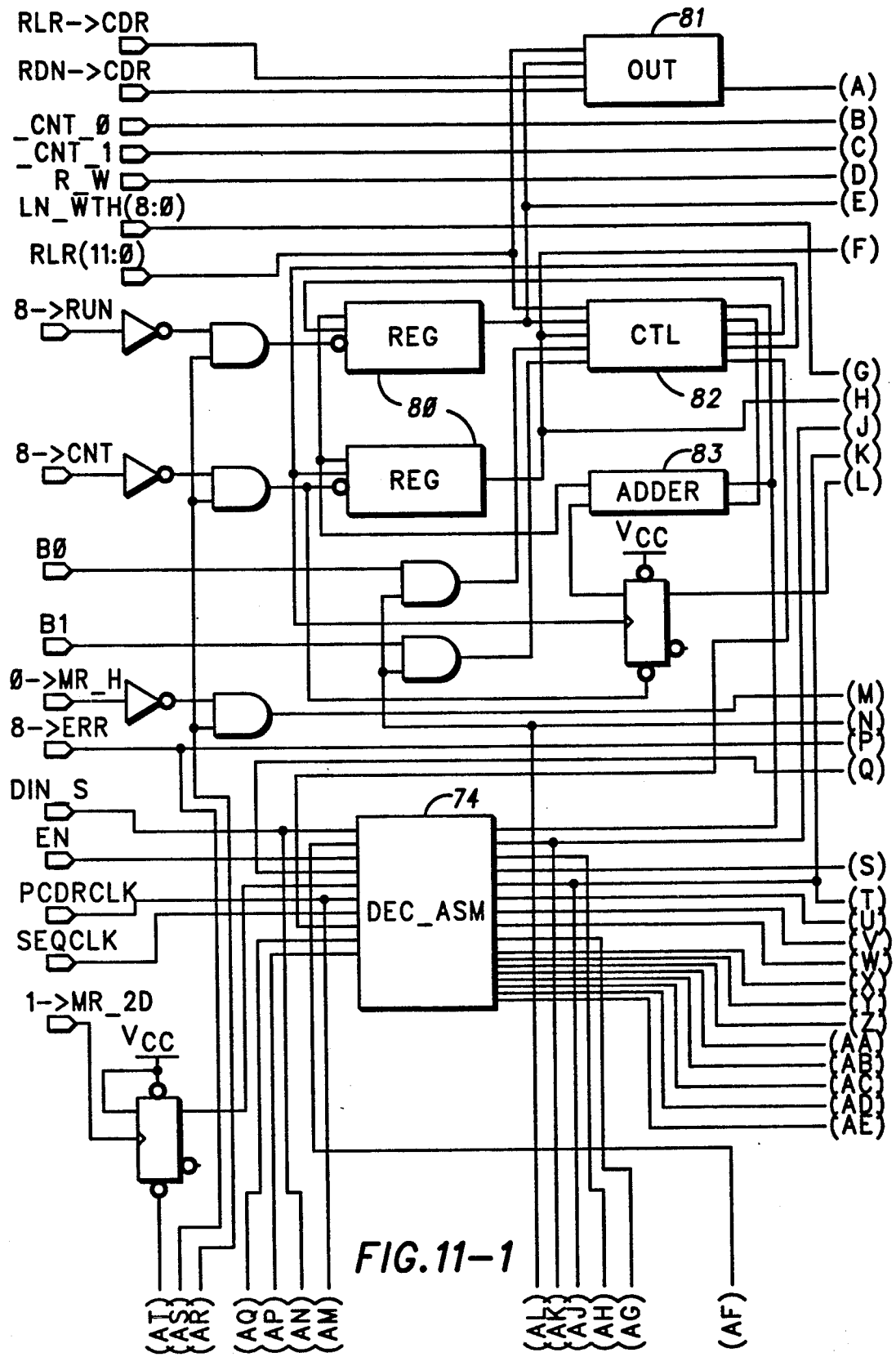
Figures 2, 11:
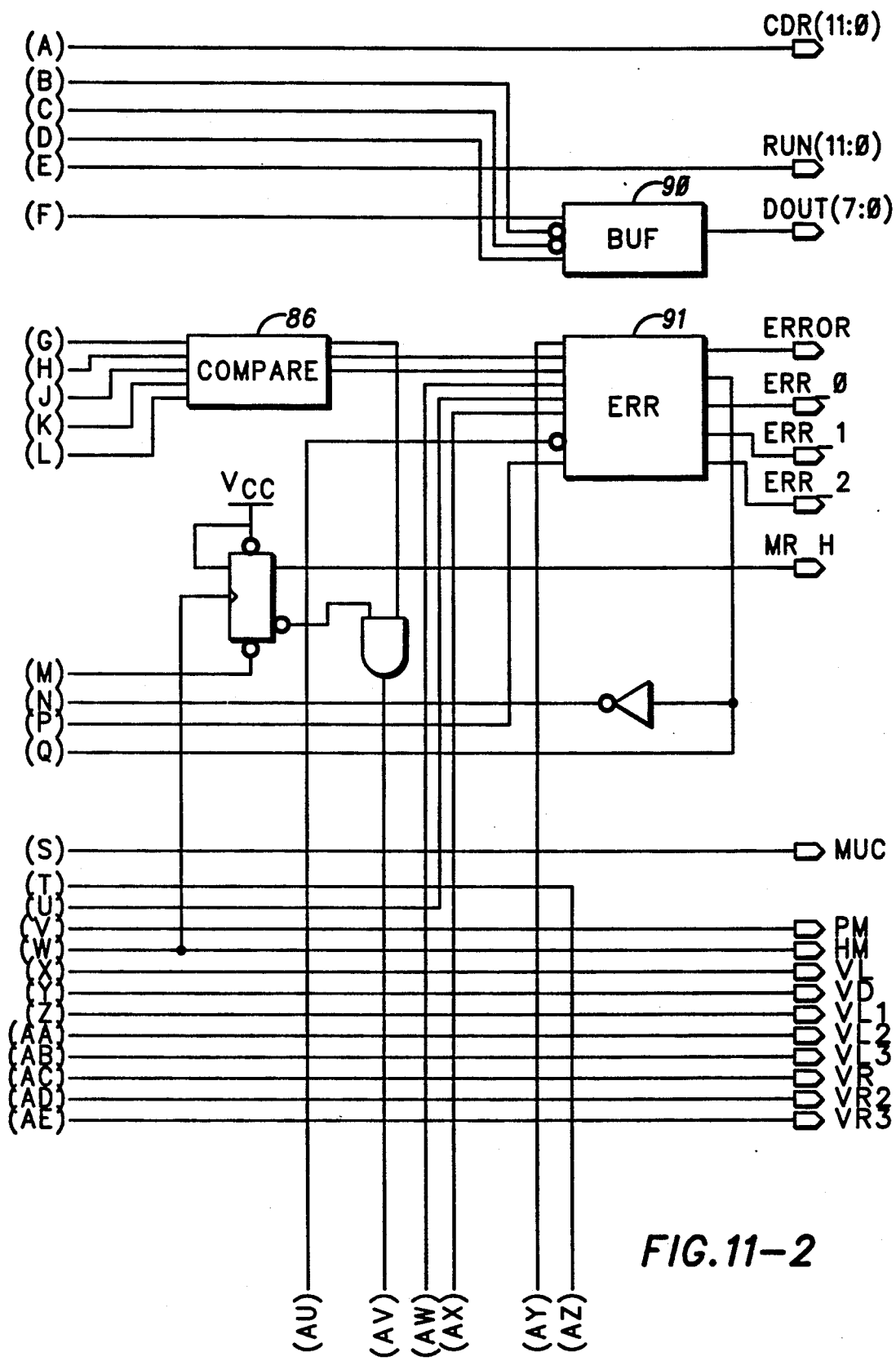
Figures 3, 11:
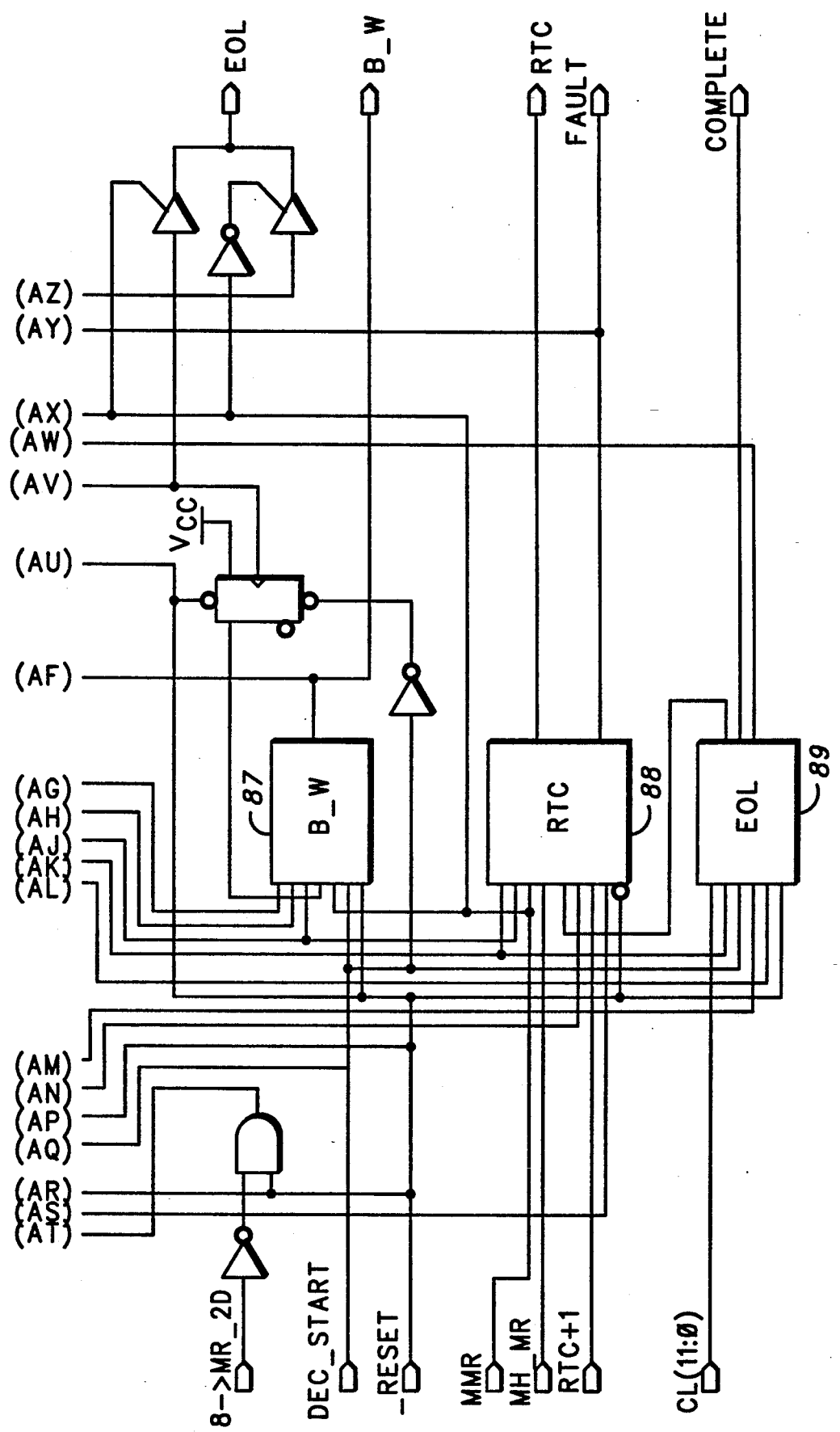
Figure 11A:
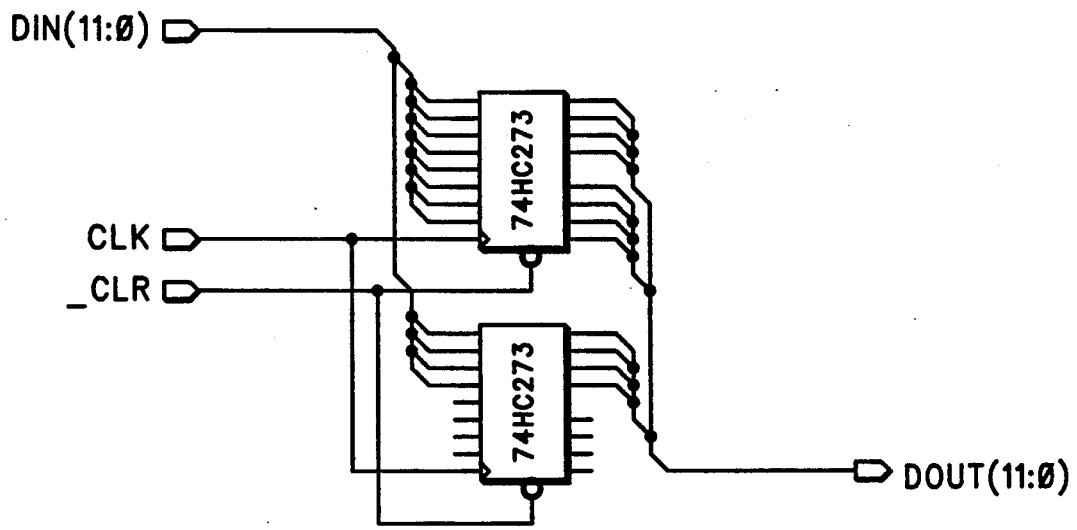
Figure 11B:
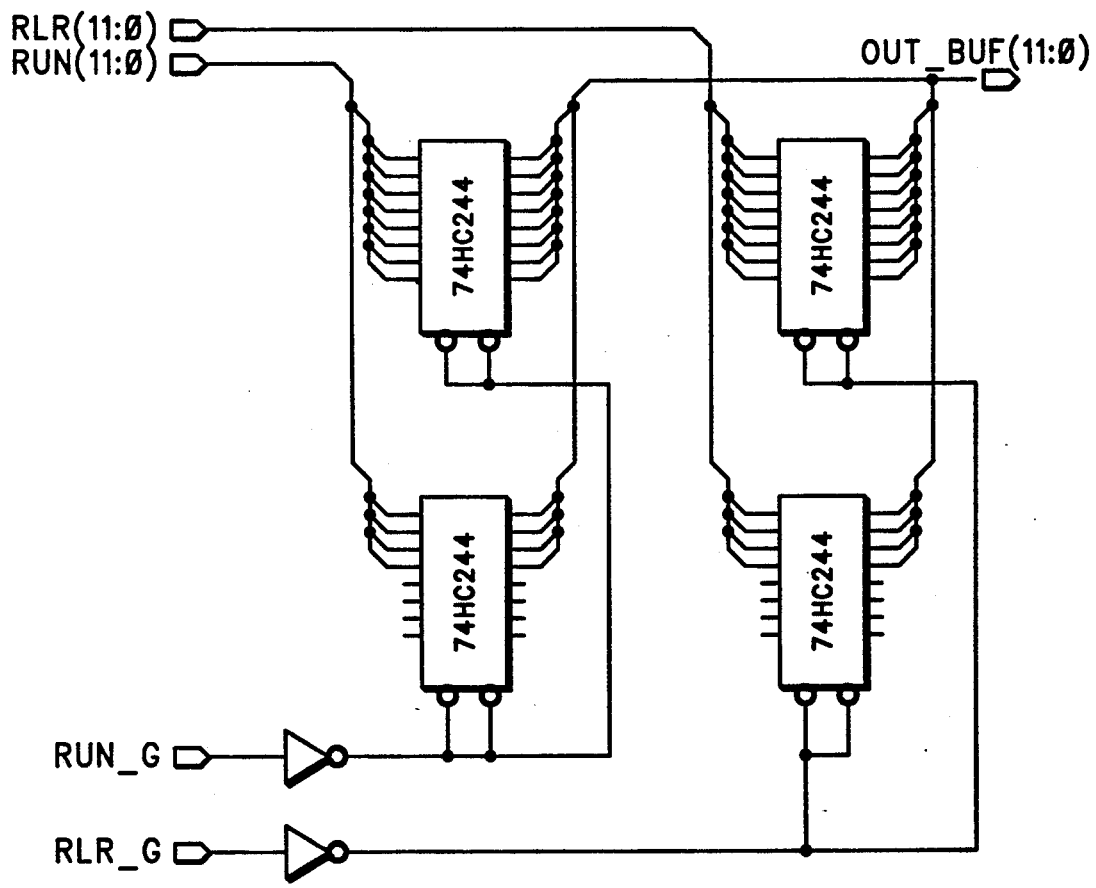
Figure 11C:
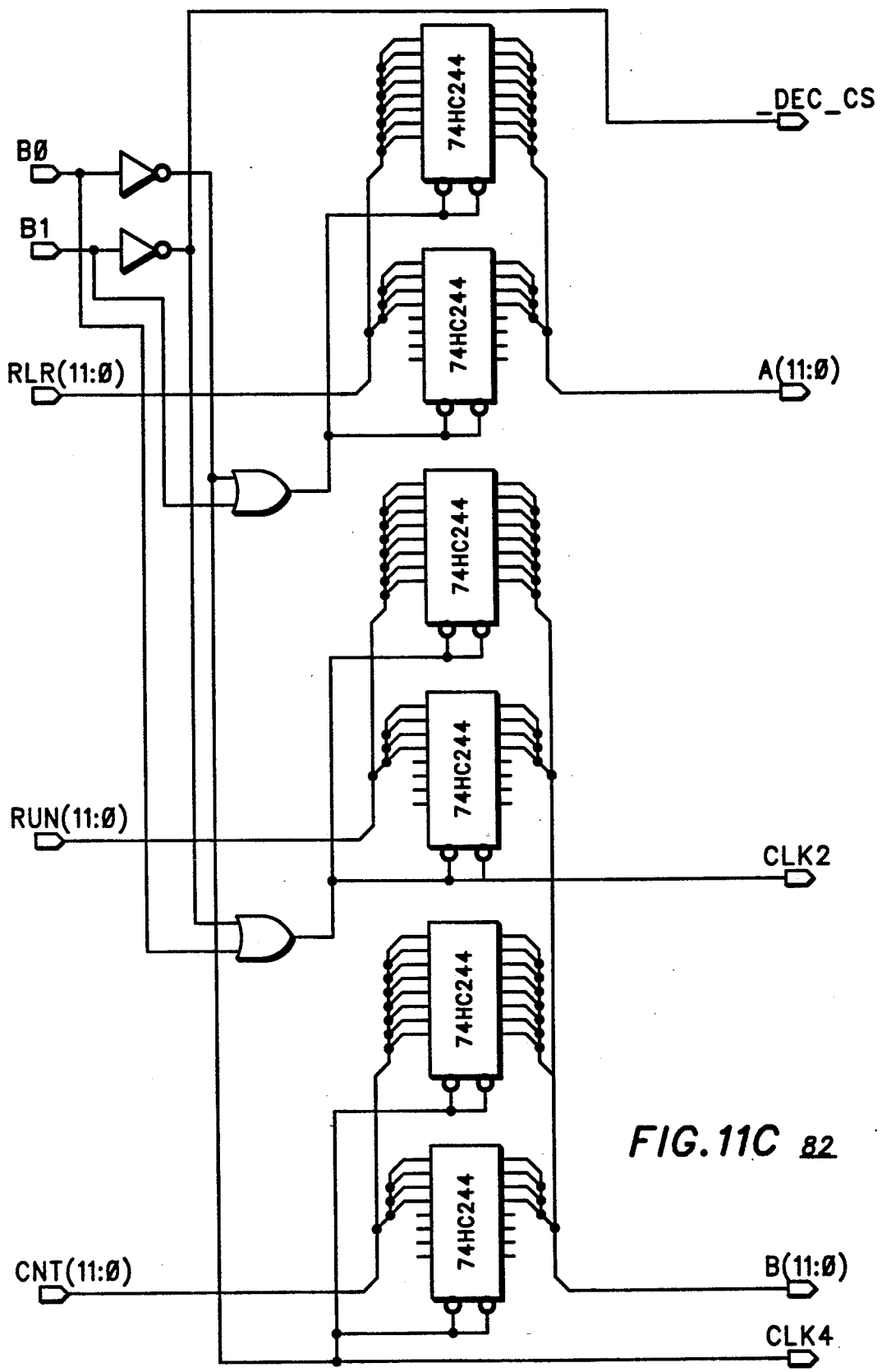
Figure 11E:
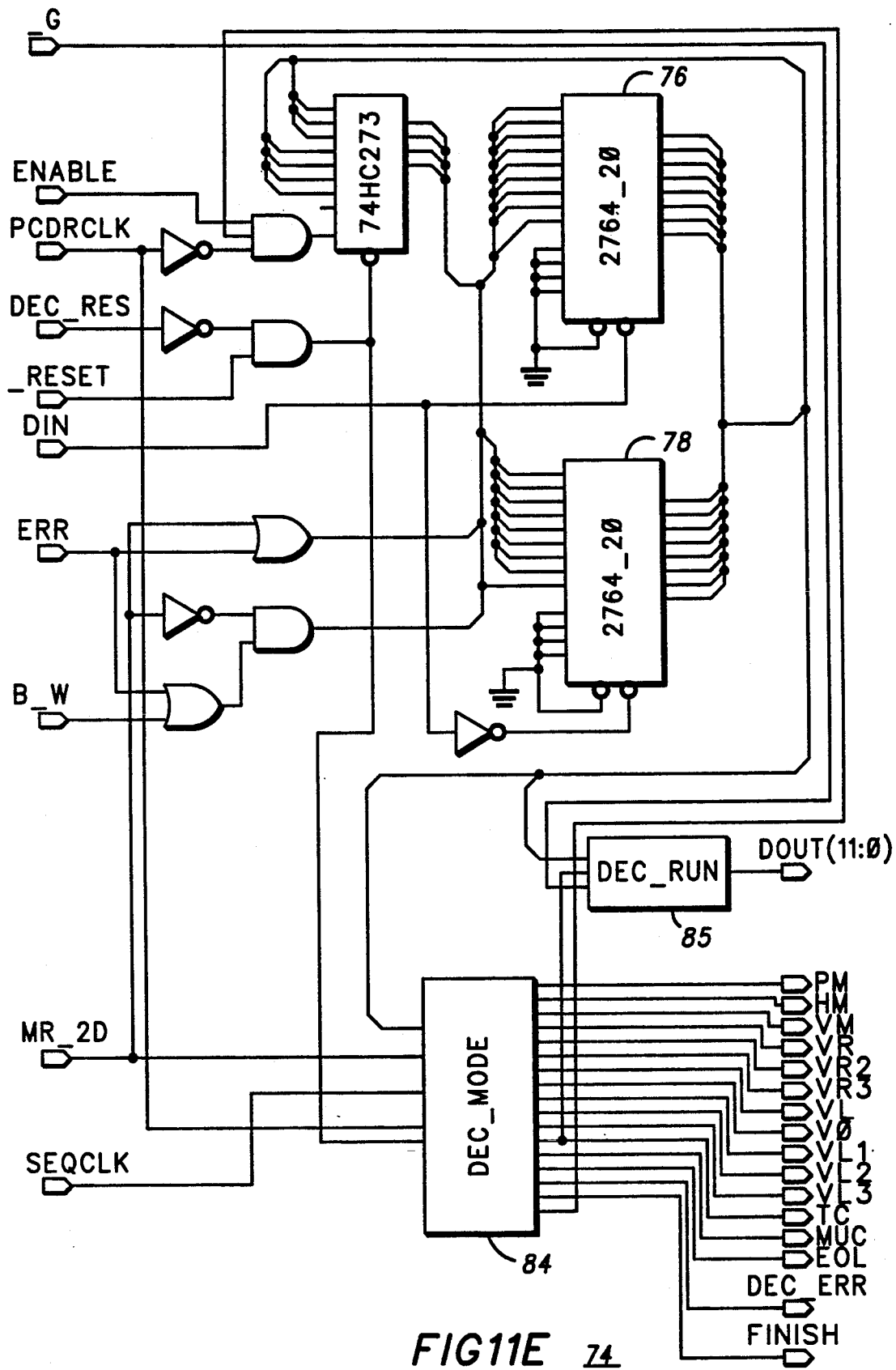
Figure 11F:
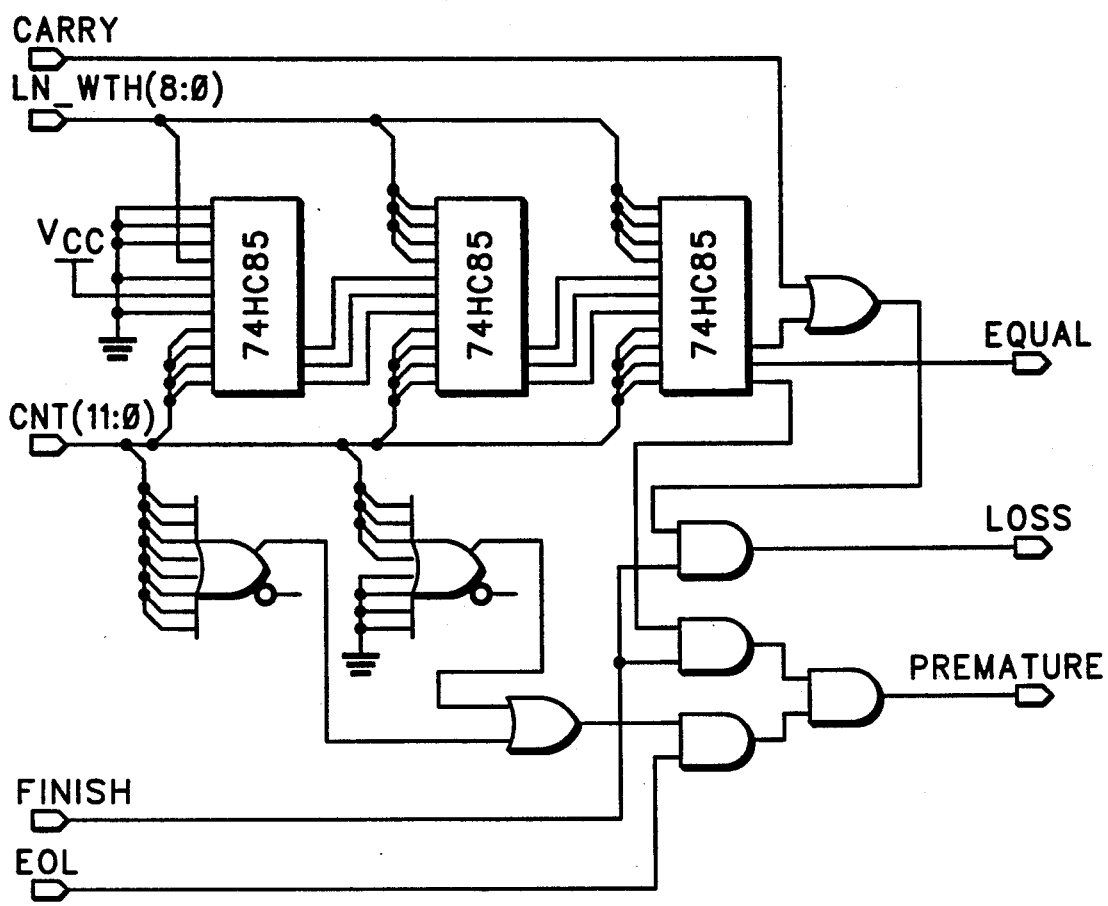
Figure 11G:
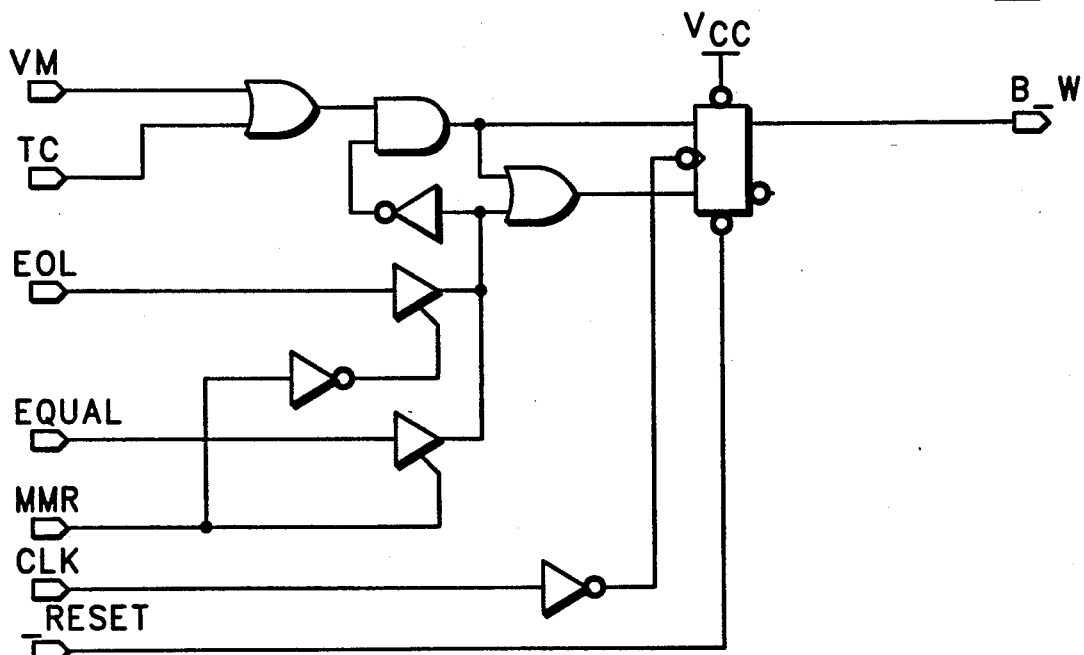
Figure 11H:
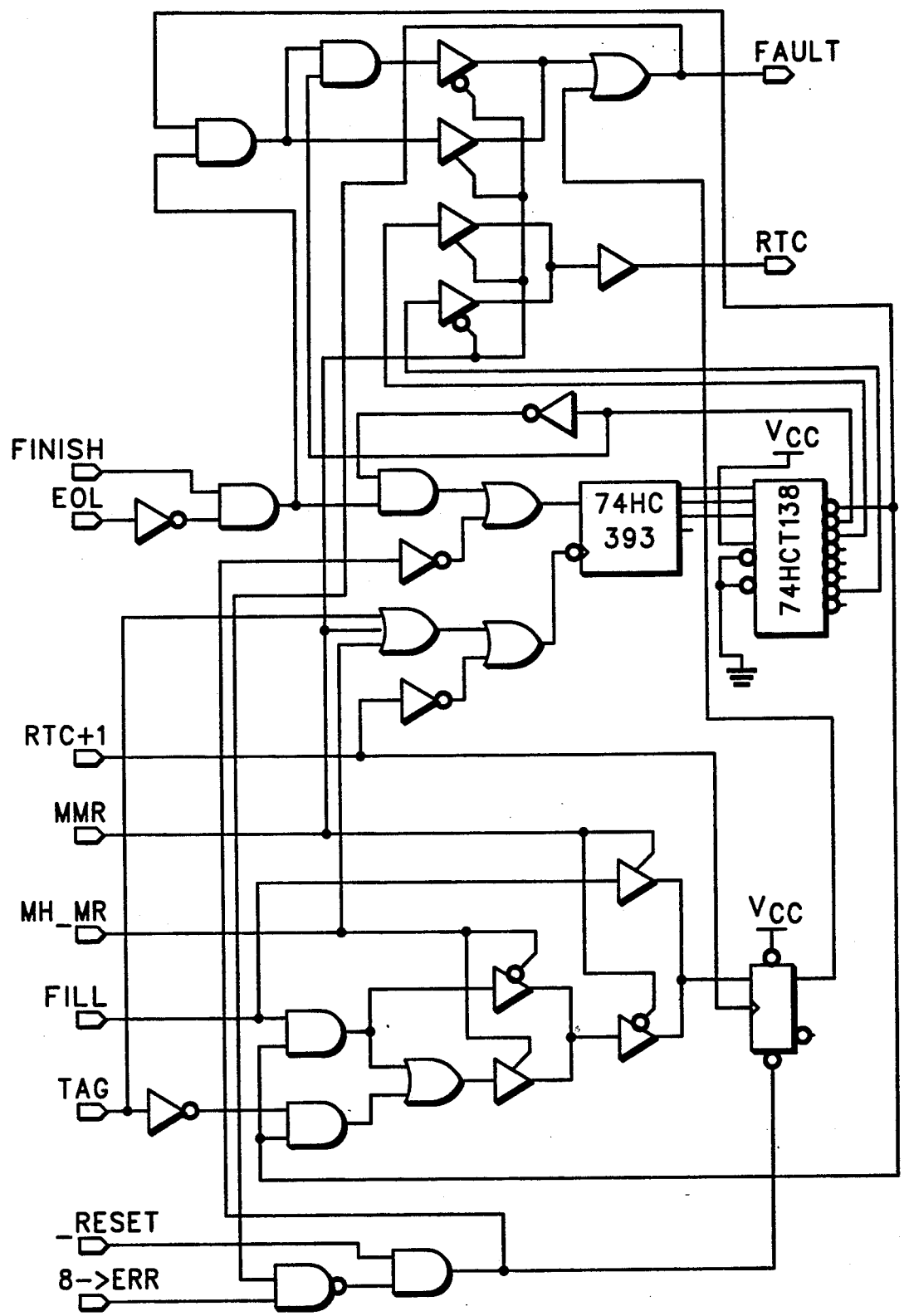
Figure 11J:
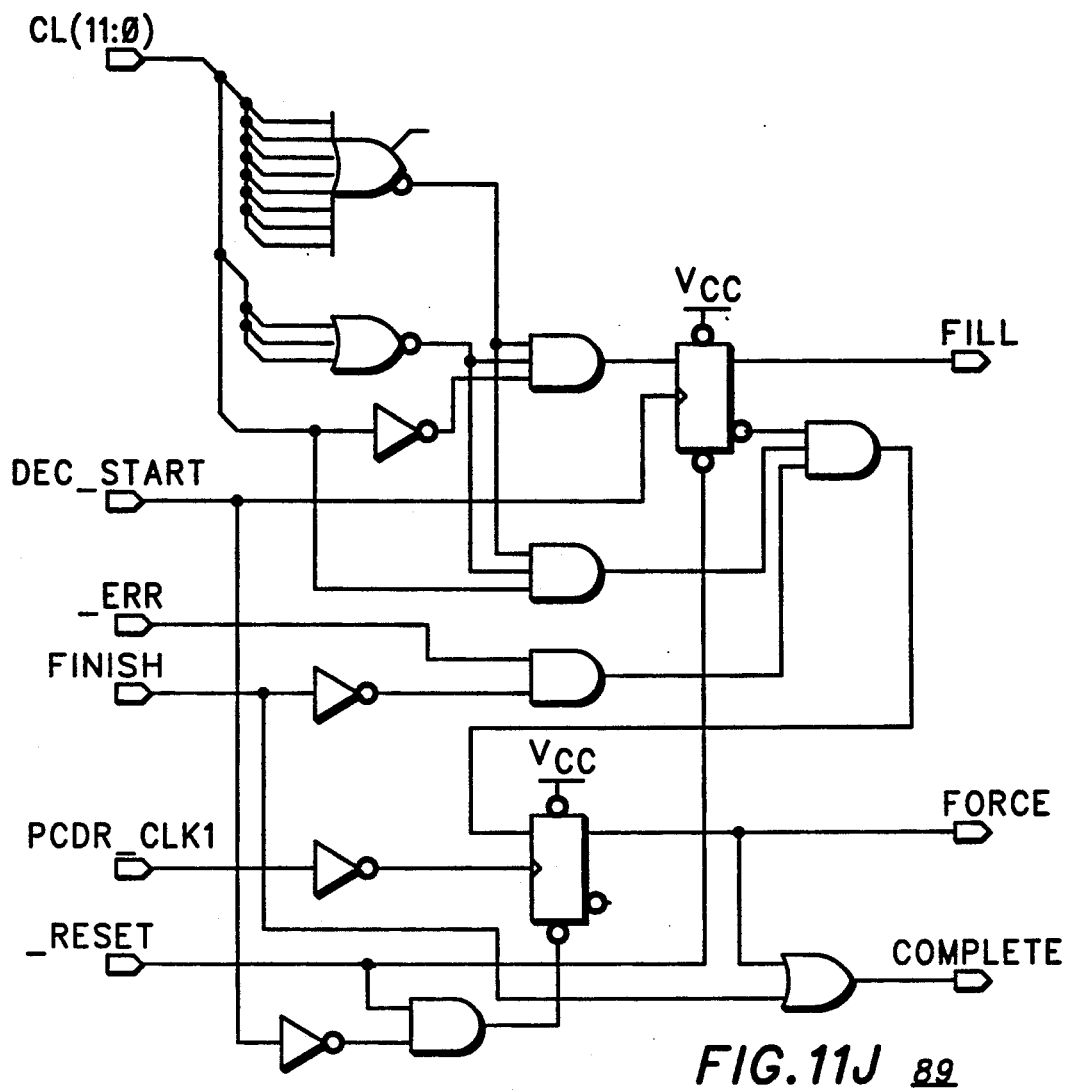
Figure 11K:
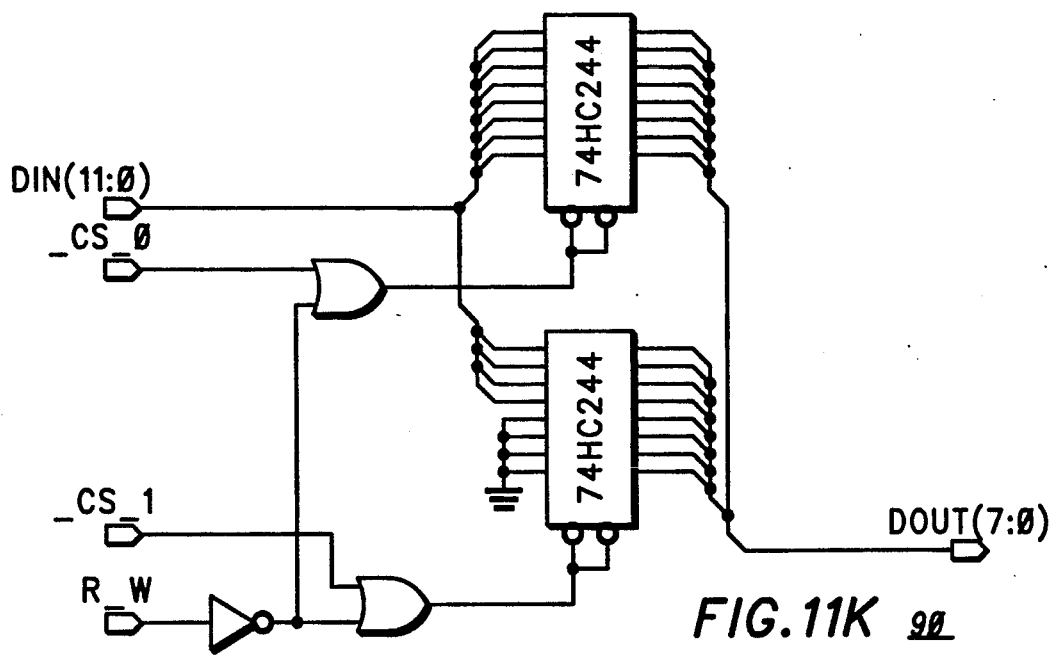
Figure 11L:
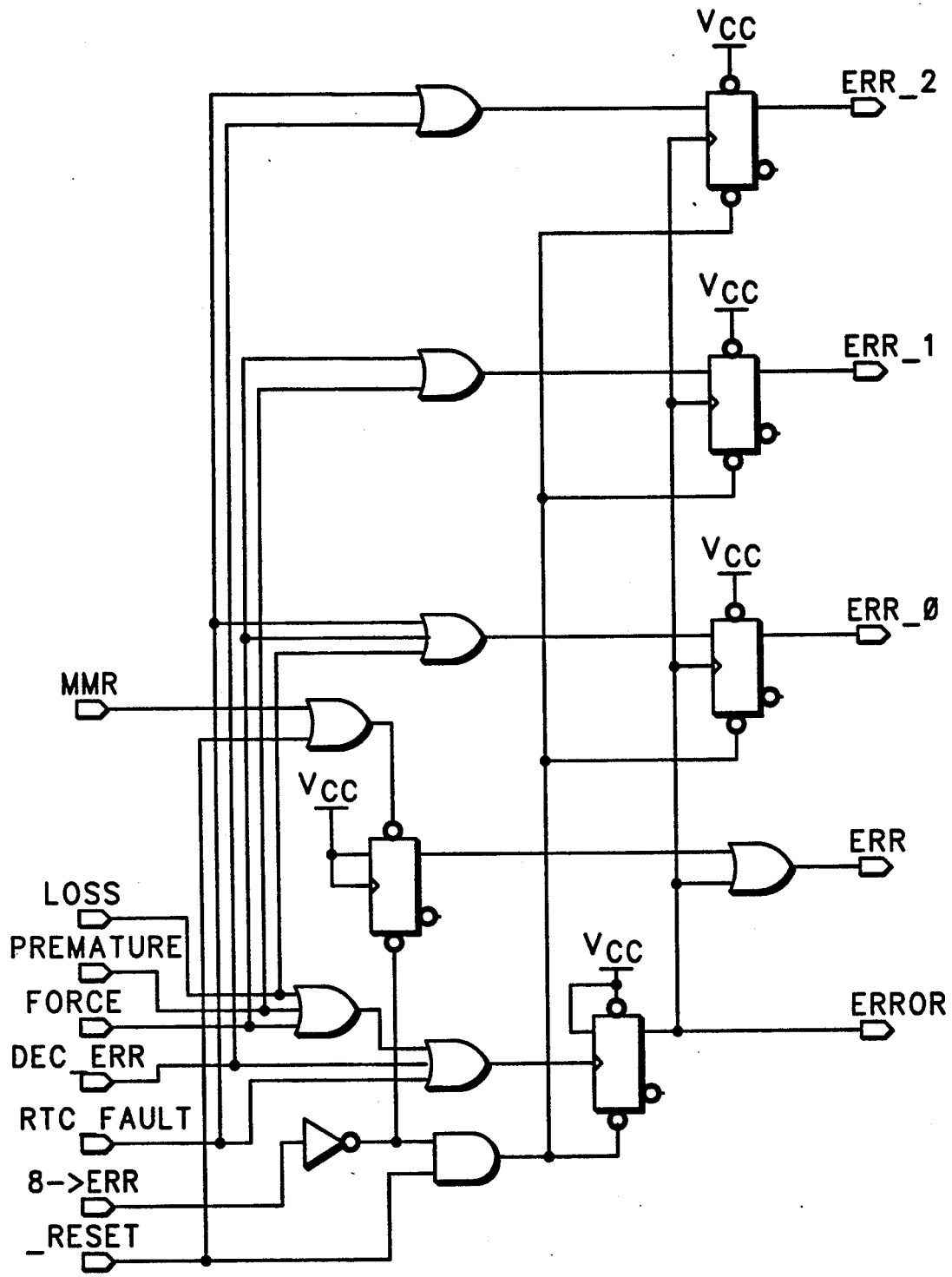
Figures 1, 12:
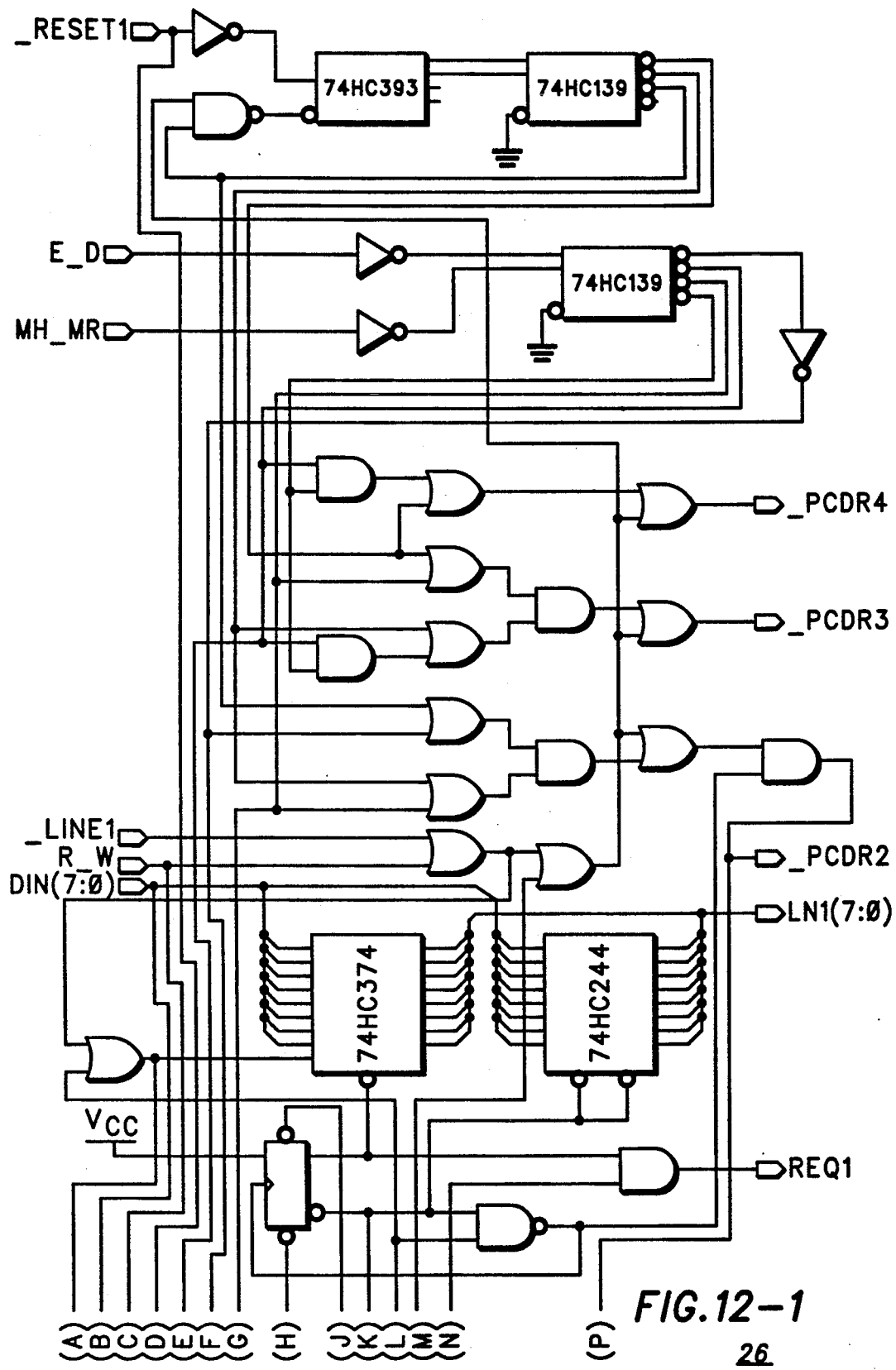
Figures 2, 12:
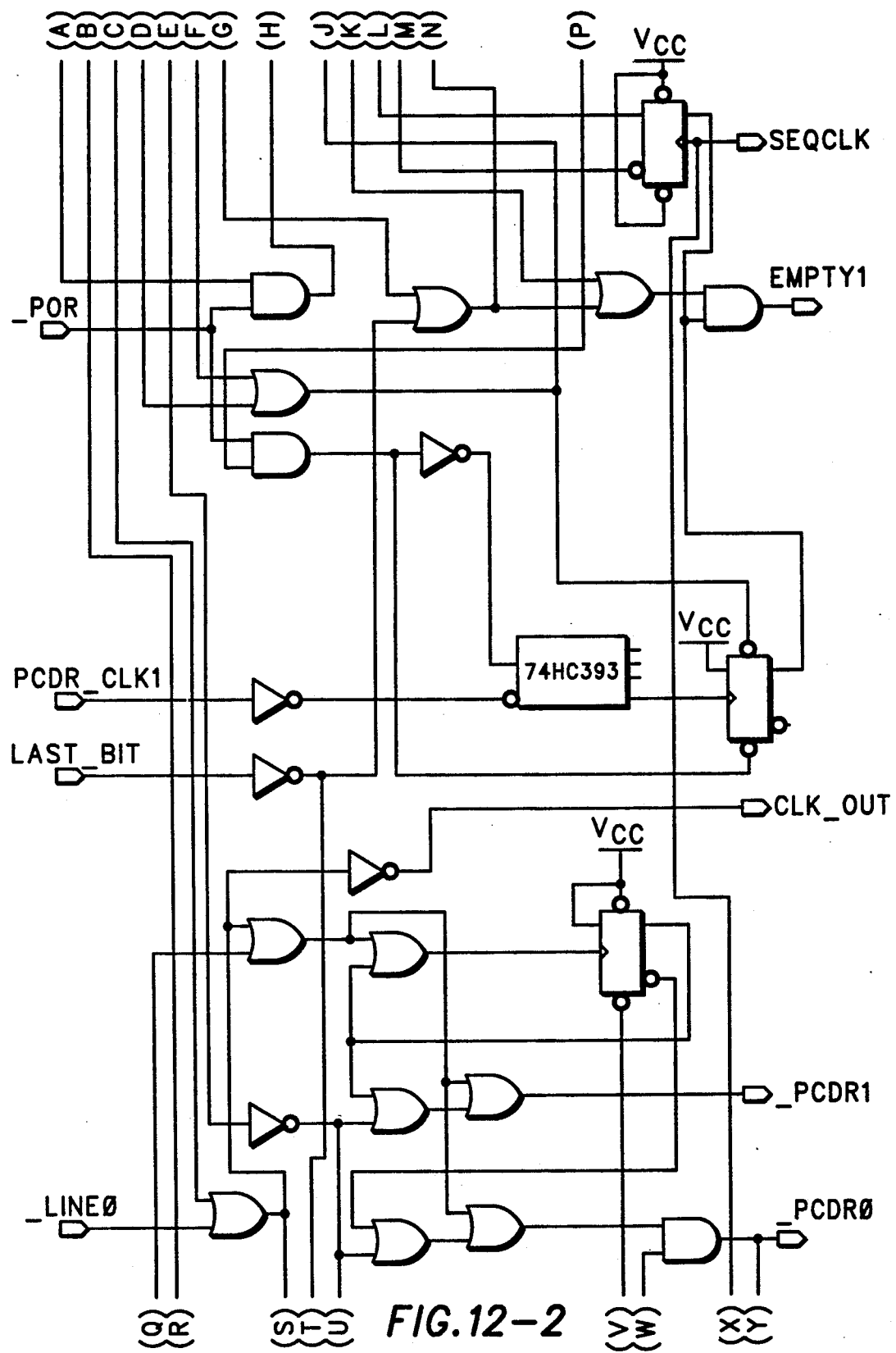
Figures 3, 12:
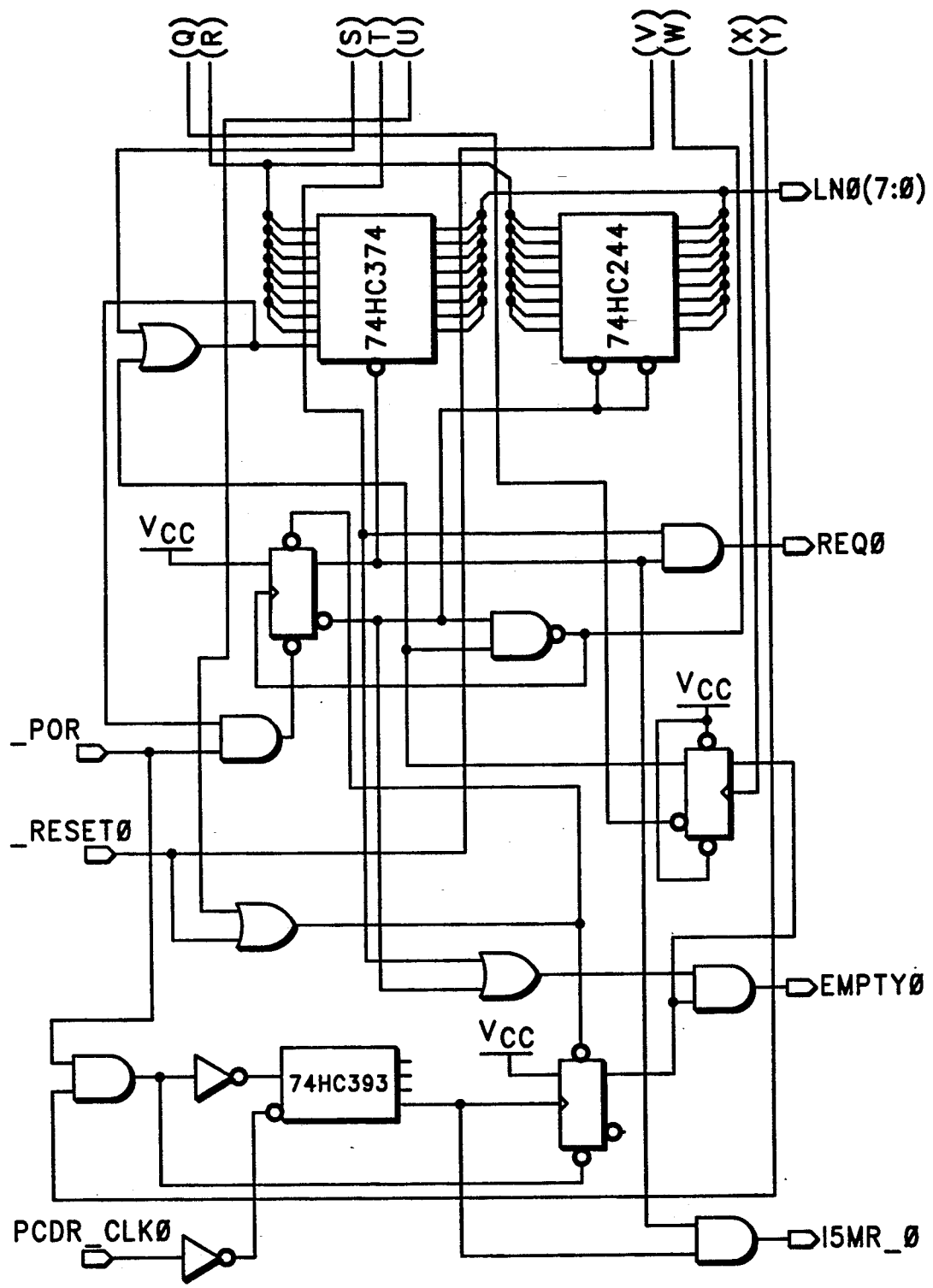

Unit decoder 24 is illustrated schematically in FIG. 11 and primarily includes a decoder block 74. Decoder block 74 is illustrated in more detail in FIG. 11E, portions of which are also illustrated in more detail in FIGS. 11E1 and 11E2. Decoder block 74 includes a first ROM 76 and a second ROM 78 which embody a binary tree, the address/data arrangement of which is illustrated, in hexagonal code, in TABLE II and TABLE III of FIGS. 14 and 15, respectively. The data structure of the array in ROMs 76 and 78 is a mapping array developed in accordance with the expression $M(i,j) \rightarrow k$ where the present state is i and the input of the binary code is j. The state machine of the decoder then changes the state to k, and the process is repeated.

TABLE I is separated into TABLE IA, which lists all terminating code words, and TABLE IB, which lists make up code words. A run length may be made up of one or more make-up code words from TABLE IB and must include a terminating code word from TABLE IA. The code word, or words, for a specific run length is supplied in parallel on the data bus to PCDR 16, which converts the data to serial form and supplies it to decoder block 74 on the pin DIN. The binary tree embodied in ROMs 76 and 78 includes terminal nodes, indicating a complete code word, and dummy nodes, indicating an error in the code word. Each terminal node contains the information of the run length or the mode of the respective code word. The dummy nodes, each of which contain all ones, indicate an error in the code or in the decode. The process stops only when the state transition hits a terminal node or one of the dummy nodes of the binary tree.

TABLE II and TABLE III are partitioned into four blocks. The first block, with addresses from 0000 to 006B, contains the state transition table for white run lengths and the second block, with addresses from 0080 to 00EB, contains the state transition table for black run lengths. The third block, with addresses from 0100 to 010E, is for MR two dimensional code decoding and the fourth block, with addresses from 0180 to 018B, is for the resynchronization of the end/beginning of the line (EOL). It should be noted that a few addresses having data designated as FF are placed between the blocks to insure separation.

Each zero (0) in the code word causes ROM 76 to output the next branch address of the binary tree and each one (1) in the code word causes ROM 78 to output the next branch address of the binary tree. A specific example will be useful in understanding the operation of the ROMs 76 and 78. Consider the next decode run length will be a white run. Further assume that the code word 1100, representing a run length of five white, is received and is serially applied to the input pin DIN of decoder block 74. The first bit (1) will be applied to ROM 78 and will address the data at address 0000, which is data 02. The second bit (1) will be applied to ROM 78 and will cause the output thereof to move from 02 to 06. This is accomplished by using the previous data (02) as an address for the second bit. The next bit (0) is applied to ROM 76, with the previous output (06) being used as an address, which produces an output from ROM 76 of 0D. The final bit (0) is applied to ROM 76 with 0D being used as an address, so that the terminal node 85 is reached. At this point ROM 76 provides a five white run length output to the data bus. This output is supplied to output buffer 22 where it is arranged, with other outputs from decoder 24, into bytes of image data that can be used by external apparatus for printing.

Block 84 of decoder 24 includes logic, controlled by the particular operating scheme of unit 10, for sensing the various modes (seven vertical, horizontal, etc.) in the data and producing signals representative of the various modes (on separate lines), which signals are used in unit 10 to produce the image data.

Many portions of unit 10 have not been described in detail, since the operation thereof is straightforward and well understood by those skilled in the art. However, a complete implementation of unit 10 is illustrated so that the construction and simplicity of operation can be understood by those skilled in the art.

Thus, new and improved data compression/expansion apparatus has been illustrated and described, which apparatus is much cheaper to construct than the prior art dedicated CPU structures and can be easily integrated on a single chip. Also, the present apparatus is faster than prior art software oriented apparatus because many tasks that require separate software steps are performed simultaneously in the hardware. Finally, the present apparatus is easily adaptable to any of the hardware (i.e. image readers, printers, etc.) presently on the market.

While we have shown and described a specific embodiment of the present invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. A data compression/expansion unit for facsimile apparatus comprising:

a control register for selecting a specific coding scheme to be utilized;

an algorithmic state machine connected to said control register for receiving start signals therefrom and connected to other components of the unit for controlling the sequence and timing of the unit in accordance with the specific coding scheme selected in said control register;

pel change detect registers coupled to receive image data from a data bus, said pel change detect registers shifting the image data therethrough to provide pel change output signals representing each color change in the image data;

run length registers connected to provide run length output signals representative of the number of pels between each adjacent pair of pel change output signals, in response to the pel change output signals;

said algorithmic state machine controlling said pel change detect registers and said run length registers to operate simultaneously to reduce the required run time;

an encoder connected to receive the run length output signals and provide coded output signals, coded in accordance with the specific coding scheme selected in the control register;

an output buffer connected to receive the coded output signals from said encoder and arrange them in bytes, each byte including a predetermined number of bits; and a decoder connected to said control register and algorithmic state machine and receiving binary code words on an input thereof, said decoder including at least one memory device having stored therein the nodes of a binary tree for converting the received binary code words into image data.

2. A data compression/expansion unit as claimed in claim 1 wherein the unit is integrated on a single semiconductor chip.

3. A data compression/expansion unit as claimed in claim 1 wherein the decoder has an output connected to the output buffer for arranging the image data into bytes of information.

4. A data compression/expansion unit as claimed in claim 3 wherein the unit further includes a data bus for the input and output of information, input image data being supplied to the pel change detect registers by the data bus and output image data being supplied by the output buffer on the data bus.

5. A data compression unit for facsimile apparatus comprising:

a control register for selecting a specific coding scheme to be utilized;

an algorithmic state machine connected to said control register for receiving start signals therefrom and connected to other components of the unit for controlling the sequence and timing of the unit in accordance with the specific coding scheme selected in said control register;

pel change detect registers coupled to receive image data from a data bus, said pel change detect registers shifting the image data therethrough to provide pel change output signals representing each color change in the image data;

run length registers connected to provide run length output signals representative of the number of pels between each adjacent pair of pel change output signals, in response to the pel change output signals;

said algorithmic state machine controlling said pel change detect registers and said run length registers to operate simultaneously to reduce the required run time;

an encoder connected to receive the run length output signals and provide coded output signals, coded in accordance with the specific coding scheme selected in the control register; and an output buffer connected to receive the coded output signals from said encoder and arrange them in bytes, each byte including a predetermined number of bits.

6. A data compression unit as claimed in claim 5 wherein the encoder includes apparatus for generating a length indicating word associated with each coded output signal.

7. A data compression unit as claimed in claim 6 wherein the output buffer is connected to receive the length indicating words generated by the encoder and includes circuitry for utilizing the length indicating words to arrange the coded output signals into bytes.

8. A data compression unit as claimed in claim 5 wherein the unit is integrated on a single semiconductor chip.

* * * * *